United States Patent
Lee et al.

(10) Patent No.: US 11,333,937 B2
(45) Date of Patent: May 17, 2022

(54) DISPLAY SUBSTRATE, DISPLAY PANEL AND DISPLAY DEVICE

(71) Applicant: SAMSUNG DISPLAY CO., LTD., Yongin-si (KR)

(72) Inventors: Seong-Jun Lee, Yongin-si (KR); Jin-Oh Park, Yongin-si (KR); Mu-Kyung Jeon, Yongin-si (KR); Yong-Kyu Jang, Yongin-si (KR); Dong-Hoon Lee, Yongin-si (KR); Chi-Woo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 514 days.

(21) Appl. No.: 16/003,055

(22) Filed: Jun. 7, 2018

(65) Prior Publication Data
US 2018/0284549 A1 Oct. 4, 2018

Related U.S. Application Data

(63) Continuation of application No. 13/283,409, filed on Oct. 27, 2011, now abandoned.

(30) Foreign Application Priority Data

Nov. 24, 2010 (KR) .............................. 2010-0117361
Aug. 2, 2011 (KR) .............................. 2011-0076840

(51) Int. Cl.
*G02F 1/1343* (2006.01)
*G09G 3/36* (2006.01)
*G02F 1/1362* (2006.01)

(52) U.S. Cl.
CPC ..... *G02F 1/134363* (2013.01); *G09G 3/3688* (2013.01); *G02F 1/134318* (2021.01);
(Continued)

(58) Field of Classification Search
CPC ......... G02F 1/134363; G02F 1/133707; G02F 1/136286; G02F 2001/134372;
(Continued)

(56) References Cited

U.S. PATENT DOCUMENTS 6,897,930 B2 * 5/2005 Nakayoshi ........ G02F 1/136286
257/59
7,259,739 B2 8/2007 Yun et al.
(Continued)

FOREIGN PATENT DOCUMENTS

CN 101246672 A 8/2008
CN 101424807 A 5/2009
(Continued)

OTHER PUBLICATIONS

Kim, Sang Sao, 66.1: *Invited Paper: The World's Largest (82-in.) TFT-LCD*, SID 05 Digest, Development Center, LCD Business, Samsung Electronics Co., Ltd., Korea, vol. XXXVI, May 24, 2005, pp. 1842-1847, XP 007012410.
(Continued)

*Primary Examiner* — Hang Lin
(74) *Attorney, Agent, or Firm* — Lewis Roca Rothgerber Christie LLP

(57) ABSTRACT

A display substrate includes an insulating substrate, a first gate line, a first lower electrode, a second lower electrode, a first upper electrode, and a second upper electrode. The insulating substrate includes a first pixel region and a second pixel region located at a first direction from the first pixel region. The first gate line extends in a second direction crossing the first direction on the insulating substrate. The first and the second lower electrodes are in the first and the second pixel regions, respectively. The first upper electrode overlaps the first lower electrode in the first pixel region and includes a first slit pattern extending in a third direction
(Continued)

different from the first and the second directions. The second upper electrode overlaps the second lower electrode in the second pixel region and includes a second slit pattern extending in a fourth direction different from the first to the third directions.

20 Claims, 23 Drawing Sheets

(52) U.S. Cl.
    CPC .. *G02F 1/134372* (2021.01); *G02F 1/136286* (2013.01); *G09G 3/3648* (2013.01); *G09G 2300/0426* (2013.01); *G09G 2300/0447* (2013.01); *G09G 2320/0276* (2013.01); *G09G 2320/0673* (2013.01)

(58) Field of Classification Search
    CPC ...... G02F 2001/134318; G09G 3/3688; G09G 2320/0276; G09G 2300/0447; G09G 2300/0426; G09G 3/3648
    See application file for complete search history.

(56) References Cited

U.S. PATENT DOCUMENTS

| | | | |
|---|---|---|---|
| 7,561,239 B2* | 7/2009 | Fujita | G02F 1/133707 349/142 |
| 2003/0197672 A1 | 10/2003 | Yun et al. | |
| 2004/0227890 A1 | 11/2004 | Chung et al. | |
| 2004/0263748 A1* | 12/2004 | Park | G02F 1/134363 349/141 |
| 2006/0284819 A1* | 12/2006 | Lin | G09G 3/3614 345/100 |
| 2007/0121048 A1* | 5/2007 | Hsu | G02F 1/133753 349/143 |
| 2007/0229748 A1* | 10/2007 | Fujita | G02F 1/133707 349/141 |
| 2008/0068549 A1* | 3/2008 | Liao | G02F 1/134363 349/141 |
| 2008/0174708 A1* | 7/2008 | Yoo | G02F 1/134309 349/39 |
| 2008/0191980 A1* | 8/2008 | Jeon | G09G 3/3677 345/87 |
| 2009/0002618 A1 | 1/2009 | Lee et al. | |
| 2009/0051842 A1 | 2/2009 | Kim et al. | |
| 2009/0058890 A1 | 3/2009 | Kurihara | |
| 2009/0115946 A1* | 5/2009 | Yamada | G02F 1/134336 349/99 |
| 2009/0207366 A1 | 8/2009 | Kim | |
| 2009/0284673 A1* | 11/2009 | Kim | G02F 1/134309 349/33 |
| 2009/0322975 A1 | 12/2009 | Song et al. | |
| 2010/0157223 A1 | 6/2010 | Shin et al. | |
| 2010/0207853 A1* | 8/2010 | Chen | G02F 1/133512 345/87 |
| 2010/0207857 A1 | 8/2010 | Gu et al. | |
| 2010/0207862 A1 | 8/2010 | Xu et al. | |
| 2010/0220255 A1 | 9/2010 | Song et al. | |
| 2010/0321370 A1 | 12/2010 | Weng et al. | |

FOREIGN PATENT DOCUMENTS

| | | |
|---|---|---|
| JP | 10-301150 | 11/1998 |
| JP | 2001-330844 | 11/2001 |
| JP | 2001-330855 | 11/2001 |
| JP | 2002-014363 | 1/2002 |
| JP | 2005-300821 | 10/2005 |
| JP | 2007-047664 | 2/2007 |
| JP | 2008-096815 | 4/2008 |
| JP | 2009-058784 | 3/2009 |
| KR | 10-2001-0003751 A | 1/2001 |
| KR | 1020030057027 A | 7/2003 |
| KR | 1020030083313 A | 10/2003 |
| KR | 10-2004-0098728 | 11/2004 |
| KR | 100495792 B1 | 6/2005 |
| KR | 10-2005-0113758 A | 12/2005 |
| KR | 1020070020868 A | 2/2007 |
| KR | 1020070027374 A | 3/2007 |
| KR | 10-2008-0028818 A | 4/2008 |
| KR | 1020080029183 A | 4/2008 |
| KR | 1020080048722 A | 6/2008 |
| KR | 1020080114352 A | 12/2008 |
| KR | 10-2009-0033309 A | 4/2009 |
| KR | 1020090089098 A | 8/2009 |
| KR | 1020100072682 A | 7/2010 |
| KR | 10-2010-0098900 | 9/2010 |
| TW | 201101286 | 1/2011 |

OTHER PUBLICATIONS

EPO Search Report dated Apr. 4, 2012, for corresponding European Patent application 11190218.5, (11 pages).
EPO Office action dated Oct. 15, 2015, for corresponding European Patent application 11190218.5, (8 pages).
Korean Office action dated May 30, 2012 issued in corresponding Korean Patent Application No. 10-2010-0117361, (8 pages).
KIPO Office action dated Feb. 28, 2013, for Korean priority Patent application 10-2010-0117361, (5 pages).
SIPO Office action dated Dec. 9, 2015, for corresponding Chinese Patent application 201110386135.2, (21 pages).

* cited by examiner

DISPLAY SUBSTRATE, DISPLAY PANEL AND DISPLAY DEVICE

CROSS REFERENCE TO RELATED APPLICATION

This application is a continuation of U.S. patent application Ser. No. 13/283,409, filed Oct. 27, 2011, which claims priority to and the benefit of Korean Patent Application No. 2010-0117361, filed Nov. 24, 2010 and Korean Patent Application No. 2011-0076840, filed Aug. 2, 2011, the entire content of all of which is incorporated herein by reference.

BACKGROUND

1. Field

Example embodiments of the present invention relate to display substrates, display panels, and display devices. More particularly, example embodiments of the present invention relate to liquid crystal display substrates, liquid crystal display panels, and liquid crystal display devices.

2. Description of Related Art

A liquid crystal display (LCD) device typically includes a liquid crystal layer disposed between two insulating substrates on which electric field generating electrodes are formed, respectively. The LCD device may display an image by adjusting the transmittance of light passing through the liquid crystal layer, through realignment of liquid crystal molecules in the liquid crystal layer, in response to a voltage applied to the electric field generating electrodes.

An LCD device having a general structure may be a display device of a twisted nematic ("TN") mode, in which the electric field forming electrodes are formed on the two insulating substrates, respectively. The LCD device of TN mode has a problem in that a viewing angle is narrow.

An LCD device of a plane to line switching (PLS) mode has been developed to achieve a relatively wide viewing angle. The LCD device of the PLS mode includes a pair of electric field generating electrodes, for example, a pixel electrode and a common electrode insulated from each other and disposed on a substrate (example for an array substrate) on which thin-film transistors (TFTs) are formed. Liquid crystal molecules arranged along a fringe field between the pixel electrode and the common electrode control the light transmittance of the liquid crystal layer so that the LCD device of the PLS mode displays an image.

SUMMARY

Example embodiments provide a display substrate capable of improving a viewing angle and visibility with a high light-transmittance.

Example embodiments provide a display panel capable of improving a viewing angle and visibility with a high light-transmittance.

Example embodiments provide a display device capable of improving a viewing angle and visibility with a high light-transmittance.

According to example embodiments, there is provided a display substrate including an insulating substrate, a first gate line, a first lower electrode, a second lower electrode, a first upper electrode, and a second upper electrode. The insulating substrate may include a first pixel region and a second pixel region disposed in a first direction from the first pixel region. The first gate line may extend in a second direction crossing the first direction on the insulating substrate. The first lower electrode may be disposed in the first pixel region. The second lower electrode may be disposed in the second pixel region. The first upper electrode may overlap the first lower electrode in the first pixel region, and may include a first slit pattern extending in a third direction different from the first and the second directions. The second upper electrode may overlap the second lower electrode in the second pixel region, and may include a second slit pattern extending in a fourth direction different from the first to the third directions.

In example embodiments, the display substrate may further include an alignment layer on the insulating substrate on which the first and the second upper electrodes may be located. The alignment direction of the alignment layer in the first pixel region may be same as that of the alignment layer in the second pixel region.

In example embodiments, the alignment direction of the alignment layer may be the first direction or the second direction.

In example embodiments, the second direction may be perpendicular to the first direction. The third direction and the fourth direction may be symmetric to each other with respect to the second direction.

In example embodiments, the insulating substrate may further include a third pixel region disposed in the second direction from the first pixel region and a fourth pixel region disposed in the second direction from the second pixel region. The display substrate may further include a third lower electrode, a fourth lower electrode, a third upper electrode and a fourth upper electrode. The third lower electrode may be disposed in the third pixel region. The fourth lower electrode may be disposed in the fourth pixel region. The third upper electrode may overlap the third lower electrode in the third pixel region, and may include a third slit pattern extending in the third direction. The fourth upper electrode may overlap the fourth lower electrode in the fourth pixel region, and may include a fourth slit pattern extending in the fourth direction.

In example embodiments, the display substrate may further include a second gate line, a first date line, a first switching element and a second switching element. The second gate line may be disposed in parallel with the first gate line. The first data line may cross the first and the second gate lines. The first switching element may be disposed in the first pixel region, and may be electrically coupled to the first gate line and the first data line. The second switching element may be disposed in the second pixel region, and may be electrically coupled to the second gate line and the first data line. Here, the first lower electrode or the first upper electrode may be electrically coupled to the first switching element, and the second lower electrode or the second upper electrode may be electrically coupled to the second switching element.

In example embodiments, the first gate line may be disposed between the first and the second pixel regions. The second pixel region may be disposed between the first and the second gate lines.

In example embodiments, the first and the second pixel regions may be disposed between the first and the second gate lines.

In example embodiments, the display substrate may further include a second gate line, a first data line, a second data line, a first switching element and a second switching element. The second gate line may be disposed in parallel with the first gate line. The first data line may cross the first and the second gate lines. The second data line may be disposed in parallel with the first data line, and may cross the first and the second gate lines. The first switching element may be disposed in the first pixel region, and may be electrically coupled to the first gate line and the second data line. The second switching element may be disposed in the second pixel region, and may be electrically coupled to the second gate line and the first data line. Here, the first lower electrode or the first upper electrode may be electrically coupled to the first switching element, and the second lower electrode or the second upper electrode may be electrically coupled to the second switching element.

In example embodiments, the first and the second pixel regions may be between the first and the second gate lines. Then, the first and the second upper electrodes may have an integral structure where the first and the second upper electrodes are coupled to each other, and the first and the second slit patterns may be coupled to each other.

In example embodiments, the insulating substrate may further include a third pixel region disposed in the first direction from the second pixel region. The display substrate may further include a third gate line, a third lower electrode, a third upper electrode and a third switching element. The third gate line may extend in the second direction, and may be between the third pixel region and the second gate line. The third lower electrode may be disposed in the third pixel region. The third upper electrode may overlap the third lower electrode in the third pixel region, and may include a third slit pattern extending in the third direction. The third switching element may be disposed in the third pixel region, and may be electrically coupled to the third gate line, the third switching element being adjacent to the third gate line.

In example embodiments, the display substrate may further include first and second data lines crossing the first gate line, the first and the second data lines may be disposed in parallel with each other. The first and the second pixel regions may be between the first and the second data lines. Sides of the first and the second upper electrodes adjacent to the first data line may be disposed in parallel with the first data line, and sides of the first and the second upper electrodes adjacent to the second data line may be disposed in parallel with the second data line. Then, each of the first and the second data lines may include a first extension portion in parallel with the first slit pattern and a second extension portion in parallel with the second slit pattern. Each of the first and the second data lines may have a straight line shape extending along the first direction.

In example embodiments, the first slit pattern may include a first curved portion having an inclined angle smaller than an angle between the second direction and the third direction, and the first curved portion may be in at least one of both edge portions of the first slit pattern. The second slit pattern may include a second curved portion having an inclined angle smaller than an angle between the second direction and the fourth direction, and the second curved portion may be in at least one of both edge portions of the second slit pattern.

According to example embodiments, there is provided a display substrate including an insulating substrate, a first gate line, a first lower electrode, a second lower electrode, a first upper electrode and a second upper electrode. The insulating substrate may include a first pixel region and a second pixel region disposed in a first direction from the first pixel region. The first gate line may be disposed between the first and the second pixel regions, the first gate line may extend in a second direction crossing the first direction on the insulating substrate. The first lower electrode may be disposed in the first pixel region. The second lower electrode may be disposed in the second pixel region. The first upper electrode may overlap the first lower electrode in the first pixel region, and may include a first slit pattern sequentially extending in a third direction and in a fourth direction, the third and the fourth directions being different from each other, and each of the third and the fourth directions being different from the first and the second directions. The second upper electrode may overlap the second lower electrode in the second pixel region, and may include a second slit pattern sequentially extending in the fourth direction and the third direction.

In example embodiments, the display substrate may further include an alignment layer formed on the insulating substrate on which the first and the second upper electrodes may be formed. The alignment direction of the alignment layer in the first pixel region may be same as that of the alignment layer in the second pixel region.

In example embodiments, the alignment direction of the alignment layer may be the first direction or the second direction.

In example embodiments, the second direction may be perpendicular to the first direction, and the third direction and the fourth direction may be symmetric to each other with respect to the second direction.

In example embodiments, the display substrate may further include a second gate line, a first data line, a second data line, a first switching element and a second switching element. The second gate line may be disposed in parallel with the first gate line. The first data line may cross the first and the second gate lines. The second data line may cross the first and the second gate lines, and may be disposed in parallel with the first data line. The first switching element may be disposed in the first pixel region, and may be electrically coupled to the first gate line and the second data line. The second switching element may be disposed in the second pixel region, and may be electrically coupled to the second gate line and the first data line. Then, the first lower electrode or the first upper electrode may be electrically coupled to the first switching element, and the second lower electrode or the second upper electrode may be electrically coupled to the second switching element.

In example embodiments, the first and the second pixel regions may be between the first and the second data lines. The first switching element may be located adjacently to the second data line, and the second switching element may be located adjacently to the first data line.

In example embodiments, each of the first and the second data lines may include a first extension portion in parallel with the first slit pattern; and a second extension portion in parallel with the second slit pattern.

According to example embodiments, there is provided a display panel including a display substrate, an opposing substrate and liquid crystal layer. The display substrate may include an insulating substrate, a first gate line, a first lower electrode, a first upper electrode, a second lower electrode and a second upper electrode. The insulating substrate may include a first pixel region and a second pixel region disposed in a first direction from the first pixel region. The first gate line may extend in a second direction crossing the first direction. The first lower electrode and the first upper electrode may be disposed in the first pixel region, the first upper electrode may overlap the first lower electrode, and may include a first slit pattern extending in a third direction different from the first and the second directions. The second lower electrode and the second upper electrode may be disposed in the second pixel region, the second upper electrode may overlap the second lower electrode, and may include a second slit pattern extending in a fourth direction different from the first to the third direction. The opposing substrate may face the display substrate, and may include color filters overlapping the first and the second pixel regions. The liquid crystal layer may be disposed between the display substrate and the opposing substrate.

In example embodiments, the opposing substrate may further include a second alignment layer formed on the opposing substrate on which the color filters are formed. The second alignment layer may have a single alignment direction in regions of the opposing substrate facing the first and the second pixel regions. Then, the alignment direction of the second alignments layer may be same as that of the first alignment layer.

In example embodiments, the display panel may further include a first polarizing plat and a second polarizing plate. The first polarizing plate may be disposed on a lower surface of the display substrate, and may have a polarizing axis that is same as the alignment direction of the first alignment layer. The second polarizing plate may be disposed on an upper surface of the opposing substrate, and may have a polarizing axis perpendicular to the polarizing axis of the first polarizing plate.

In example embodiments, the opposing substrate may further include a light-blocking pattern overlapping the first and the second switching elements. A width of the light-blocking pattern between the second and the third pixel regions may be smaller than a distance from a distant end of the second switching element to a distant end of the third switching element.

According to example embodiments, there is provided a display panel including a display substrate, an opposing substrate and liquid crystal layer. The display substrate may include an insulating substrate, a first gate line, a first lower electrode, a first upper electrode, a second lower electrode and a second upper electrode. The insulating substrate may include a first pixel region and a second pixel region disposed in a first direction from the first pixel region. The first gate line may be disposed between the first and the second pixel regions, and the first gate line may extend in a second direction crossing the first direction. The first lower electrode and the first upper electrode may be disposed in the first pixel region. The first upper electrode may overlap the first lower electrode, and may include a first slit pattern sequentially extending in a third direction and in a fourth direction. The third and the fourth directions may be different from each other, and each of the third and the fourth directions may be different from the first and the second directions. The second lower electrode and the second upper electrode may be disposed in the second pixel region. The second upper electrode may overlap the second lower electrode, and may include a second slit pattern sequentially extending in the fourth direction and in the third direction. The opposing substrate may face the display substrate, and may include color filters overlapping the first and the second pixel regions. The liquid crystal layer may be disposed between the display substrate and the opposing substrate.

In example embodiments, the display panel may further include a first polarizing plat and a second polarizing plate. The first polarizing plate may be disposed on a lower surface of the display substrate, and may have a polarizing axis that is same as the alignment direction of the first alignment layer. The second polarizing plate may be disposed on an upper surface of the opposing substrate, and may have a polarizing axis that is perpendicular to the polarizing axis of the first polarizing plate.

According to example embodiments, there is provided a display device including a display panel, a gamma voltage generating unit, a controlling unit and a data driving unit. The display panel may include a first pixel, a second pixel and a first gate line. The first pixel may include a first lower electrode and a first upper electrode overlapping the first lower electrode, the first upper electrode may have a first slit pattern. The second pixel may be disposed in a first direction from the first pixel, the second pixel may include a second lower electrode and a second upper electrode overlapping the second lower electrode, the second upper electrode may have a second slit pattern extending in a direction different from a longitudinal direction of the first slit pattern. The first gate line may extend in a second direction different from the first direction. The gamma voltage generating unit may be configured to generate a first gamma reference voltage group and a second gamma reference voltage group, the first and the second gamma reference voltage groups having different voltage levels. The controlling unit may be configured to output first and the second pixel data corresponding to the first and the second pixels. The data driving unit may be configured to convert the first pixel data to a first pixel voltage based on the first gamma reference voltage group, to convert the second pixel data to a second pixel voltage based on the second gamma reference voltage group, and to output the first pixel voltage and the second pixel voltage to the first pixel and the second pixel, respectively.

In example embodiments, the controlling unit may be configured to receive image data from an external image source, to generate the first and the second pixel data based on the received image data, and to output the first and the second pixel data and a gamma selecting signal for controlling a selection of the first gamma reference voltage group or the second gamma reference voltage group. The data driving unit may include a gamma voltage selector that selects one of the first and the second gamma reference voltage groups in response to the gamma selecting signal.

In example embodiments, the controlling unit may be configured to receive image data from an external image source, to generate the first and the second pixel data based on the received image data, and to output the first and the second pixel data and a gamma selecting signal for controlling a selection of the first gamma reference voltage group or the second gamma reference voltage group. The gamma voltage generating unit may be configured to selectively output one of the first and the second gamma reference voltage groups in response to the gamma selecting signal.

In example embodiments, the gamma voltage generating unit may include a first gamma unit, a second gamma unit and a gamma voltage selector. The first gamma unit may include a first resistor-string, and may be configured to generate the first gamma reference voltage group using a power supply voltage. The second gamma unit may include a second resistor-string, and may be configured to generate the second gamma reference voltage group using the power supply voltage, the second resistor-string having resistances different from those of the first resistor-string. The gamma voltage selector may be configured to selectively output one of the first and the second gamma reference voltage groups in response to the gamma selecting signal.

In example embodiments, gamma values of the first and the second gamma reference voltage groups may be different from each other.

In example embodiments, an extending direction of the first slit pattern may be symmetrical to that of the second slit pattern with respect to the second direction.

In example embodiments, the display panel may further include a first data line extending in the first direction to cross the first gate line, and coupled to at least one of the first and the second pixels.

In example embodiments, the first and the second pixels may be sequentially operated, and a selection period of the first and the second gamma reference voltages groups may be same as an operating period of the first and the second pixels.

BRIEF DESCRIPTION OF THE DRAWINGS

Example embodiments can be understood in more detail from the following description taken in conjunction with the accompanying drawings, in which.

DETAILED DESCRIPTION

Figure 1:
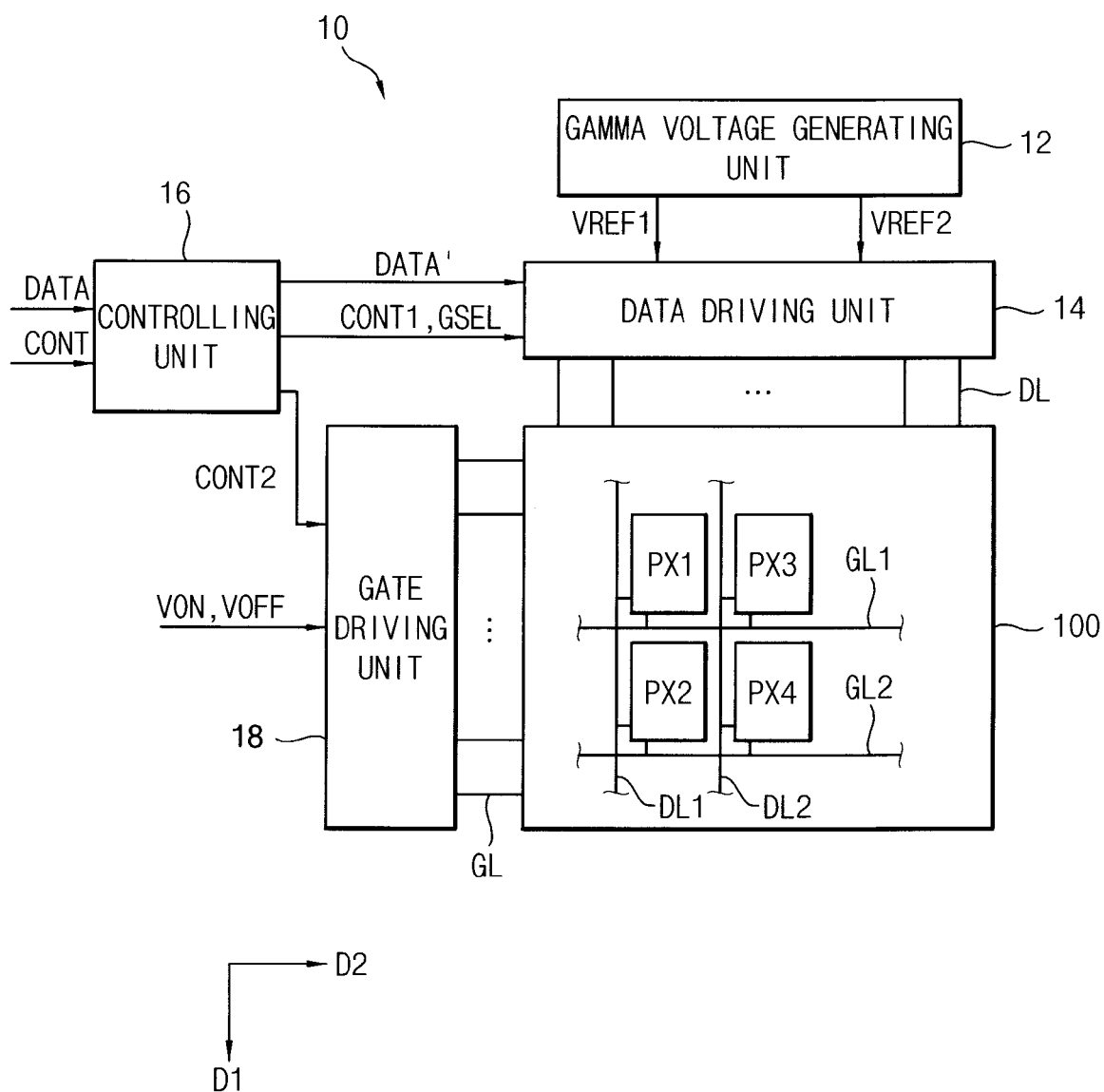
FIG. 1 is a block diagram illustrating a display device in accordance with example embodiments.

The example embodiments are described more fully hereinafter with reference to the accompanying drawings. The present invention may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. When an element is referred to as being "directly on," "directly connected to" or "directly coupled to" another element or layer, there may be no intervening elements or layers present. Like or similar reference numerals refer to like or similar elements throughout. As used herein, the term "and/or" includes any and all combinations of one or more of the associated listed items.

It will be understood that, although the terms first, second, third, etc. may be used herein to describe various elements, components, regions, layers, patterns and/or sections, these elements, components, regions, layers, patterns and/or sections should not be limited by these terms. These terms are only used to distinguish one element, component, region, layer, pattern, or section from another element, component, region, layer, pattern, or section. Thus, a first element, component, region, layer, pattern, or section discussed below could be termed a second element, component, region, layer, pattern, or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only, and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the present invention. As such, variations from the shapes of the illustrations as a result, for example, of manufacturing techniques and/or tolerances, are to be expected. Thus, example embodiments should not be construed as limited to the particular shapes of regions illustrated herein but are to include variations in shapes that result, for example, from manufacturing. The regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In LCD devices, such as the LCD device of the PLS mode, a domain is formed along a direction of an electric field formed between the two electrodes. Although an LCD device having a single domain structure has high light transmittance, a color shift may occur according to a viewing direction, and thus a viewing angle may be reduced. To prevent such a color shift, an LCD device having a multi-domain structure has been developed, in which at least two domains are formed in a pixel. However, in the LCD device having the multi-domain structure, light transmittance may be reduced due to a texture generated in a boundary between the domains.

Figure 2:
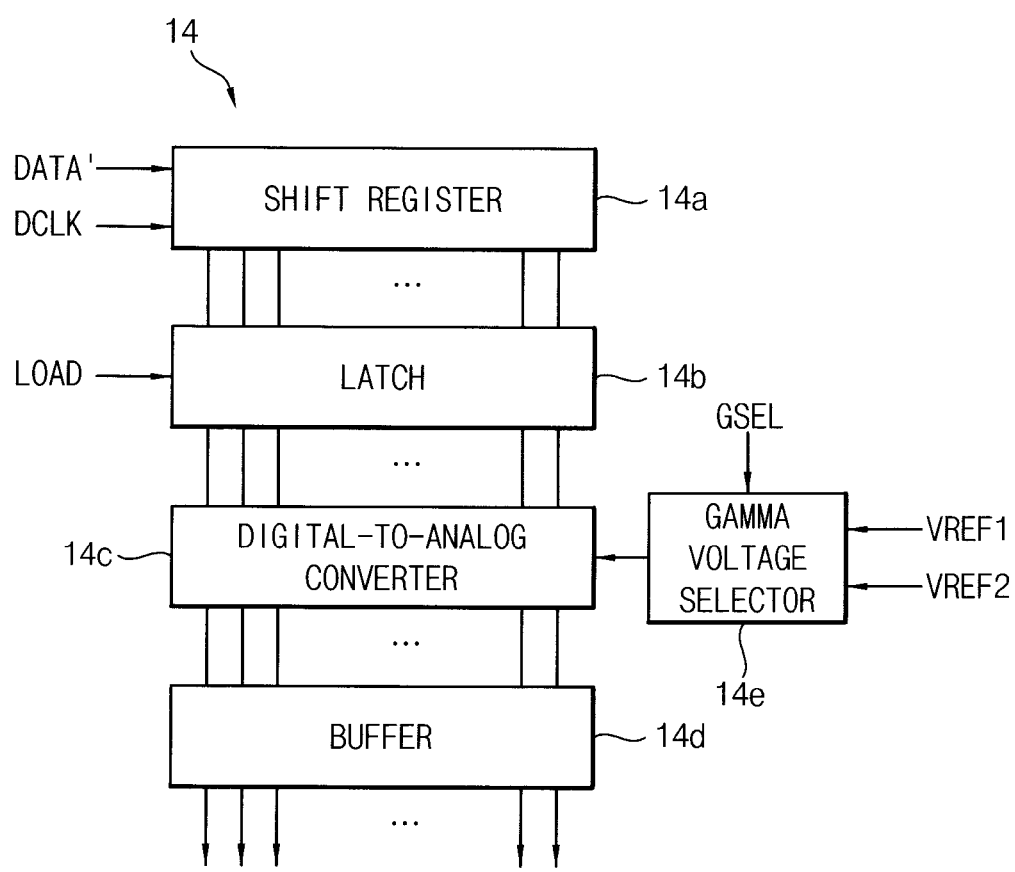
FIG. 2 is block diagram illustrating a data driving unit included in a display device of FIG. 1.

FIG. 1 is a block diagram illustrating a display device 10 in accordance with example embodiments. FIG. 2 is a block diagram illustrating a data driving unit 14 included in the display device 10 of FIG. 1.

Referring to FIGS. 1 and 2, the display device 10 includes a display panel 100, a gamma voltage generating unit (or a gamma voltage generator) 12, a data driving unit (or a data driver) 14, a controlling unit (or a controller) 16, and a gate driving unit (or a gate driver) 18. The gamma voltage generating unit 12, the data driving unit 14, the controlling unit 16, and the gate driving unit 18 may drive the display panel 100 to display an image based on an image signal provided from an image source, such as an external graphics device.

Although it is not illustrated in FIG. 1, the display device 10 may further include a backlight assembly that emits light to the display panel 100. The backlight assembly may be located behind the display panel 100. A display direction of an image may be defined as a light emitting direction from the backlight assembly to the display panel 100.

The display panel 100 includes a display substrate (or a lower substrate), an opposing substrate (or an upper substrate) and a liquid crystal layer. The opposing substrate may face the display substrate. The liquid crystal layer is interposed between the display substrate and the opposing substrate. The display panel 100 may include a plurality of pixels PX1, PX2, PX3, and PX4, and a plurality of signal lines GL1, GL2, DL1, and DL2 coupled to the pixels PX1, PX2, PX3, and PX4. For example, the display panel 100 may include a first pixel PX1, a second pixel PX2, a third pixel PX3 and a fourth pixel PX4 that are arranged in a matrix form. When viewed from the top, the second pixel PX2 may be located in a first direction D1 from the first pixel PX1. Here, the first direction D1 may be a vertical direction (or a column direction). The third and fourth pixels PX3 and PX4 may be located in a second direction D2 from the first and second pixels PX1 and PX2, respectively. Here, the second direction D2 may cross the first direction D1. For example, the second direction D2 may be a horizontal direction (or a row direction).

The signal lines GL1, GL2, DL1, and DL2 may include gate lines GL1 and GL2, and data lines DL1 and DL2 crossing the gate lines GL1 and GL2. For example, the signal lines GL and DL may include first and second gate lines GL1 and GL2 and first and second data lines DL1 and DL2. The first and second gate lines GL1 and GL2 may extend in the second direction D2, and may be in parallel with each other. The first and second data lines DL1 and DL may extend in the first direction D1, and may be in parallel with each other. The signal lines GL1, GL2, DL1, and DL2 may be coupled to the pixels PX1, PX2, PX3, and PX4. For example, each of the pixels PX1, PX2, PX3, and PX4 may be coupled to a corresponding one of the gate lines GL1 and GL2 and a corresponding one of the data lines DL1 and DL2.

Although it is not specifically illustrated in FIG. 1, each of the pixels PX1, PX2, PX3, and PX4 may include a pair of electric field generating electrodes and the liquid crystal layer. The pair of the electric field generating electrodes may include a lower electrode and an upper electrode overlapping the lower electrode. The upper electrode may include a slit pattern for forming a domain. The domain may be formed by an electric field generated by the slit pattern of the upper electrode in each of the pixels PX1, PX2, PX3, and PX4. The first and second pixels PX1 and PX2 may have different domains from each other. For example, the first and second pixels PX1 and PX2 may have a symmetric structure to each other with respect to one of the gate lines GL1 and GL2, or with respect to the second direction D2 as an extension direction of the gate lines GL1 and GL2. In addition, the third and fourth pixels PX3 and PX4 may have different domains from each other. For example, the third and fourth pixels PX3 and PX4 may have a symmetric structure to each other with respect to one of the gate lines GL1 and GL2, or with respect to the second direction D2 as the extension direction of the gate lines GL1 and GL2. The domains of the third and fourth pixels PX3 and PX4 may be substantially the same as those of the first and second pixels PX1 and PX2. Thus, adjacent pixels PX1 and PX3 arranged along the second direction D2 as the extension direction of the gate lines GL1 and GL2 may have the same domain, and adjacent pixels PX1 and PX2 arranged along the first direction D1 as the extension direction of the data lines DL1 and DL2 may have different domains.

A structure of the display panel 100 will be described later in detail with reference to the accompanying drawings.

The gamma voltage generating unit 12 may generate a plurality of gamma reference voltage groups VREF1 and VREF2, each including gamma voltages provided to the pixels PX1, PX2, PX3, and PX4 of the display panel 100. The gamma voltage generating unit 12 may generate a first gamma reference voltage group VREF1 and a second gamma reference voltage group VREF2. The first and second gamma reference voltage groups VREF1 and VREF2 may have different voltage levels from each other. For example, the first gamma reference voltage group VREF1 may be a group of gamma voltages according to a first gamma curve having a first gamma value. The second gamma reference voltage group VREF2 may be a group of gamma voltages according to a second gamma curve having a second gamma value different from the first gamma value. The first and second gamma values may be set to compensate for a deviation according to the domains of the first and second pixels PX1 and PX2. For example, the first gamma reference voltage group VREF1 may have voltage levels for compensating the deviation of the first pixel PX1, and the second gamma reference voltage group VREF2 may have voltage levels for compensating the deviation of the second pixel PX2. In some example embodiments, the first and second gamma reference voltage groups VREF1 and VREF2 may be alternately provided to the pixels PX1 and PX2 arranged along the first direction D1 on a row-by-row basis. For example, the first gamma reference voltage group VREF1 may be provided to odd rows of the pixels PX1 and PX3, and the second gamma reference voltage group VREF2 may be provided to even rows of the pixels PX2 and PX4.

The gamma voltage generating unit 12 may include a first gamma unit that generates the first gamma reference voltage group VREF1 and a second gamma unit that generates the second gamma reference voltage group VREF2. The first gamma unit may include a first resistor-string (e.g., a resistive divider or a series of resistors) for voltage division, and the second gamma unit may include a second resistor-string (e.g., resistive divider or a series of resistors) for voltage division. Each of the first and second resistor-strings may include a plurality of resistors. The first and second resistor-strings may receive a power supply voltage from a power generating unit (not shown), and may divide the power supply voltage to generate the first and second gamma reference voltage groups VREF1 and VREF2, respectively. The first and second gamma reference voltage groups VREF1 and VREF2 generated in the gamma voltage generating unit 12 may be provide to the data driving unit 14.

The data driving unit 14 may receive pixel data DATA' and control signals CONT1 and GSEL from the controlling unit 16. The data driving unit 14 may convert the pixel data DATA' into analog pixel voltages based on the first and second gamma reference voltage groups VREF1 and VREF2, and may output the pixel voltages to the pixels PX1, PX2, PX3, and PX4 through the data lines DL1 and DL2. A first pixel data corresponding to the first pixel PX1 may be converted into a first pixel voltage based on the first gamma reference voltage group VREF1, and the first pixel voltage may be provided to the first pixel PX1. A second pixel data corresponding to the second pixel PX2 may be converted into a second pixel voltage base on the second gamma reference voltage group VREF2, and the second pixel voltage may be provided to the second pixel PX2. The pixel data DATA' provided from the controlling unit 16 may be a digital signal. Thus, the data driving unit 14 may convert the pixel data DATA' of the digital type into the pixel voltages of the analog type.

The control signals CONT1 and GSEL may include a data control signal CONT1 and a gamma selecting signal GSEL. The data control signal CONT1 may include a horizontal start signal STH indicating a start of data transmission for a row of the pixels PX1 and PX3 arranged along the second direction D2, a load signal LOAD for applying the pixel voltages to the data lines, and a data clock signal DCLK for timing synchronization. The data control signal CONT1 may further include a polarity inverse signal for inverting a polarity of the pixel voltages. The gamma selecting signal GSEL may control a selection of the first reference voltage group VREF1 or the second reference voltage group VREF2. Since the first and second gamma reference voltage groups VREF1 and VREF2 may be alternately used in converting the pixel data DATA' on a row-by-row basis, the gamma selecting signal GSEL may have substantially the same period as the horizontal start signal STH. Thus, the first and second pixels PX1 and PX2 arranged along the first direction D1 may be sequentially operated, and a selection period of the first and second gamma reference voltage groups VREF1 and VREF2 may be substantially the same as an operating period of the first and second pixels PX1 and PX2.

As shown in FIG. 2, the data driving unit 14 may include a shift register 14a, a latch 14b, a digital-to-analog converter 14c, a buffer 14d, and a gamma voltage selector 14e. The shift register 14a may receive the pixel data DATA', the horizontal start signal STH and the data clock signal DCLK. When the shift register 14a receives the horizontal start signal STH, the shift register 14a may sequentially shift the received pixel data DATA' in response to the data clock signal DCLK, and may provide the pixel data DATA' to the latch 14b. The latch 14b may temporarily store the pixel data DATA' provided from the shift register 14a, and may concurrently (e.g., substantially simultaneously) output the stored pixel data DATA' to the digital-analog converter 14c in response to the load signal LOAD. The digital-to-analog converter 14c may convert the pixel data DATA' into the pixel voltages of the analog type based on the first gamma reference voltage group VREF1 or the second gamma reference voltage group VREF2 provided from the gamma voltage selector 14e, and may output the pixel voltages to the buffer 14d. Although it is not illustrated, the digital-to-analog converter 14c may receive the polarity inverse signal and may output the pixel voltages that are inverted in response to the polarity inverse signal. The buffer 14d may output the pixel voltages provided from the digital-to-analog converter 14c to the data lines DL1 and DL2, and thus the buffer 14d may provide the pixel voltages to the pixels PX1, PX2, PX3, and PX4. The gamma voltage selector 14e may receive the first and second gamma reference voltage groups VREF1 and VREF2 from the gamma voltage generating unit 12, and may select one of the first and second gamma reference voltage groups VREF1 and VREF2 in response to the gamma selecting signal GSEL. The gamma voltage selector 14e may output the selected gamma reference voltage group to the digital-to-analog converter 14c. The gamma voltage selector 14e may select and output the first gamma reference voltage group VREF1 when driving the first pixel PX1, and may select and output the second reference voltage group VREF2 when driving the second pixel PX2. In some example embodiments, the gamma voltage selector 14e may include a multiplexer for outputting one of the first and second gamma reference voltage groups VREF1 and VREF2.

The controlling unit 16 may receive an image data DATA and synchronization signals CONT from an external image source, such as a graphics device. The synchronization signals CONT may include a vertical synchronization signal (Vsync), a horizontal synchronization signal (Hsync), a data enable signal (DE) and a main clock signal (MCLK). The controlling unit 16 may generate the gamma selecting signal GSEL, the data control signal CONT1 and a gate control signal CONT2 for driving the display panel 100 based on the synchronization signals CONT. The controlling unit 16 may output the data control signal CONT1 and the gate control signal CONT2 to the data driving unit 14 and the gate driving unit 18, respectively. The pixel data DATA' output to the data driving unit 14 may include pixel data of three colors corresponding to a red pixel, a green pixel and a blue pixel.

The gate driving unit 18 may sequentially output gate signals in response to the gate control signal CONT2 to activate the gate lines GL1 and GL2. Since the gate driving unit 18 sequentially outputs the gate signals, the pixels PX1, PX2, PX3, and PX4 coupled to the gate lines GL1 and GL2 may be sequentially activated to receive the pixel voltages. The gate control signal CONT2 may include a scanning start signal STV indicating a start of scanning and a clock signal CLK for controlling an output time of a gate-on voltage VON. The gate driving unit 18 may receive the gate-on voltage VON and a gate-off voltage VOFF for generating the gate signals from a power generating unit (not shown).

Hereinafter, the display panel 100 will be described in detail below with reference to FIGS. 3A and 3B.

Figure 3A:
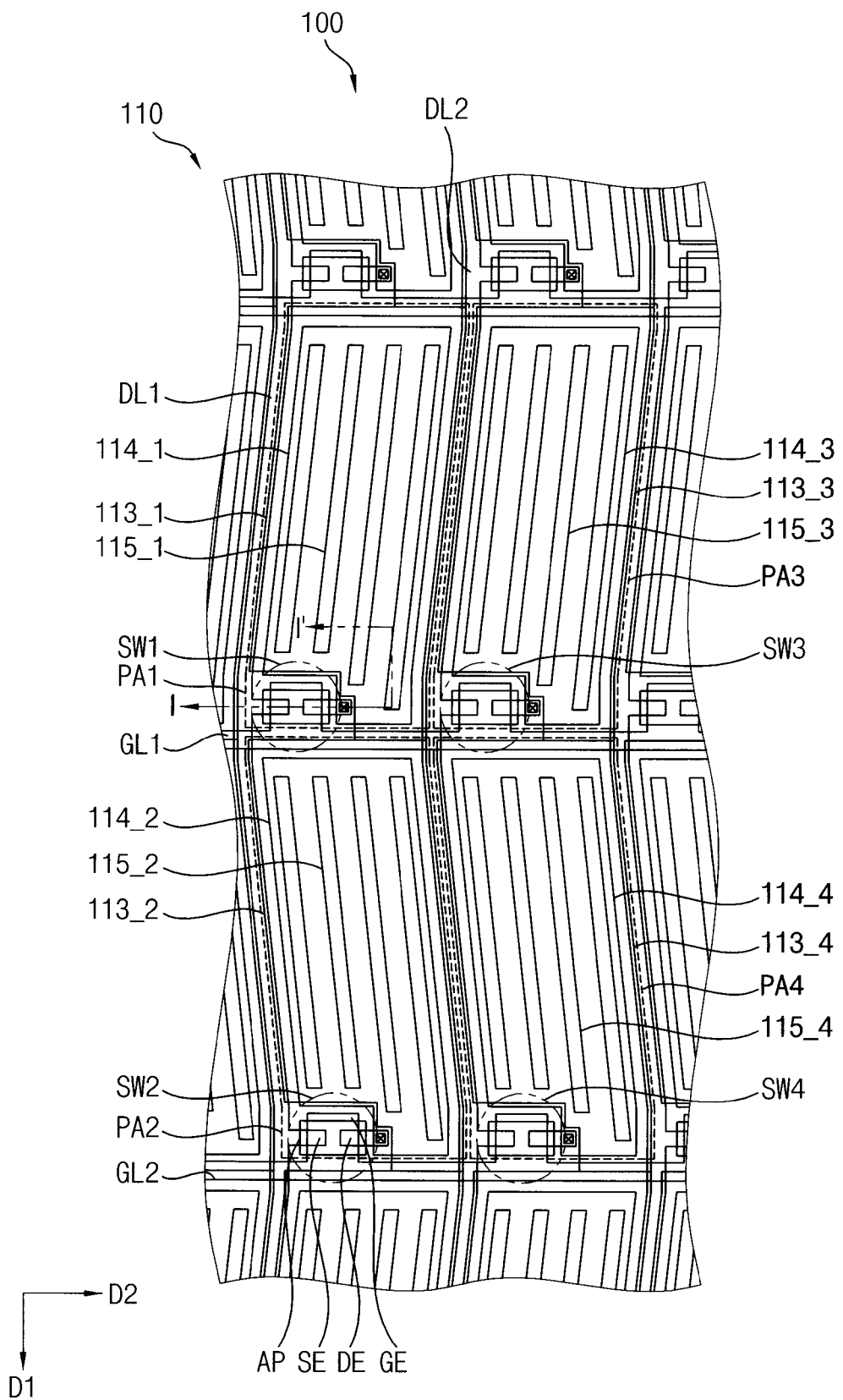
FIG. 3A is a plan view illustrating a display panel in accordance with example embodiments.

FIG. 3A is a plan view illustrating a display panel in accordance with example embodiments. FIG. 3B is a cross-sectional view of an example embodiment of a display panel taken along a line I-I' of FIG. 3A.

Figure 3B:
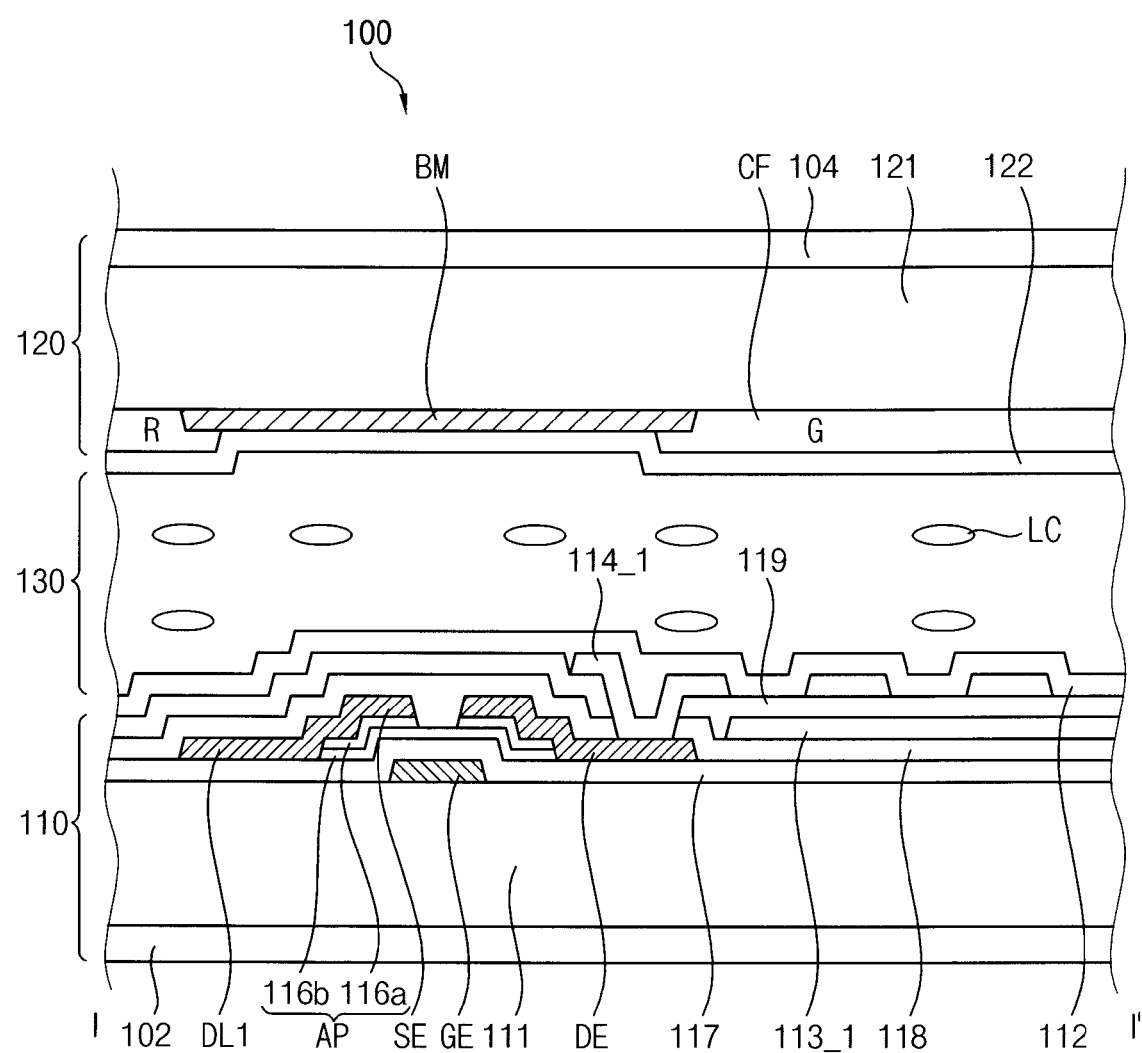
FIG. 3B is a cross-sectional view of an example embodiment of a display panel taken along a line I-I' of FIG. 3A.

Referring to FIGS. 3A and 3B, a display panel 100 includes a display substrate 110, an opposing substrate 120 and a liquid crystal layer 130. The opposing substrate 120 may be opposed to the display substrate 110, and the liquid crystal layer 130 may be interposed between the display substrate 110 and the opposing substrate 120. The liquid crystal layer 130 may include a plurality of liquid crystal molecules LC. The display panel 100 may further include a first polarizing plate 102 and a second polarizing plate 104.

The display substrate 110 may include a first insulating substrate 111, a plurality of signal lines and electric field generating electrodes for forming an electric field. The plurality of signal lines and the electric field generating electrodes may be formed on the first insulating substrate 111. The display substrate 110 may further include switching elements SW1, SW2, SW3, and SW4 for controlling an operation of the electric field generating electrodes, and a first alignment layer 112 for initially aligning the liquid crystal molecules LC.

The first insulating substrate 111 may include a transparent insulating material, such as glass, plastic, etc. The first insulating substrate 111 may include a plurality of pixel regions PA1, PA2, PA3, and PA4 corresponding to pixels PX1, PX2, PX3, and PX4 illustrated in FIGS. 1 and 2. For example, the pixel regions PA1, PA2, PA3, and PA4 may include a first pixel region PA1, a second pixel region PA2, a third pixel region PA3 and a fourth pixel region PA4. The first to fourth pixel regions PA1, PA2, PA3, and PA4 may be defined as regions for forming the first to fourth pixels PX1, PX2, PX3, and PX4 illustrated in FIGS. 1 and 2. The second pixel region PA2 may be located in a first direction D1 from the first pixel region PA1. Here, the first direction D1 may be a vertical direction (or a column direction). The third pixel region PA3 may be located in a second direction D2 from the first pixel region PA1, and the fourth pixel region PA4 may be located in the second direction D2 from the second pixel region PA2. Here, the second direction D2 may be a horizontal direction (or a row direction). Thus, the pixel regions PA1, PA2, PA3, and PA4 may be arranged in a matrix form.

The signal lines may include first and second gate lines GL1 and GL2, and first and second data lines DL1 and DL2. The first and second gate lines GL1 and GL2 may extend in the second direction D2. The first gate line GL1 may be located between the first and second pixel regions PA1 and PA2 and between the third and fourth pixel regions PA3 and PA4. The second gate line GL2 may extend in parallel with the first gate line GL1. The second and fourth pixel regions PA2 and PA4 may be located between the first and second gate lines GL1 and GL2. The first and second data lines DL1 and DL2 may extend in the first direction D1. The first and second data lines DL1 and DL2 may extend in a zigzag shape along the first direction D1, and the zigzag shape may be defined by shapes of the electric field generating electrodes.

Although it is not illustrated, the display substrate 100 may further include pad portions (not shown) formed at end portions of the first and second gate lines GL1 and GL2. The pad portions may be electrically coupled to a gate driving unit 18 illustrated in FIG. 1.

The electric field generating electrodes may include first to fourth lower electrodes 113_1, 113_2, 113_3, and 113_4 and first to fourth upper electrodes 114_1, 114_2, 114_3, and 114_4. The first to fourth lower electrodes 113_1, 113_2, 113_3, and 113_4 and the first to fourth upper electrodes 114_1, 114_2, 114_3, and 114_4 may be transparent electrodes including a transparent conductive material. Alternatively, the first to fourth upper electrodes 114_1, 114_2, 114_3, and 114_4 may be the transparent electrodes including the transparent conductive material, and the first to fourth lower electrodes 113_1, 113_2, 113_3, and 113_4 may be opaque electrodes including an opaque conductive material.

The first lower electrode 113_1 may be formed in the first pixel region PA1. The first lower electrode 113_1 may have a plate shape. The first lower electrode 113_1 may partially overlap the first gate line GL1 and the first and second data lines DL1 and DL2.

The second lower electrode 113_2 may be formed in the second pixel region PA2. The second lower electrode 113_2 may have a plate shape. The second lower electrode 113_2 may partially overlap the first and second gate lines GL1 and GL2 and the first and second data lines DL1 and DL2.

In some example embodiments, the first and second lower electrodes 113_1 and 113_2 may be integrally formed. Edge portions of the first and second lower electrodes 113_1 and 113_2 may be coupled to each other. For example, the first and second lower electrodes 113_1 and 113_2 may be coupled to each other in a region on which the first gate line GL1 is formed. The first and second lower electrodes 113_1 and 113_2 may be a common electrode to which a common voltage is applied. In other example embodiments, the first and second lower electrodes 113_1 and 113_2 may be spaced apart from each other, and may have a separate structure where the common voltage is applied through a separate common electrode line (not shown). For example, the separate structure may have an island shape.

The third lower electrode 113_3 may be formed in the third pixel region PA3, and the fourth lower electrode 113_4 may be formed in the fourth pixel region PA4. In some example embodiments, the third and fourth lower electrodes 113_3 and 113_4 may be integrally formed, in which edge portions of the third and fourth lower electrodes 113_3 and 113_4 are coupled to each other. In other example embodiments, the third and fourth lower electrodes 113_3 and 113_4 may have a separate structure where the common voltage is applied through separate common electrode lines. The third and fourth lower electrodes 113_3 and 113_4 may have substantially the same structure as the first and second lower electrodes 113_1 and 113_2.

In an example embodiment illustrated in FIGS. 3A and 3B, the first and second lower electrodes 113_1 and 113_2 may have an integral structure, and the third and fourth lower electrodes 113_3 and 113_4 may have an integral structure. For example, the first to fourth lower electrodes 113_1, 113_2, 113_3, and 113_4 may have a stripe structure where the first and second lower electrodes 113_1 and 113_2 are integrally formed and the third and fourth lower electrodes 113_3 and 113_4 are integrally formed. Alternatively, the first to fourth lower electrodes 113_1, 113_2, 113_3, and 113_4 may have an entirely integral structure. In a case where all the first to fourth lower electrodes 113_1, 113_2, 113_3, and 113_4 are integrally formed, a shared electrode of the integral structure may be formed in a region except for at least contact regions of the switching elements SW1, SW2, SW3, and SW4.

The first upper electrode 114_1 may be formed in the first pixel region PA1. The first upper electrode 114_1 may overlap the first lower electrode 113_1, and may be insulated from the first lower electrode 113_1. The first upper electrode 114_1 may include a first slit pattern 115_1 for forming a domain of the liquid crystal layer 130. The first slit pattern 115_1 may extend in a third direction different from the first and second directions D1 and D2. Here, the third direction may be a direction inclined (e.g., inclined by a predetermined angle) with respect to the first direction D1 or the second direction D2. Slits of the first slit pattern 115_1 may be spaced apart from each other (e.g., spaced apart by a predetermined distance), and may be arranged in parallel. The first upper electrode 114_1 may be electrically coupled to a first switching element SW1.

The first switching element SW1 may be electrically coupled to the first gate line GL1 and the first data line DL1. The first switching element SW1 may be disposed in the first pixel region PA1. The first switching element SW1 may include a gate electrode GE coupled to the first gate line GL1, a source electrode SE coupled to the first data line DL1, an active pattern AP including a semiconductor layer 116a and an ohmic contact layer 116b formed on the semiconductor layer 116a, and a drain electrode DE spaced apart from the source electrode SE. The drain electrode DE may make contact with the first upper electrode 114_1 such that the first upper electrode 114_1 may be electrically coupled to the first switching element SW1. The first upper electrode 114_1 may be a pixel electrode for receiving a pixel voltage from the first data line DL1 according to a switching operation of the first switching element SW1.

Each of the second to fourth upper electrodes 114_2, 114_3, and 114_4 may be substantially similar to the first upper electrode 114_1 except for a position and an extending direction of a slit pattern, and each of the second to fourth switching elements SW2, SW3, and SW4 may be substantially similar to the first switching element SW1 except for an electrical connection. Thus, differences will be briefly described hereinafter, and any repetitive descriptions may be omitted.

The second upper electrode 114_2 may be formed in the second pixel region PA2. The second upper electrode 114_2 may overlap the second lower electrode 113_2, and may be insulated from the second lower electrode 113_2. The second upper electrode 114_2 may include a second slit pattern 115_2 for forming the domain of the liquid crystal layer 130. The second slit pattern 115_2 may extend in a fourth direction different from the first and second directions D1 and D2 and the third direction. For example, the third and fourth directions may be symmetrical to each other with respect to the first gate line GL1, or with respect to the second direction D2. Slits of the second slit pattern 115_2 may be spaced apart from each other (e.g., spaced apart by a predetermined distance), and may be arranged in parallel. The second upper electrode 114_2 may be electrically coupled to a second switching element SW2.

The second switching element SW2 may be electrically coupled to the second gate line GL2 and the first data line DL1. The second switching element SW2 may be located in the second pixel region PA2. Since the second upper electrode 114_2 is electrically coupled to the second switching element SW2, the second upper electrode 114_2 may serve as a pixel electrode for receiving a pixel voltage from the first data line DL1 according to a switching operation of the second switching element SW2.

Sides of the first and second upper electrodes 114_1 and 114_2 that are adjacent to the first and second data lines DL1 and DL2 may extend in an extending direction of the first and second slit patterns 115_1 and 115_2. For example, the sides of the first upper electrode 114_1 may be in parallel with the first slit pattern 115_1, and the sides of the second upper electrode 114_2 may be in parallel with the second slit pattern 115_2.

The second data line DL2 may have a bent structure. In the display substrate 110, the second data line DL2 may have a zigzag pattern where the bent structure is repeated along the first direction D1. For example, the second data line DL2 may include extension portions in parallel with the first and second slit patterns 115_1 and 115_2. That is, the second data line DL2 may include an extension portion extending in the third direction that is substantially the same as the extending direction of the first slit pattern 115_1 between the first and third pixel regions PA1 and PA3, and an extension portion extending in the fourth direction that is substantially the same as the extending direction of the second slit pattern 115_2 between the second and fourth pixel regions PA2 and PA4.

The first data line DL1 may have substantially the same bent structure as the second data line DL2. The first data line DL1 may have a zigzag pattern where the bent structure is repeated along the first direction D1. The first and second data lines DL1 and DL2 may be arranged such that the first and second pixel regions PA1 and PA2 are interposed therebetween. The first data line DL1 may have substantially the same shape as the second data line DL2 such that the first and second data lines DL1 and DL2 are in parallel with each other.

Sides of the first and second upper electrodes 114_1 and 114_2 that are adjacent to the first and second data lines DL1 and DL2 may be in parallel with the first and second data lines DL1 and DL2.

The third upper electrode 114_3 may be formed in the third pixel region PA3 to overlap the third lower electrode 113_3. The third upper electrode 114_3 may include a third slit pattern 115_3 extending in substantially the same direction as the first slit pattern 115_1. Thus, the third upper electrode 114_3 may include the third slit pattern 115_3 extending in the third direction. The third upper electrode 114_3 may be coupled to the third switching element SW3.

The third switching element SW3 may be electrically coupled to the first gate line GL1 and the second data line DL2. The third switching element SW3 may be located in the third pixel region PA3. Since the third upper electrode 114_3 is electrically coupled to the third switching elements SW3, the third upper electrode 114_3 may serve as a pixel electrode for receiving a pixel voltage from the first data line DL2 according to a switching operation of the third switching element SW3.

The fourth upper electrode 114_4 may be formed in the fourth pixel region PA4 to overlap the fourth lower electrode 113_4. The fourth upper electrode 114_4 may include a fourth slit pattern 115_4 extending in substantially the same direction as the second slit pattern 115_2. Thus, the fourth upper electrode 114_4 may include the fourth slit pattern 115_4 extending in the fourth direction. The fourth upper electrode 114_4 may be coupled to the fourth switching element SW4.

The fourth switching element SW4 may be electrically coupled to the second gate line GL2 and the second data line DL2. The fourth switching element SW4 may be located in the fourth pixel region PA4. Since the fourth upper electrode 114_4 is electrically coupled to the fourth switching element SW4, the fourth upper electrode 114_4 may serve as a pixel electrode receiving the pixel voltage from the first data line DL2 according to a switching operation of the fourth switching element SW4.

Since the third upper electrode 114_3 includes the third slit pattern 115_3 that is in parallel with the first slit pattern 115_1 of the first upper electrode 114_1, the third upper electrode 114_3 may form the domain of the liquid crystal layer 130 in a direction that is substantially the same as that of the domain that the first upper electrode 114_1 forms. Further, since the fourth upper electrode 114_4 includes the fourth slit pattern 115_4 that is in parallel with the second slit pattern 115_2 of the second first upper electrode 114_2, the fourth upper electrode 114_4 may form the domain of the liquid layer 130 in a direction that is substantially the same as that of the domain that the second upper electrode 114_2 forms. Thus, adjacent upper electrodes 114_1 and 114_3 that are arranged along the second direction D2 may form the same domain, and adjacent upper electrodes 114_2 and 114_4 that are arranged along the first direction D1 may form different domains.

The first alignment layer 112 may be formed on the first insulating layer 111 on which the first to fourth upper electrodes 114_1, 114_2, 114_3, and 114_4 are formed. The first alignment layer 112 may be treated such that a surface alignment of the first alignment layer 112 is substantially the same with respect to the first to fourth pixel regions PA1, PA2, PA3, and PA4 when viewed from the top. Thus, the first alignment layer 112 in the first to fourth pixel regions PA1, PA2, PA3, and PA4 may be treated to have a single alignment direction. In some example embodiments, the first alignment layer 112 may be formed on an entire surface of the first insulating layer 111, and may have a single alignment direction on the entire surface of the first insulating layer 111. Here, an alignment direction of the first alignment layer 112 may be defined as a direction in which the first alignment layer 112 arranges the liquid crystal molecules LC. The first alignment layer 112 may have the alignment direction by a rubbing treatment or a photo alignment treatment. The first alignment layer 112 may have the alignment direction by various processes different from the above treatments.

The alignment direction of the first alignment layer 112 may be the first direction D1 or the second direction D2. Since the first alignment layer 112 may have substantially the same alignment direction of the first direction D1 or the second direction D2 with respect to the first to fourth pixel regions PA1, PA2, PA3, and PA4, the alignment direction of the first alignment layer 112 may be balanced between extending directions of the first and second slit patterns 115_1 and 115_2. Thus, the liquid crystal molecules LC in the first pixel region PA1 and the second pixel region PA2 may be driven in directions that are symmetrical to each other, and the liquid crystal molecules LC in the third pixel region PA3 and the fourth pixel region PA4 may be driven in directions that are symmetrical to each other. Therefore, in a display device including the display substrate 110 according to example embodiments, a color shift according to a viewing direction may not occur, and a wide viewing angle may be achieved.

Hereinafter, a method of manufacturing the display substrate 110 will be described.

A gate metal layer may be formed on the first insulating layer 111 and may be patterned to form a gate pattern including the first and second gate lines GL1 and GL2 and the gate electrodes GE. The gate metal layer may include aluminum (Al), silver (Ag), molybdenum (Mo), chrome (Cr), etc. The gate insulating layer 117 may be formed on the first insulating substrate 111 on which the gate pattern is formed. For example, the gate insulating layer 117 may be formed from silicon nitride (SiNx), silicon oxide (SiOx), etc.

The active pattern AP may be formed on the gate insulating layer 117 and may overlap the gate electrode GE. The active pattern AP may include a semiconductor layer 116a and the ohmic contact layer 116b formed on the semiconductor layer 116a. Then, a data metal layer may be formed on the first insulating layer 111 on which the active pattern AP is formed, and may be patterned to form a source pattern including the first and second data lines DL1 and DL2, the source electrode SE, and the drain electrode DE. A first passivation layer 118 may be formed on the first insulating layer 111 on which the source pattern is formed.

A first transparent electrode layer may be formed on the first passivation layer 118 and may be patterned to form the first to fourth lower electrodes 113_1, 113_2, 113_3, and 113_4 in the first to fourth pixel regions PA1, PA2, PA3 and PA4.

Then, a second passivation layer 119 may be formed on the first insulating layer 111 on which the first to fourth electrodes 113_1, 113_2, 113_3, and 113_4 are formed. The second passivation layer 119 may cover the first to fourth electrodes 113_1, 113_2, 113_3, and 113_4.

The first and second passivation layers 118 and 119 may be etched to form a contact hole. The drain electrode DE may be partially exposed through the contact hole. A second transparent electrode layer may be formed on the second passivation layer 119 in which the contact hole is formed, and may be patterned to form the first to fourth upper electrodes 114_1, 114_2, 114_3, and 114_4. The first to fourth upper electrodes 114_1, 114_2, 114_3, and 114_4 may have the first to fourth slit patterns 115_1, 115_2, 115_3, and 115_4 for forming the domain, respectively. The first and third slit patterns 115_1 and 115_3 may extend in the third direction, and the second and fourth slit patterns 115_2 and 115_4 may extend in the fourth direction. Here, the third and fourth directions may be different from each other. For example, the third direction may be symmetrical to the fourth direction with respect to the first gate line GL1, for example, the second direction D2.

A preliminary layer may be formed on the first insulating layer 111 on which the first to fourth upper electrodes 114_1, 114_2, 114_3, and 114_4 are formed. The rubbing treatment or the photo-alignment treatment may be performed on a surface of the preliminary layer in the first direction D1 to form the first alignment layer 112. Alternatively, the surface of the preliminary layer may be rubbed in the second direction D2. The first alignment layer 112 may have substantially the same alignment direction with respect to the first to fourth pixel regions PA1, PA2, PA3, and PA4. Alternatively, the display substrate 110 may be manufactured by a different method from the above described processes and the present invention should not be construed as limited to the examples set forth herein.

The opposing substrate 120 may include a second insulating layer 121, a light-blocking pattern BM and color filters CF. The light-blocking pattern BM and the color filters CF may be formed on the second insulating substrate 121. The opposing substrate 120 may further include a second alignment layer 122 for initially aligning the liquid crystal molecules LC.

The light-blocking pattern BM may overlap the switching elements SW1, SW2, SW3 and SW4 and the signal lines GL1, GL2, DL1, and DL2 of the display substrate 110.

The color filters CF may overlap the first to fourth pixel regions PA1, PA2, PA3, and PA4 of the display substrate 110, respectively. The color filters CF may include a red color filter R, a green color filter G and a blue color filter B. Alternatively, the color filters CF may include color filters other than the red, green and blue color filters R, G and B. The opposing substrate 120 may include various color filters CF according to example embodiments.

The second alignment layer 122 may be formed on the second insulating layer 120 on which the light-blocking pattern BM and the color filters are formed. The second alignment layer 122 may face the first display substrate 110, and may be located on a surface of the second insulating substrate 120 adjacent to the liquid crystal layer 130. The second alignment layer 122 may be formed by a method that is substantially the same as the method by which the first alignment layer 112 is formed. For example, the second alignment layer 122 may be treated such that a surface alignment of the second alignment layer 122 is substantially the same in the regions corresponding to the first to fourth pixel regions PA1, PA2, PA3, and PA4 when viewed from the top. Thus, the second alignment layer 112 may have a single alignment direction in an entire surface of the second insulating substrate 120. The second alignment layer 122 may have an alignment direction by a rubbing treatment or a photo alignment treatment. Here, the alignment direction of the second alignment layer 122 may be defined as a direction in which the second alignment layer 122 arranges the liquid crystal molecules LC.

In some example embodiments, the alignment direction of the second alignment layer 122 may be substantially the same as the alignment direction of the first alignment layer 112. The alignment direction of the second alignment layer 122 may be the first direction D1 or the second direction D2. For example, in a case where the alignment direction of the first alignment layer 112 is the first direction D1, the alignment direction of the second alignment layer 122 may be the first direction D1. Alternatively, in a case where the alignment direction of first alignment layer 112 is the second direction D2, the alignment direction of the second alignment layer 122 may be the second direction D2.

The first polarizing plate 102 may be located on an outer surface of the display substrate 110, and a second polarizing plate 104 may be located on an outer surface of the opposing substrate 120.

The first polarizing plate 102 may be located on a lower surface of the display substrate 110, for example, an opposing surface of the first insulating substrate 111 to a surface adjacent to the liquid crystal layer 130. The first polarizing plate 102 may have a polarizing axis that is substantially the same as the alignment direction of the first alignment layer 112 included in the display substrate 110. For example, in a case where the alignment direction of the first alignment layer 112 is the first direction D1, the first polarizing plate 102 may have the polarizing axis of the first direction D1. Alternatively, in a case where the alignment direction of the first alignment layer 112 is the second direction D2, the first polarizing plate 102 may have the polarizing axis of the second direction D2.

The second polarizing plate 104 may be located on an opposing surface of the second insulating substrate 121 to a surface adjacent to the liquid crystal layer 130. A polarizing axis of the second polarizing plate 104 may be perpendicular to the polarizing axis of the first polarizing plate 102. Thus, the second polarizing plate 104 may have the polarizing axis perpendicular to the alignment direction of the second alignment layer 122 included in the opposing substrate 120.

The first to fourth pixels PX1, PX2, PX3, and PX4 of the display panel 100 may be defined by the electric field generating electrodes formed in the first to fourth pixel regions PA1, PA2, PA3, and PA4 and the liquid crystal layer 130. The first pixel PX may be defined by the first lower electrode 113_1, the first upper electrode 114_1 and the liquid crystal layer 130 disposed in the first pixel region PA1. The second pixel PX2 may be defined by the second lower electrode 113_2, the second upper electrode 114_2 and the liquid crystal layer 130 disposed in the second pixel region PA2. The third pixel PX3 may be defined by the third lower electrode 113_3, the third upper electrode 114_3 and the liquid crystal layer 130 disposed in the third pixel region PA3. The fourth pixel PX4 may be defined by the fourth lower electrode 113_4, the fourth upper electrode 114_4 and the liquid crystal layer 130 disposed in the fourth pixel region PA4.

As described above, in the first to fourth pixels PX1, PX2, PX3, and PX4, the first to fourth upper electrodes 114_1, 114_2, 114_3, and 114_4 as the electric field generating electrodes may include the first to fourth slit patterns 115_1, 115_2, 115_3, and 115_4. Each of the first to fourth pixels PX1, PX2, PX3, and PX4 may have a single domain. The domain direction of the first pixel PX1 may be different from that of the second pixel PX2, and the domain direction of the third pixel PX3 may be different from that of the fourth pixel PX4. The domain of the first pixel PX1 may be symmetrical to the domain of the second pixel PX2 with respect to the first gate line GL1, and the domain of the third pixel PX3 may be symmetrical to the domain of the fourth pixel PX4 with respect to the first gate line GL1. Further, the alignment direction of the first alignment layer 112 may be a single direction with respect to the entire display substrate 110. Therefore, light transmittance may be improved by a single domain, and a viewing angle and visibility may be improved by a multi-domain.

In some example embodiments, different gamma reference voltage groups serving as a basis of driving voltages may be used in the first and second pixels PX1 and PX2, and thus a luminance difference that may occur between adjacent row lines having different domains, may be compensated to improve visibility.

Figure 4:
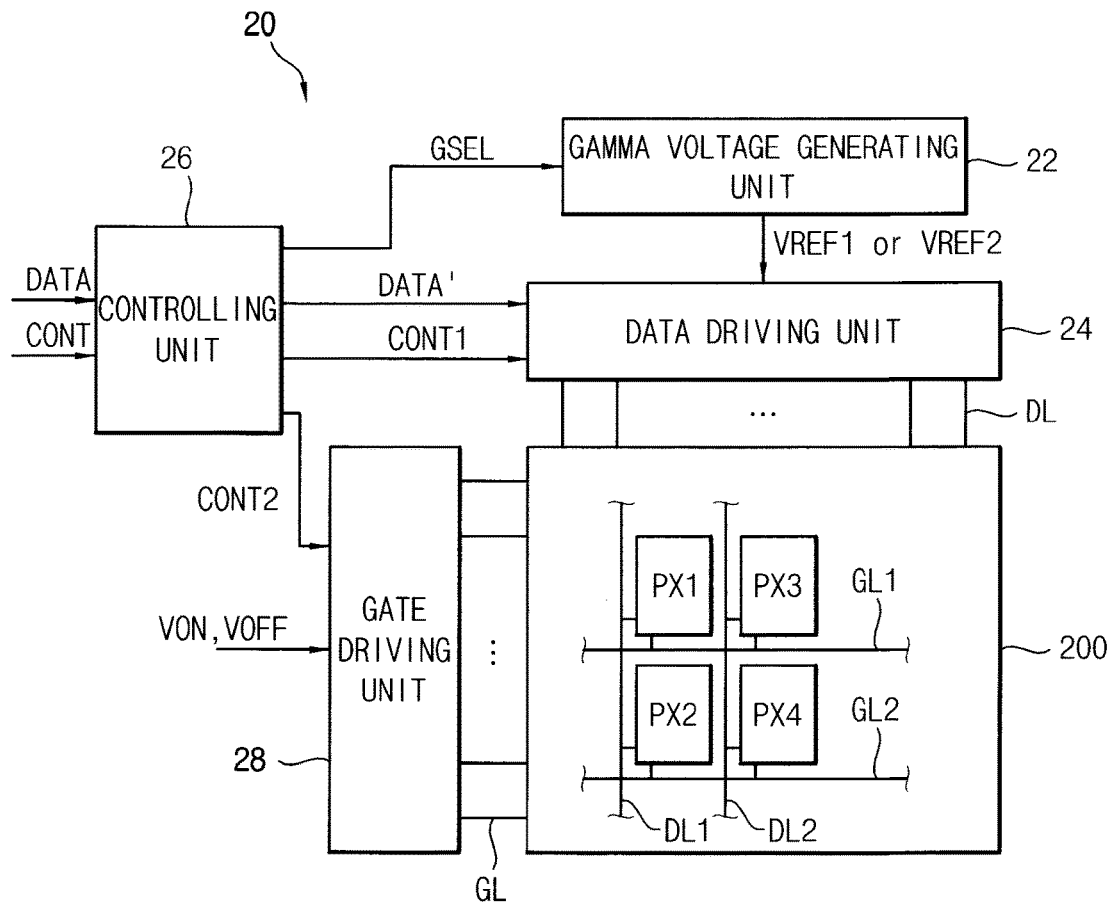
FIG. 4 is a block diagram illustrating a display device in accordance with example embodiments.
Figure 5:
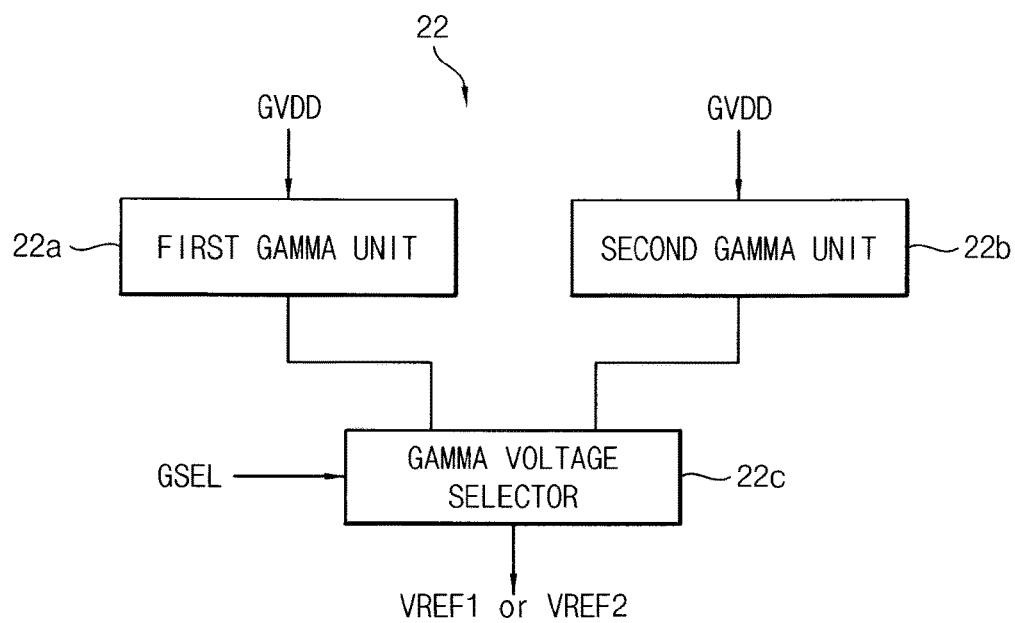
FIG. 5 is a block diagram illustrating a gamma voltage generating unit included in a display device of FIG. 4.
Figure 6:
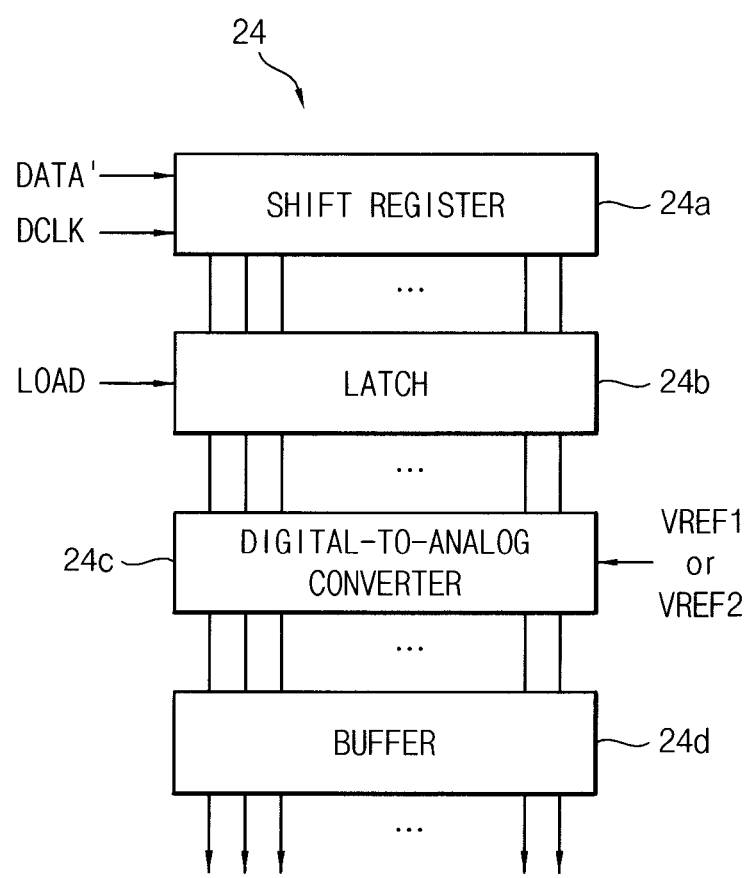
FIG. 6 is a block diagram illustrating a data driving unit included in a display device of FIG. 4.

FIG. 4 is a block diagram illustrating a display device in accordance with example embodiments. FIG. 5 is a block diagram illustrating a gamma voltage generating unit included in a display device of FIG. 4. FIG. 6 is a block diagram illustrating a data driving unit included in a display device of FIG. 4.

Referring to FIGS. 4, 5 and 6, a display device 20 includes a display panel 200, a gamma voltage generating unit 22, a data driving unit 24, a controlling unit 26 and a gate driving unit 28. The gamma voltage generating unit 22, the data driving unit 24, the controlling unit 26, and the gate driving unit 28 may drive the display panel 200 to display an image based on an image signal provided from an image source, such as an external graphics device.

Here, the display device 20 may be substantially the same as the display device 10 illustrated in FIGS. 1 and 2, except for the gamma voltage generating unit 22 and the data driving unit 24. Thus, any repetitive descriptions may be omitted.

The gamma voltage generating unit 22 may generate gamma reference voltage groups VREF1 and VREF2, each including gamma voltages provided to pixels PX1, PX2, PX3, and PX4 of the display panel 200. The gamma voltage generating unit 22 may generate a first gamma reference voltage group VREF1 and a second gamma reference voltage group VREF2. The first and second gamma reference voltage groups VREF1 and VREF2 may have different voltage levels from each other. For example, the first gamma reference voltage group VREF1 may be a group of gamma voltages according to a first gamma curve having a first gamma value, and the second gamma reference voltage group VREF2 may be a group of gamma voltages according to a second gamma curve having a second gamma value different from the first gamma value. Each of the first and second gamma values may be set to compensate for a variation according to domains of the pixels PX1, PX2, PX3, and PX4. For example, the first gamma reference voltage group VREF1 may have voltage levels for compensating for the variation of the first and third pixels PX1 and PX3, and the second gamma reference voltage group VREF2 may have voltage levels for compensating for the variation of the second and fourth pixels PX2 and PX4.

The gamma voltage generating unit 22 may receive a gamma selecting signal GSEL. The gamma selecting signal GSEL may control a selection of the first reference voltage group VREF1 or the second reference voltage group VREF2. Since the first and second gamma reference voltage groups VREF1 and VREF2 may be alternately used in converting pixel data DATA' on a row-by-row basis, the gamma selecting signal GSEL may have substantially the same period as a horizontal start signal STH. Thus, the first and second pixels PX1 and PX2 arranged along the first direction D1 may be sequentially operated, and a selection period of the first and second gamma reference voltage groups VREF1 and VREF2 may be substantially the same as an operating period of the first and second pixels PX1 and PX2.

The gamma voltage generating unit 22 may include a first gamma unit 22a, a second gamma unit 22b, and a gamma voltage selector 22c.

The first gamma unit 22a may receive a power supply voltage, and may divide the power supply voltage to generate the first gamma reference voltage group VREF1. The first gamma unit 22a may include a first resistor-string (e.g., a resistive divider or a series of resistors) for voltage division. The first resistor-string may include a plurality of resistors.

The second gamma unit 22b may receive the power supply voltage, and may divide the power supply voltage to generate the second gamma reference voltage group VREF2. The second gamma unit 22b may include a second resistor-string (e.g., a resistive divider or a series of resistors) for voltage division. The second resistor-string may include a plurality of resistors. The resistors of second resistor-string may have resistances different from resistances of the resistors of the first resistor-string.

The gamma voltage selector 22c may receive the first and second gamma reference voltage group VREF1 and VREF2 from the first and second gamma unit 22a and 22b, and may receive the gamma selecting signal GSEL from the controlling unit 26. The gamma voltage selector 24c may select one of the first and second gamma reference voltage groups VREF1 and VREF2 in response to the gamma selecting signal GSEL, and may output the selected gamma reference voltage group to the data driving unit 24. The gamma voltage selector 24c may select and output the first gamma reference voltage group VREF1 when driving the first pixel PX1, and may select and output the second reference voltage group VREF2 when driving the second pixel PX2. The gamma voltage selector 22c may include a multiplexer for outputting one of the first and second gamma reference voltage group VREF1 and VREF2.

Thus, the gamma voltage generating unit 22 may output one of the first and second gamma reference voltage groups VREF1 and VREF2 at a given time point.

The data driving unit 24 may receive pixel data DATA' and a data control signal CONT1 from the controlling unit 26. The data driving part 14 may convert the pixel data DATA' into analog pixel voltages based on the first and second gamma reference voltage groups VREF1 and VREF2, and may output the pixel voltages to the pixels PX1, PX2, PX3, and PX4 through the data lines DL1 and DL2. A first pixel data corresponding to the first pixel PX1 may be converted into a first pixel voltage based on the first gamma reference voltage group VREF1, and the first pixel voltage may be provided to the first pixel PX1. A second pixel data corresponding to the second pixel PX2 may be converted into a second pixel voltage base on the second gamma reference voltage group VREF2, and the second pixel voltage may be provided to the second pixel PX2. The pixel data DATA' provided from the controlling unit 26 may be a digital signal. Thus, the data driving unit 24 may convert the pixel data DATA' of the digital type into the pixel voltages of the analog type.

The data control signal CONT1 may include a horizontal start signal STH indicating a start of data transmission for a row of the pixels PX1 and PX3 arranged along the second direction D2, a load signal LOAD for applying the pixel voltages to the data lines, and a data clock signal DCLK for timing synchronization. The data control signal CONT1 may further include a polarity inverse signal for inverting a polarity of the pixel voltages.

The data driving unit 24 may include a shift register 24a, a latch 24b, a digital-to-analog converter 24c and a buffer 24d. The data driving unit 24 may be substantially the same as the data driving unit 14 illustrated in FIG. 2, except for the digital-to-analog converter 24c. Thus, any repetitive descriptions may be omitted. The digital-to-analog converter 24c may receive the first gamma reference voltage group VREF1 or the second gamma reference voltage group VREF2 from the gamma voltage generating unit 22. The digital-to-analog converter 24c may convert the pixel data DATA' into the pixel voltages of the analog type based on the first gamma reference voltage group VREF1 or the second gamma reference voltage group VREF2 provided from the gamma voltage generating unit 22, and may output the pixel voltages to the buffer 24d.

Figure 7:
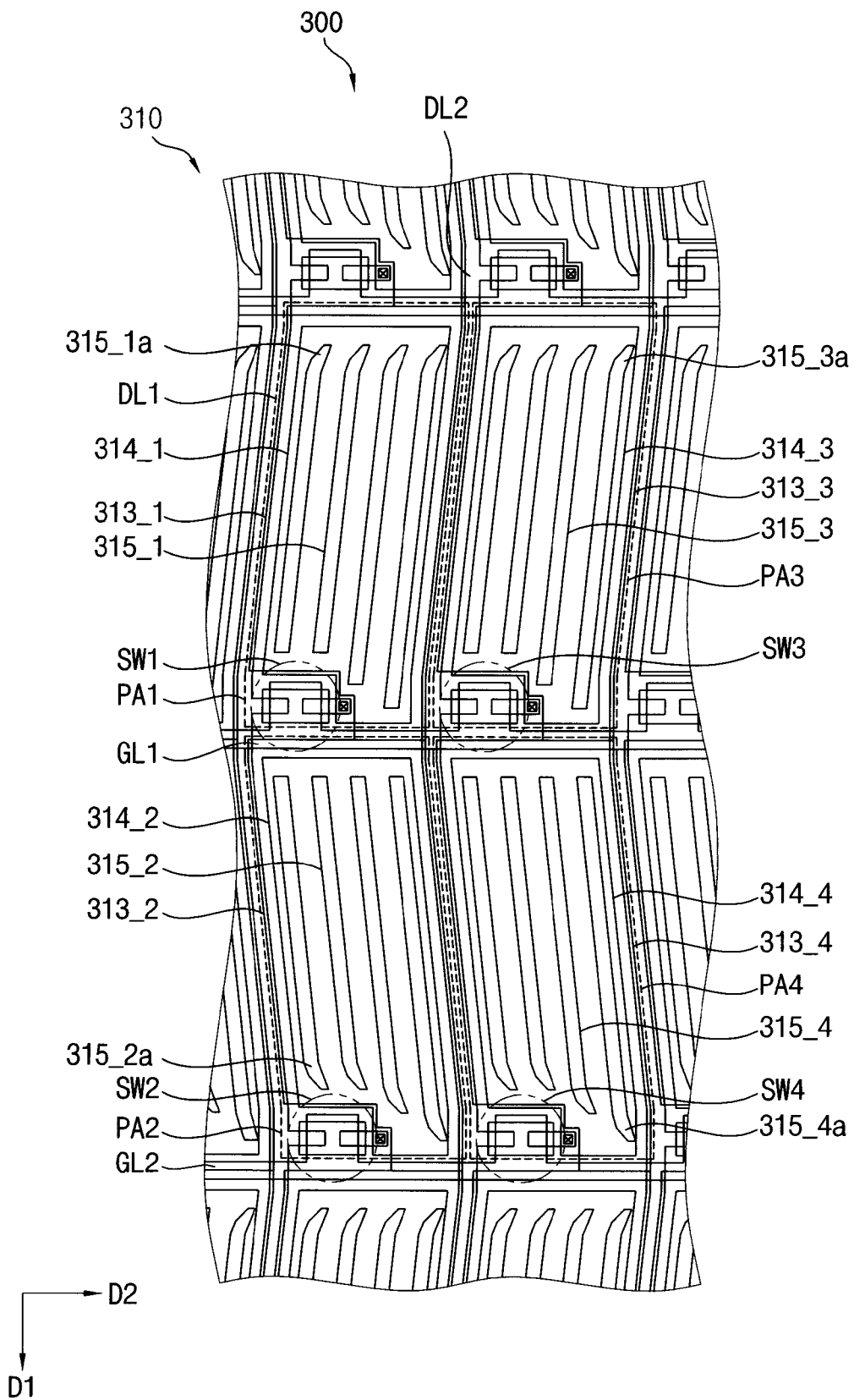
FIG. 7 is a plan view illustrating a display panel in accordance with example embodiments.

FIG. 7 is a plan view illustrating a display panel in accordance with example embodiments.

According to example embodiments, a display panel 300 of FIG. 7 may be included in a display device 10 illustrated in FIGS. 1 and 2, or in a display device 20 illustrated in FIGS. 4, 5 and 6. The display panel 300 may be substantially the same as a display panel 100 illustrated in FIGS. 3A and 3B, except for a display substrate 310. Further, the display substrate 310 in FIG. 7 may be substantially the same as a display substrate 110 illustrated in FIGS. 3A and 3B, except for a structure of a slit pattern in each upper electrode. Thus, differences will be briefly described hereinafter and any repetitive descriptions may be omitted.

Referring to FIG. 7, a display substrate 310 may include an insulating substrate, a plurality of signal lines and electric field generating electrodes for forming an electric field. The display substrate 310 may further include switching elements SW1, SW2, SW3, and SW4 for controlling an operation of the electric field generating electrodes, and a first alignment layer for initially aligning liquid crystal molecules.

The insulating substrate may include first to fourth pixel regions PA1, PA2, PA3, and PA4. The second pixel region PA2 may be located in a first direction D1 from the first pixel region PA1. The third pixel region PA3 may be located in a second direction D2 from the first pixel region PA1, and the fourth pixel region PA4 may be located in the second direction D2 from the second pixel region PA2.

The signal lines may include first and second gate lines GL1 and GL2 and first and second data lines DL1 and DL2. The data lines DL1 and DL2 may cross the gate lines GL1 and GL2. The first and second gate lines GL1 and GL2 may extend in the second direction D2, and the first and second data lines DL1 and DL2 may extend in a zigzag shape along the first direction D1.

A first lower electrode 313_1, a second lower electrode 313_2, a third lower electrode 313_3 and a fourth lower electrode 313_4 may be formed in the first to fourth pixel regions PA1, PA2, PA3, and PA4, respectively. A first upper electrode 314_1, a second upper electrode 314_2, a third upper electrode 314_3 and a fourth upper electrode 314_4 may be formed in the first to fourth pixel regions PA1, PA2, PA3, and PA4, respectively. The first to fourth upper electrodes 314_1, 314_2, 314_3, and 314_4 may overlap the first to fourth lower electrodes 313_1, 313_2, 313_3, and 313_4, respectively.

The first to fourth upper electrodes 314_1, 314_2, 314_3, and 314_4 may have a first slit pattern 315_1, a second slit pattern 315_2, a third slit pattern 315_3 and fourth slit pattern 315_4, respectively. The first and third slit patterns 315_1 and 315_3 may extend in a third direction different from the first and second directions D1 and D2. The second and fourth slit patterns 315_2 and 315_4 may extend in a fourth direction different from the first and second directions D1 and D2 and the third direction.

The first slit pattern 315_1 formed in the first upper electrode 314_1 may include a first curved portion 315_1a located at an edge portion of the first slit pattern 315_1 and having an inclined angle with respect to the second direction D2. The inclined angle of the first curved portion 315_1a to the second direction D2 may decrease in a direction toward an end of the first slit pattern 315_1. Thus, the first curved portion 315_1a may have a curved structure in which the edge portion of the first slit pattern 315_1 is bent toward the second direction D2. If the edge portion of the first slit pattern 315_1a has an angular structure, an electrical distortion may occur in a region corresponding to the edge portion of the first slit pattern 315_1, so that an aperture ratio may be reduced. However, the electrical distortion may be reduced or minimized by the first curved portion 315_1a having the curved structure, and the aperture ratio may be improved in the region corresponding to the edge portion of the first slit pattern 315_1.

The second slit pattern 315_2 formed in the second upper electrode 314_2 may include a second curved portion 315_2a located at an edge portion of the second slit pattern 315_2a and having an inclined angle with respect to the second direction D2. The second curved portion 315_2a may have a curved structure in which the edge portion of the second slit pattern 315_2 is bent toward the second direction D2. The electrical distortion may be reduced or minimized by the second curved portion 315_2a.

Similarly, the third slit pattern 315_3 may include a third curved portion 315_3a such that an edge portion of the third slit pattern 315_3 is bent toward the second direction D2.

The third curved portion 315_3a may have substantially the same structure as the first curved portion 315_1a.

The fourth slit pattern 315_4 includes a fourth curved portion 315_4a such that an edge portion of the fourth slit pattern 315_4 is bent toward the second direction D2. The fourth curved portion 315_4a may have substantially the same structure as the second curved portion 315_2a.

The first and second curved portions 3151a and 315_2a may have a symmetric structure to each other with respect to the first gate line GL1. The first curved portion 315_1a may be located at the edge portion of the first slit pattern 315_1 which is distant from the first gate line GL1, and the second curved portion 315_2a may be located at the edge portion of the second slit pattern 315_2 which is distant from the first gate line GL1. The third and fourth curved portions 315_3a and 315_4a may be substantially the same as the first and second curved portions 315_1a and 315_2a, respectively.

As described above, each curved portion 315_1a, 315_2a, 315_3a and 315_4a may be located at one edge portion of a corresponding slit pattern 315_1, 315_2, 315_3, and 315_4. Alternatively, the curved portion 315_1a, 315_2a, 315_3a, and 315_4a may be located at both edge portions of the corresponding slit pattern 315_1, 315_2, 315_3, and 315_4.

Figure 8:
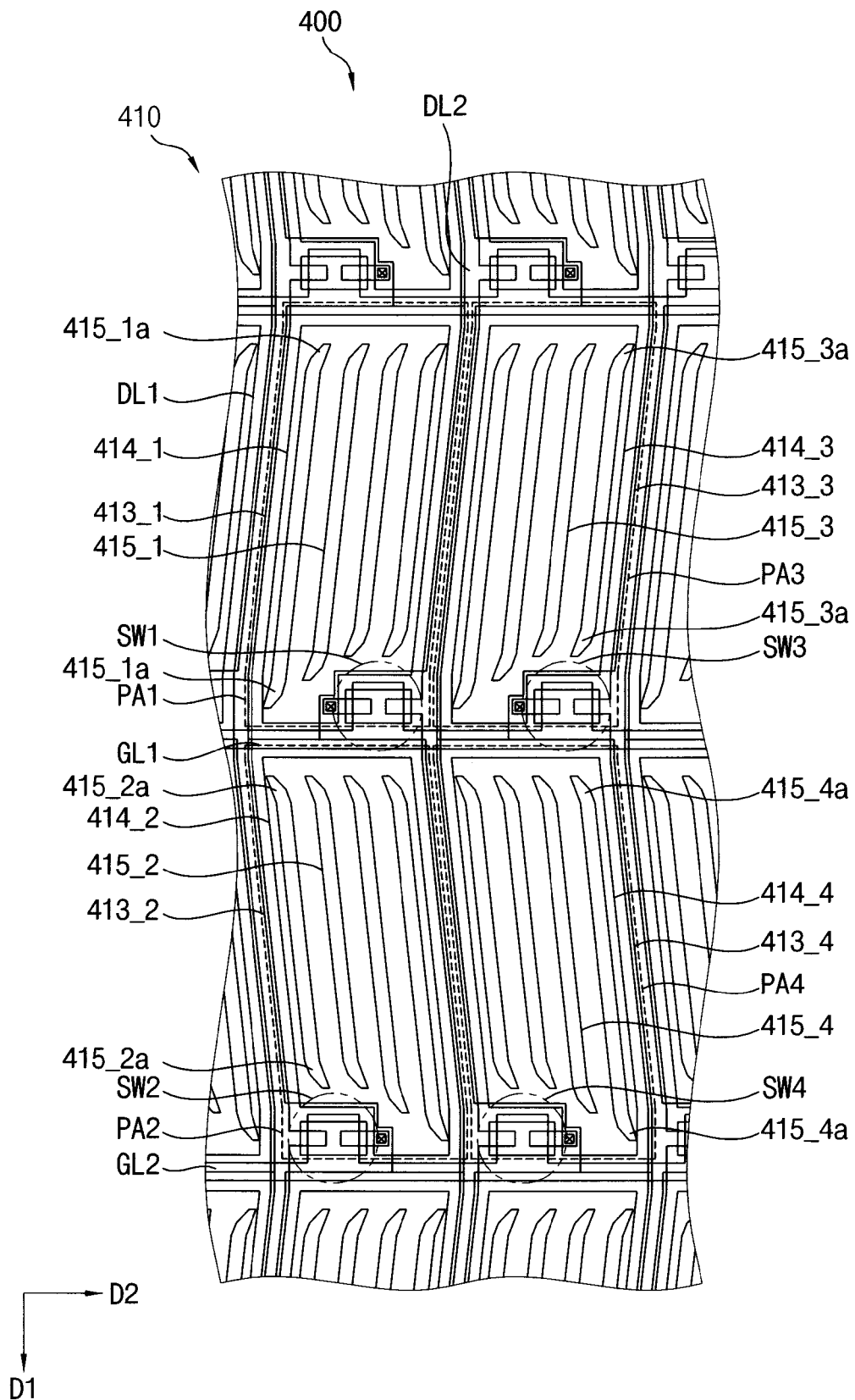
FIG. 8 is a plan view illustrating a display panel in accordance with example embodiments.

FIG. 8 is a plan view illustrating a display panel in accordance with example embodiments.

According to example embodiments, a display panel 400 of FIG. 8 may be included in the display device 10 illustrated referring to FIGS. 1 and 2, or in the display device 20 illustrated in FIGS. 4, 5 and 6. The display panel 400 may be substantially the same as the display panel 100 illustrated in FIGS. 3A and 3B, except for a display substrate 410. Further, the display substrate 410 in FIG. 8 may be substantially the same as the display substrate 110 illustrated in FIGS. 3A and 3B, except for a structure of a slit pattern in each upper electrode and an arrangement of switching elements. Thus, differences will be briefly described hereinafter and any repetitive descriptions may be omitted.

Referring to FIG. 8, a display substrate 410 may include an insulating substrate, a plurality of signal lines and electric field generating electrodes for forming an electric field. The plurality of signal lines and the electric field generating electrodes may be formed on the insulating substrate. The display substrate 410 may further include switching elements SW1, SW2, SW3, and SW4 for controlling an operation of the electric field generating electrodes, and a first alignment layer for initially aligning the liquid crystal molecules.

The insulating substrate may have a first pixel region PA1, a second pixel region PA2, a third pixel region PA3 and a fourth pixel region PA4. The second pixel region PA2 may be located in a first direction D1 from the first pixel region PA1. The third pixel region PA3 may be located in a second direction D2 from the first pixel region PA1, and the fourth pixel region PA4 may be located in the second direction D2 from the second pixel region PA2.

The signal lines may include first and second gate lines GL1 and GL2 and first and second data lines DL1 and DL2. The data lines DL1 and DL2 may cross the gate lines GL1 and GL2. The first and second gate lines GL1 and GL2 may extend in the second direction D2, The first and second data lines DL1 and DL2 may extend in a zigzag shape along the first direction D1.

A first lower electrode 413_1, a second lower electrode 413_2, a third lower electrode 413_3, and a fourth lower electrode 413_4 may be formed in the first to fourth pixel regions PA1, PA2, PA3, and PA4, respectively. A first upper electrode 414_1, a second upper electrode 414_2, a third upper electrode 414_3 and a fourth upper electrode 414_4 may be formed in the first to fourth pixel regions PA1, PA2, PA3, and PA4, respectively. The first to fourth upper electrodes 414_1, 414_2, 414_3, and 414_4 may overlap the first to fourth lower electrodes 413_1, 413_2, 413_3, and 413_4, respectively.

The first to fourth upper electrodes 414_1, 414_2, 414_3, and 414_4 may have a first slit pattern 415_1, a second slit pattern 415_2, a third slit pattern 415_3, and a fourth slit pattern 415_4, respectively. The first and third slit patterns 415_1 and 415_3 may extend in a third direction different from the first and second directions D1 and D2. The second and fourth slit patterns 415_2 and 415_4 may extend in a fourth direction different from the first and second directions D1 and D2 and the third direction.

The first slit pattern 415_1 formed in the first upper electrode 414_1 may include a first curved portion 415_1a located at both edge portions of the first slit pattern 415_1. That is, the first curved portion 415_1a may be located at a first edge portion of the first slit pattern 415_1, and may be located at a second edge portion of the first slit pattern 415_1 opposed to the first edge portion. The first curved portion 415_1a may have an inclined angle with respect to the second direction D2, and the inclined angle of the first curved portion 415_1a to the second direction D2 may decrease in a direction toward an end of the first slit pattern 415_1. Thus, the first curved portion 415_1a may have a curved structure in which the first and second edge portions of the first slit pattern 415_1 are bent toward the second direction D2. A function of the first curved portion 415_1a is substantially the same as that of the first curved portion 315_1a illustrated in FIG. 7.

The second slit pattern 415_2 formed in the second upper electrode 414_2 may include a second curved portion 415_2a located at each of a first edge portion of the second slit pattern 415_2 and a second edge portion of the second slit pattern 415_2 opposed to the first edge portion. The second curved portion 415_2a may have an inclined angle with respect to the second direction D2, and the inclined angle of the second curved portion 415_2a to the second direction D2 may decrease in a direction toward an end of the second slit pattern 415_2. Thus, the second curved portion 415_2a may have a curved structure in which the first and second edge portions of the second slit pattern 415_2 are bent toward the second direction D2. A function of the second curved portion 415_2a may be substantially the same as that of the second curved portion 315_2a illustrated in FIG. 7.

The third slit pattern 415_3 formed in the third upper electrode 414_3 may include a third curved portion 415_3a located at each of a first edge portion of the third slit pattern 415_3 and a second edge portion of the third slit pattern 415_3 opposed to the first edge portion. The third slit pattern 415_3 may extend in the same direction as the first slit pattern 415_1, and the third curved portion 415_3a may have substantially the same structure as the first curved portion 415_1a.

The fourth slit pattern 415_4 formed in the fourth upper electrode 415_4a may include a fourth curved portion 415_4a located at each of a first edge portion of the fourth slit pattern 415_4 and a second edge portion of the fourth slit pattern 415_4 opposed to the first edge portion. The fourth slit pattern 415_4 may extend in the same direction as the second slit pattern 415_2, and the fourth curved portion 415_4a may have substantially the same structure as the second curved portion 415_2a.

The first and second curved portions 415_1a and 415_2a may have symmetric patterns to each other with respect to the first gate line GL1. In addition, the third and fourth curved portions 415_3a and 415_4a may have symmetric patterns to each other with respect to the first gate line GL1

The first upper electrode 414_1 may be electrically coupled to the first switching element SW1. The switching element SW1 may be coupled to the first gate line GL1 and the second data line DL2. The first and second data lines DL1 and DL2 may be in parallel with each other, and the first and second pixel regions PA1 and PA2 may be located between the first and second data lines DL1 and DL2.

The second upper electrode 414_2 may be electrically coupled to the second switching element SW2. The switching element SW2 may be coupled to the second gate line GL2 and the first data line DL1.

As described above, the first switching element SW1 may be coupled to the second data line DL2, and the second switching element SW2 may be coupled to the first data line DL1 that is different from the second data line DL2 to which the first switching element SW1 is coupled. In addition, the first switching element SW1 may be located adjacently to the second data line DL2, and the second switching element SW2 may be located adjacently to the first data line DL1. Thus, an arrangement of the first and second switching elements SW1 and SW2 may be symmetric. For example, the first switching element SW1 may be located at a right portion adjacent to the second data line DL2 in the first pixel region PA1, and the second switching element SW2 may be located at a left portion adjacent to the first data line DL1 in the second pixel region PA2.

The third and fourth upper electrodes 414_3 and 414_4 may be electrically coupled to third and fourth switching elements SW3 and SW4. The third and fourth switching elements SW3 and SW4 may have substantially the same structure as the first and second switching elements SW1 and SW2.

As described above, an arrangement of the first to fourth switching elements SW1, SW2, SW3 and SW4 may be changed along the first direction D1. Therefore, light-blocking regions may be alternately disposed, so that the display device including the display panel 400 may have balanced visibility in the left and right viewing directions.

Figure 9:
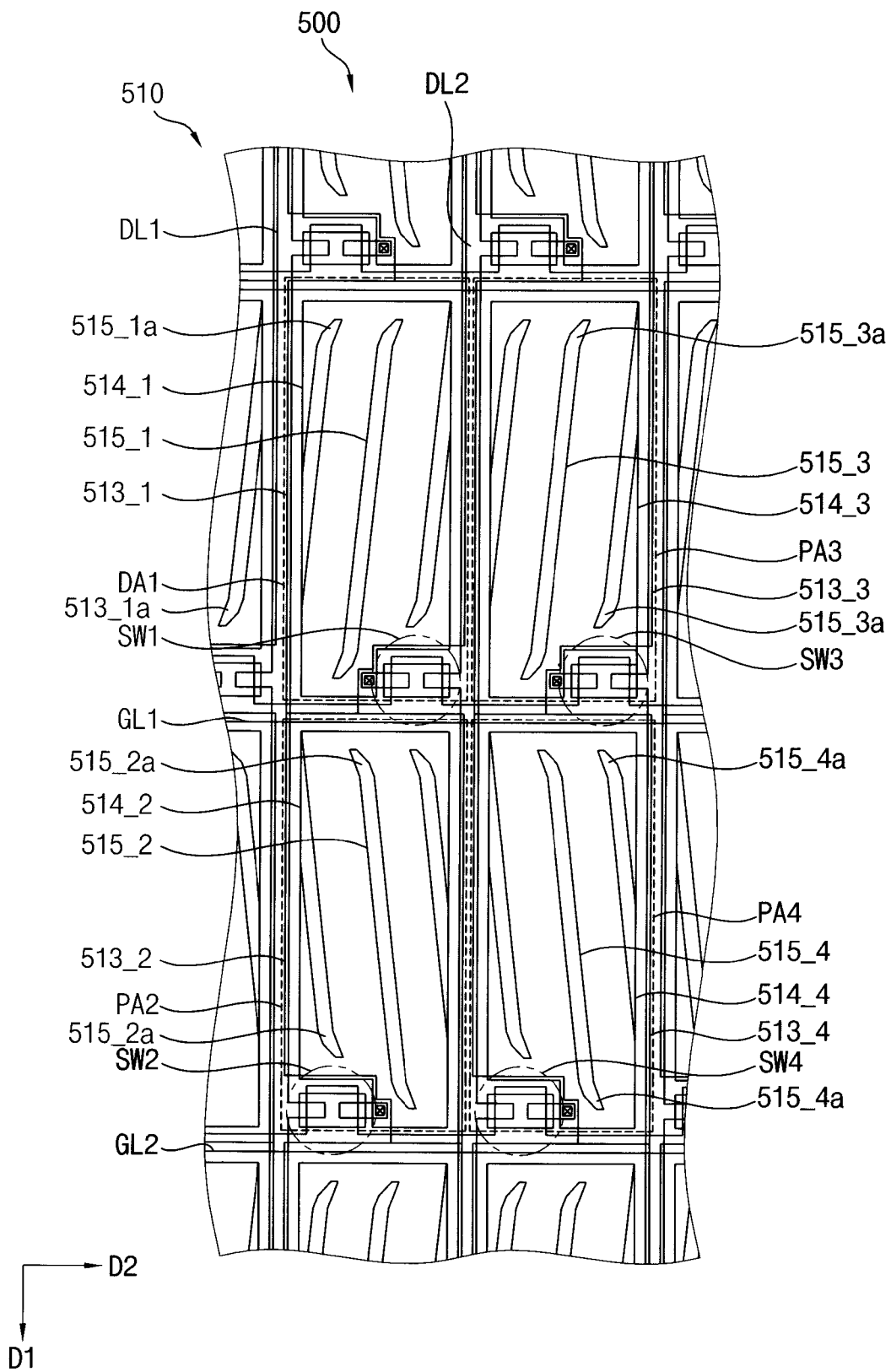
FIG. 9 is a plan view illustrating a display panel in accordance with example embodiments.

FIG. 9 is a plan view illustrating a display panel in accordance with example embodiments.

According to example embodiments, a display panel 500 of FIG. 9 may be included in the display device 10 illustrated in FIGS. 1 and 2 or in the display device 20 illustrated in FIGS. 4, 5 and 6. The display panel 500 may be substantially the same as the display panel 100 illustrated in FIGS. 3A and 3B, except for at least one element of a display substrate 510. Thus, differences will be briefly described hereinafter and any repetitive descriptions may be omitted.

Referring to FIG. 9, a display substrate 510 may include an insulating substrate, a plurality of signal lines and electric field generating electrodes for forming an electric field. The plurality of signal lines and the electric field generating electrodes may be formed on the insulating substrate. The display substrate 510 may further include switching elements SW1, SW2, SW3, and SW4 for controlling an operation of the electric field generating electrodes, and a first alignment layer for initially aligning the liquid crystal molecules.

The insulating substrate may have a first pixel region PA1, a second pixel region PA2, a third pixel region PA3, and a fourth pixel region PA4. The second pixel region PA2 may be located in a first direction D1 from the first pixel region PA1. The third pixel region PA3 may be located in a second direction D2 from the first pixel region PA1, and the fourth pixel region PA4 may be located in the second direction D2 from the second pixel region PA2.

The signal lines may include first and second gate lines GL1 and GL2 and first and second data lines DL1 and DL2. The data lines DL1 and DL2 may cross the gate lines GL1 and GL2. The first and second gate lines GL1 and GL2 may extend in the second direction D2. The first and second data lines DL1 and DL2 may extend in a zigzag shape along the first direction D1.

A first lower electrode 513_1, a second lower electrode 513_2, a third lower electrode 513_3, and a fourth lower electrode 513_4 may be formed in the first to fourth pixel regions PA1, PA2, PA3, and PA4, respectively. A first upper electrode 514_1, a second upper electrode 514_2, a third upper electrode 514_3, and a fourth upper electrode 514_4 may be formed in the first to fourth pixel regions PA1, PA2, PA3, and PA4, respectively. The first to fourth upper electrodes 514_1, 514_2, 514_3, and 514_4 may overlap the first to fourth lower electrodes 513_1, 513_2, 513_3, and 513_4, respectively.

The first to fourth upper electrodes 514_1, 514_2, 514_3, and 514_4 may have a first slit pattern 515_1, a second slit pattern 515_2, a third slit pattern 515_3, and fourth slit pattern 515_4, respectively. The first and third slit pattern 515_1 and 515_3 may extend in a third direction different from the first and second directions D1 and D2. The second and fourth slit pattern 515_2 and 515_4 may extend in a fourth direction different from the first and second directions D1 and D2 and the third direction. The third and fourth directions may be symmetrical to each other with respect to the first gate line GL1.

The first slit pattern 515_1 formed in the first upper electrode 514_1 may include a first curved portion 515_1a located at each of a first edge portion of the first slit pattern 515_1 and a second edge portion of the first slit pattern 515_1 opposed to the first edge portion. The first curved portion 515_1a may have an inclined angle with respect to the second direction D2, and the inclined angle of the first curved portion 515_1a to the second direction D2 may decrease in a direction toward an end of the first slit pattern 515_1. Thus, the first curved portion 515_1a may have a curved structure in which the first and second edge portions of the first slit pattern 515_1 are bent toward the second direction D2. A function of the first curved portion 515_1a may be substantially the same as that of the first curved portion 315_1a illustrated in FIG. 7.

The second slit pattern 515_2 formed in the second upper electrode 514_2 may include a second curved portion 515_2a located at each of a first edge portion of the second slit pattern 515_2 and a second edge portion of the second slit pattern 515_2 opposed to the first edge portion. The second curved portion 515_2a may have an inclined angle with respect to the second direction D2, and the inclined angle of the second curved portion 515_2a to the second direction D2 may decrease in a direction toward an end of the second slit pattern 515_2. Thus, the second curved portion 515_2a may have a curved structure in which the first and second edge portions of the second slit pattern 515_2 are bent toward the second direction D2. A function of the second curved portion 515_2a may be substantially the same as that of the second curved portion 315_2a illustrated in FIG. 7.

The third slit pattern 515_3 formed in the third upper electrode 514_3 may include a third curved portion 515_3a located at each of a first edge portion of the third slit pattern 515_3 and a second edge portion of the third slit pattern 515_3 opposed to the first edge portion. The third slit pattern 515_3 may extend in the same direction as the first slit pattern 515_1, and the third curved portion 515_3a may have substantially the same structure as the first curved portion 515_1a.

The fourth slit pattern 515_4 formed in the fourth upper electrode 515_4a may include a fourth curved portion 515_4a located at each of a first edge portion of the fourth slit pattern 515_4 and a second edge portion of the fourth slit pattern 515_4 opposed to the first edge portion. The fourth slit pattern 515_4 may extend in the same direction as the second slit pattern 515_2, and the fourth curved portion 515_4a may have substantially the same structure as the second curved portion 515_2a.

The first and second curved portions 515_1a and 515_2a may have symmetric patterns to each other with respect to the first gate line GL1. In addition, the third and fourth curved portions 515_3a and 515_4a may have symmetric patterns to each other with respect to the first gate line GL1

The first upper electrode 514_1 may be electrically coupled to the first switching element SW1. The switching element SW1 may be coupled to the first gate line GL1 and the second data line DL2. The first and second data lines DL1 and DL2 may be in parallel with each other, and the first and second pixel regions may be located between the first and second data lines DL1 and DL2.

The second upper electrode 514_2 may be electrically coupled to the second switching element SW2. The switching element SW2 may be coupled to the second gate line GL2 and the first data line DL1.

As described above, the first switching element SW1 may be coupled to the second data line DL2, and the second switching element SW2 may be coupled to the first data line DL1 that is different from the second data line DL2 to which the first switching element SW1 is coupled. Thus, an arrangement of the first and second switching elements SW1 and SW2 are substantially the same as that of the first and second switching elements SW1 and SW2 illustrated in FIG. 8.

The third and fourth upper electrodes 514_3 and 514_4 may be electrically coupled to third and fourth switching elements SW3 and SW4, respectively. The third and fourth switching elements SW3 and SW4 may have substantially the same structure as the first and second switching elements SW1 and SW2.

Although the first and second slit patterns 115_1 and 115_2 extend in the third and fourth directions, sides of the first and second upper electrodes 514_1 and 514_2 that are adjacent to the first and second data lines DL1 and DL2, may extend in parallel with the first and second data lines DL1 and DL2. Thus, each of the first and second upper electrodes 514_2 and 514_2 may have a rectangular shape. In addition, each of the third and fourth upper electrodes 514_3 and 514_4 may have a rectangular shape.

As described above, each of the first to fourth pixel regions PA1, PA2, PA3 and PA4 may have a rectangular shape, and the first to fourth lower electrodes 513_1, 513_2, 513_3, and 513_4 and the first to fourth upper electrodes 514_1, 514_2, 514_3, and 514_4 as electric field generating electrodes may have shapes corresponding to the first to fourth pixel regions PA1, PA2, PA3, and PA4. Thus, the pixels may be easily divided. In addition, since the electric field are formed in an inclined direction via the first to fourth slit patterns 515_1, 515_2, 515_3, and 515_4, domains in the first and second pixel regions PA1 and PA2 may be formed in different directions, thereby improving a viewing angle, visibility and an aperture ratio.

Figure 10:
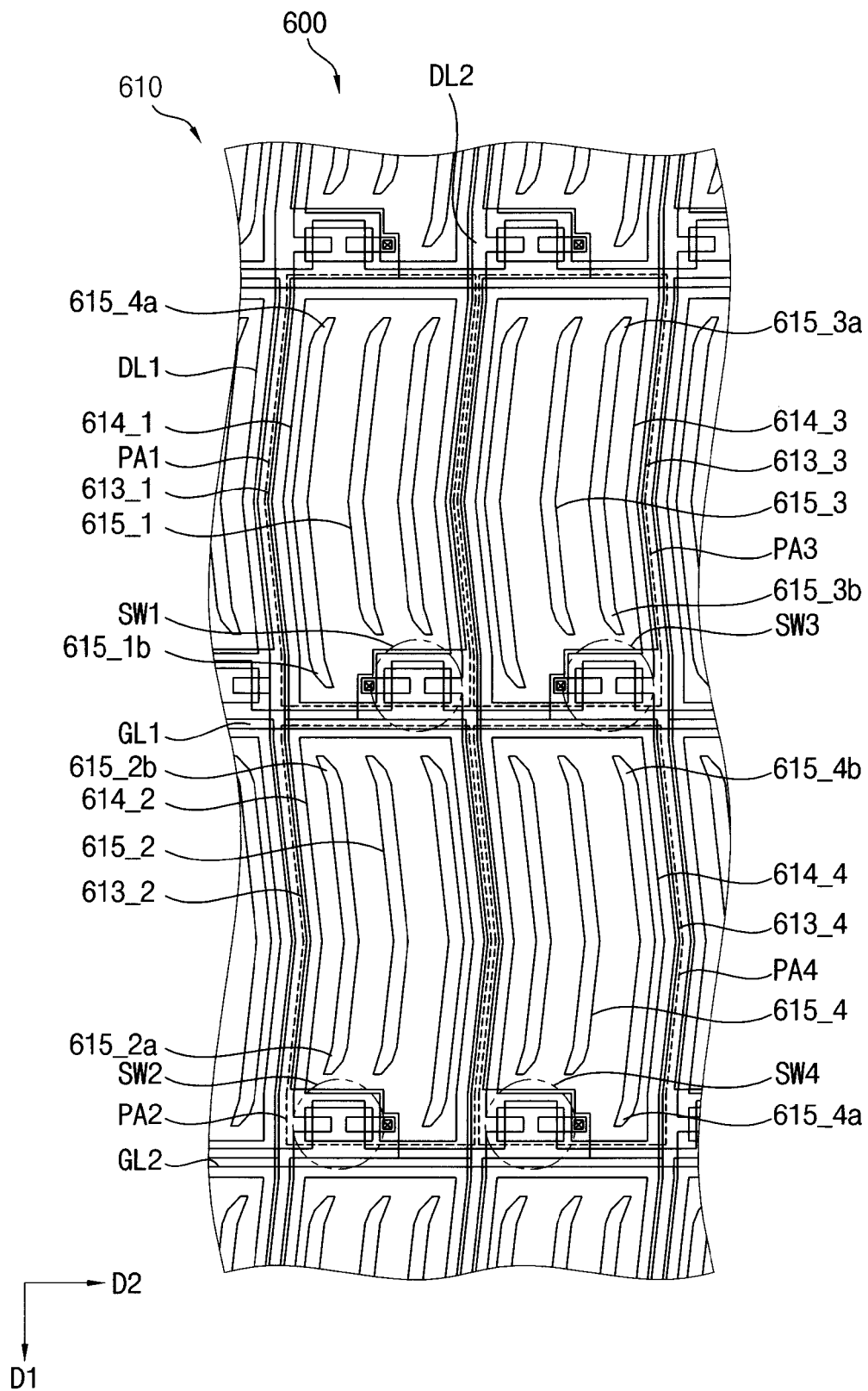
FIG. 10 is a plan view illustrating a display panel in accordance with example embodiments.

FIG. 10 is a plan view illustrating a display panel in accordance with example embodiments.

According to example embodiments, a display panel 600 of FIG. 10 may be included in the display device 10 illustrated in FIGS. 1 and 2, or in the display device 20 illustrated in FIGS. 4, 5 and 6. The display panel 600 may be substantially the same as the display panel 100 illustrated in FIGS. 3A and 3B, except for at least one element of a display substrate 610. Thus, differences will be briefly described hereinafter and any repetitive descriptions may be omitted.

Referring to FIG. 10, a display substrate 610 may include an insulating substrate, a plurality of signal lines, and electric field generating electrodes for forming an electric field. The plurality of signal lines and the electric field generating electrodes may be formed on the insulating substrate. The display substrate 610 may further include switching elements SW1, SW2, SW3, and SW4 for controlling an operation of the electric field generating electrodes, and a first alignment layer for initially aligning the liquid crystal molecules.

The insulating substrate may have a first pixel region PA1, a second pixel region PA2, a third pixel region PA3, and a fourth pixel region PA4. The second pixel region PA2 may be located in a first direction D1 from the first pixel region PA1. The third pixel region PA3 may be located in a second direction D2 from the first pixel region PA1, and the fourth pixel region PA4 may be located in the second direction D2 from the second pixel region PA2.

The signal lines may include first and second gate lines GL1 and GL2 and first and second data lines DL1 and DL2. The data lines DL1 and DL2 may cross the gate lines GL1 and GL2. The first and second gate lines GL1 and GL2 may extend in the second direction D2. The first and second data lines DL1 and DL2 may extend in a zigzag shape along the first direction D1, and the first and second data lines DL1 and DL2 may be bent at least once in a region between two adjacent pixel regions PX1 and PX3.

A first lower electrode 613_1, a second lower electrode 613_2, a third lower electrode 613_3, and a fourth lower electrode 613_4 may be formed in the first to fourth pixel regions PA1, PA2, PA3, and PA4, respectively. A first upper electrode 614_1, a second upper electrode 614_2, a third upper electrode 614_3, and a fourth upper electrode 514_4 may be formed in the first to fourth pixel regions PA1, PA2, PA3 and PA4, respectively. The first to fourth upper electrodes 614_1, 614_2, 614_3, and 614_4 may overlap the first to fourth lower electrodes 613_1, 613_2, 613_3, and 613_4, respectively.

The first to fourth upper electrodes 614_1, 614_2, 614_3, and 614_4 may have a first slit pattern 615_, a second slit pattern 615_2, a third slit pattern 615_3 and fourth slit pattern 615_4, respectively.

The first slit pattern 615_1 may include an extension portion extending in a third direction different from the first and second directions D1 and D2, and an extension portion extending in a fourth direction different from the first and second directions D1 and D2 and the third direction. For example, the first slit pattern 615_1 may sequentially extend in the third direction, and in the fourth direction toward the first direction D1. Thus, the first slit pattern 615_1 may include a first extension portion extending in the third direction, a second extension portion extending in the fourth direction, and a curved portion between the first and second extension portions. The third and fourth directions may be symmetric with respect to the second direction D2.

The second slit pattern 615_2 may include extension portions extending in the fourth direction and the third direction. For example, the second slit pattern 615_2 may sequentially extend in the fourth direction, and in the third direction toward the first direction D1. Thus, the second slit pattern 615_2 may have a curved structure opposite to the first slit pattern 615_1

The third slit pattern 615_3 may have a structure in parallel with the first slit pattern 615_1, and the fourth slit pattern 615_4 may have a structure in parallel with the second slit pattern 615_2. Thus, the third and fourth slit patterns 615_3 and 615_4 may have the same structure as the first and second slit patterns 615_1 and 615_2, respectively.

The first slit pattern 615_1 may include a first curved portion 615_1a located at a first edge portion of the first slit pattern 615_1, and a second curved portion 615_1b located at a second edge portion of the first slit pattern 615_1. The first curved portion 615_1a may have an inclined angle that is smaller than an angle between the second direction D2 and the third direction, and the second curved portion 615_1b may have an inclined angle that is smaller than an angle between the second direction D2 and the fourth direction.

The second slit pattern 615_2 may include a third curved portion 615_2a located at a first edge portion of the second slit pattern 615_2 and a fourth curved portion 615_2b located at a second edge portion of the second slit pattern 615_2. The third curved portion 615_2a may have an inclined angle that is smaller than an angle between the second direction D2 and the third direction, and the fourth curved portion 615_2b may have an inclined angle that is smaller than an angle between the second direction D2 and the fourth direction.

As illustrated in FIG. 10, the first edge portion of the first slit pattern 615_1 in which the first curved portion 615_1a is formed, may be opposite to the first edge portion of the second slit pattern 615_2 in which the second curved portion 615_2a is formed. That is, the first edge portions of the first and second slit patterns 615_1 and 615_2 may be distal edge portions of the first and second slit patterns 615_1 and 615_2.

An edge portion of the third slit pattern 615_3 may include a fifth curved portion 615_3a, and the other edge portion of the third slit pattern 615_3 may include a sixth curved portion 615_3b. The fifth and sixth curved portions 615_3a and 615_3b may be substantially the same as the first and second curved portions 615_1a and 615_1b.

An edge portion of the fourth slit pattern 615_4 may include a seventh curved portion 615_4a, and the other edge portion of the fourth slit pattern 615_4 may include an eighth curved portion 615_4b. The seventh and eighth curved portions 615_4a and 615_4b may be substantially the same as the third and fourth curved portions 615_2a and 615_2b.

The first upper electrode 614_1 may be electrically coupled to the first switching element SW1. The first switching element SW1 may be electrically coupled to the first gate line GL1 and the second data line DL2.

The second upper electrode 614_2 may be electrically coupled to the second switching element SW2. The second switching element SW2 may be coupled to the second gate line GL2 and the first data line DL1.

As described above, the first and second switching elements SW1 and SW2 are coupled to the different data lines DL1 and DL2. For example, the first switching element SW1 may be located at the right region of the first pixel region PA1 adjacent to the second data line DL2, and the second switching element SW2 may be located at the left region of the second pixel region PA2 adjacent to the first data line DL1.

The third and fourth upper electrodes 614_3 and 614_4 may be electrically coupled to third and fourth switching elements SW3 and SW4. The third and fourth switching elements SW3 and SW4 may have substantially the same structure as the first and second switching elements SW1 and SW2.

The first and second pixel regions PA1 and PA2 may be located between the first and second data lines DL1 and DL2. Each of the first and second data lines DL1 and DL2 may include a first extension portion in parallel with the first slit pattern 615_1, and a second extension portion in parallel with the second slit pattern 615_2. Thus, each of the first and second data lines DL1 and DL2 may have a zigzag structure.

As described above, each of the first and second pixel regions PA1 and PA2 may form double domains, and the domains of the first and second pixel regions PA1 and PA2 may be symmetrical to each other with respect to the first gate line GL1. Accordingly, a viewing angle, visibility and an aperture ratio may be improved.

Figure 11A:
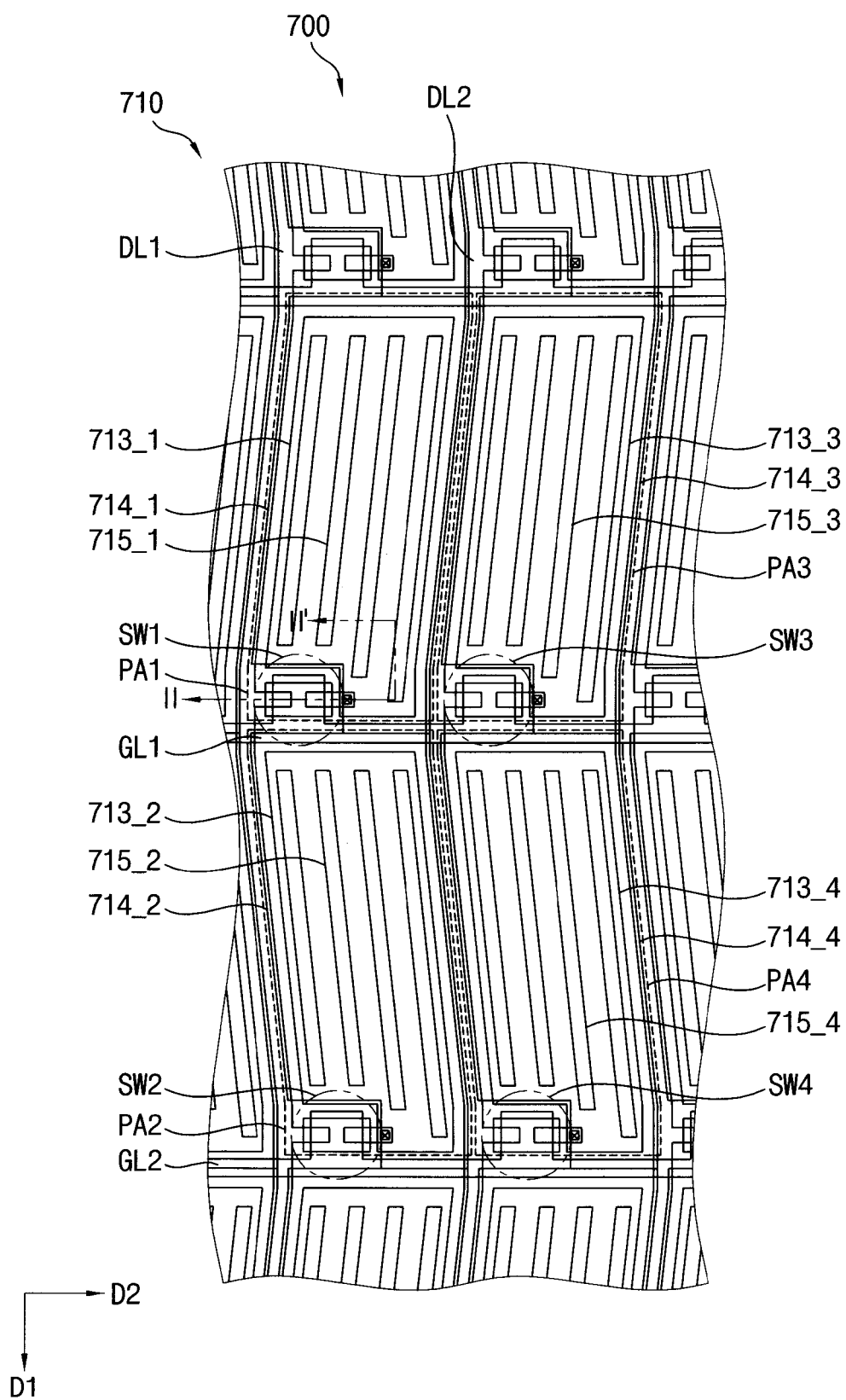
FIG. 11A is a plan view illustrating a display panel in accordance with example embodiments.
Figure 11B:
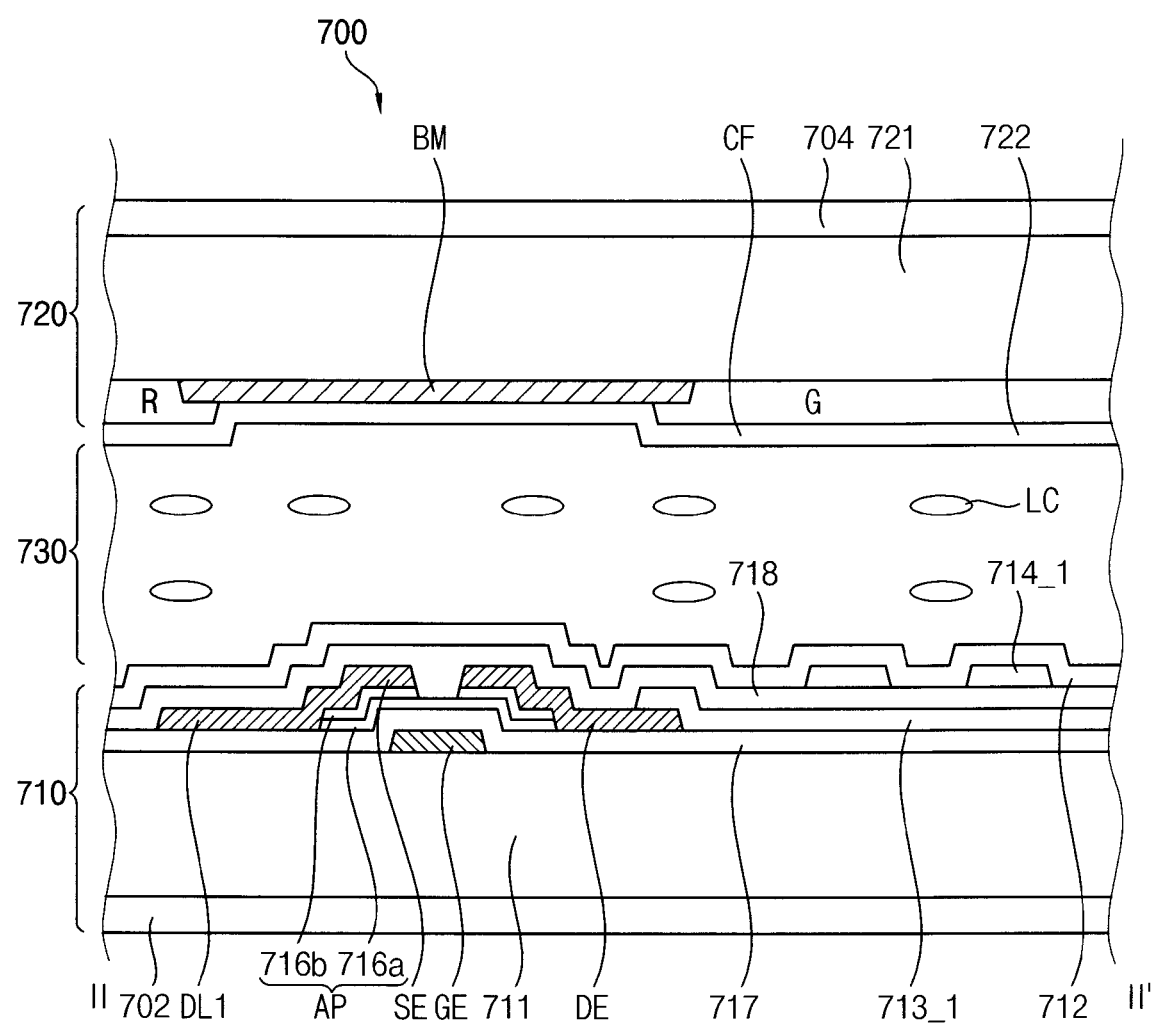
FIG. 11B is a cross-sectional view of an example embodiment of a display panel taken along a line II-II' of FIG. 11A.

FIG. 11A is a plan view illustrating a display panel in accordance with example embodiments. FIG. 11B is a cross-sectional view of an example embodiment of a display panel taken along a line II-II' of FIG. 11A.

According to example embodiments, a display panel 700 of FIGS. 11A and 11B may be included in the display device 10 illustrated in FIGS. 1 and 2 or in the display device 20 illustrated in FIGS. 4, 5 and 6. The display panel 700 may be substantially the same as the display panel 100 illustrated in FIGS. 3A and 3B, except for at least one element of a display substrate 710. In the display substrate 710 illustrated in FIGS. 11A and 11B, lower electrodes may be electrically coupled to switching elements. Thus, differences will be briefly described hereinafter and any repetitive descriptions will be omitted.

Referring to FIGS. 11A and 11B, a display panel 700 includes a display substrate 710, an opposing substrate 720 and a liquid crystal layer 730. The opposing substrate 720 may face the display substrate 710, and the liquid crystal layer 730 may be interposed between the display substrate 710 and the opposing substrate 720. The display panel 700 may further include a first polarizing plate 702 and a second polarizing plate 704.

The display substrate 710 may include an insulating substrate 711, a plurality of signal lines and electric field generating electrodes for forming an electric field. The display substrate 710 may further include switching elements SW1, SW2, SW3, and SW4 for controlling an operation of the electric field generating electrodes, and a first alignment layer 712 for initially aligning the liquid crystal molecules.

The insulating substrate 711 may include first to fourth pixel regions PA1, PA2, PA3, and PA4. The second pixel region PA2 may be located in a first direction D1 from the first pixel region PA1. The third pixel region PA3 may be located in a second direction D2 from the first pixel region PA1, and the fourth pixel region PA4 may be located in the second direction D2 from the second pixel region PA2.

The signal lines may include first and second gate lines GL1 and GL2 and first and second data lines DL1 and DL2. The data lines DL1 and DL2 may cross the gate lines GL1 and GL2. The first and second gate lines GL1 and GL2 may extend in the second direction D2, and the first and second data lines DL1 and DL2 may extend in a zigzag shape along the first direction D1.

The display substrate 710 may include first to fourth lower electrodes 713_1, 713_2, 713_3, and 713_4 and first to fourth upper electrodes 714_1, 714_2, 714_3, and 714_4.

The first to fourth lower electrodes 713_1, 713_2, 713_3, and 713_4 may be formed in the first to fourth pixel regions PA1, PA2, PA3, and PA4. The first to fourth lower electrodes 713_1, 713_2, 713_3, and 713_4 may be insulated from the first and second gate lines GL1 and GL2 by forming a gate insulating layer 717 between the first to fourth lower electrodes 713_1, 713_2, 713_3, and 713_4, and the first and second gate lines GL1 and GL2. In some example embodiments, the first to fourth lower electrodes 713_1, 713_2, 713_3, and 713_4 may not overlap adjacent signal lines. In this case, sides of the first to fourth lower electrodes 713_1, 713_2, 713_3, and 713_4 may be spaced apart from the signal lines (e.g., spaced apart by a predetermined distance). In other example embodiments, the first to fourth lower electrodes 713_1, 713_2, 713_3, and 713_4 may partially overlap adjacent gate lines to form a storage capacitor. In still other example embodiments, to form the storage capacitor, storage electrodes (not shown) may be formed to overlap the first to fourth lower electrodes 713_1, 713_2, 713_3, and 713_4. The storage electrodes may be electrically coupled to a storage line that is in parallel with a gate line, and may be formed in a metal layer including the gate line.

The first lower electrode 713_1 may be electrically coupled to the first switching element SW1. The first switching element SW1 may be electrically coupled to the first gate line GL1 and the first data line DL1. The first lower electrode 713_1 may be a pixel electrode for receiving a pixel voltage from the first data line DL1 according to a switching operation of the first switching element SW1.

The second lower electrode 713_2 may be electrically coupled to the second switching element SW2. The second switching element SW2 may be electrically coupled to the second gate line GL2 and the first data line DL1. The second lower electrode 713_2 may be a pixel electrode for receiving a pixel voltage from the first data line DL1 according to a switching operation of the second switching element SW2.

The third and fourth lower electrodes 713_3 and 714_4 may be electrically coupled to the second data line DL2 through the third and fourth switching elements SW3 and SW4, respectively.

Each of the first to fourth lower electrodes 713_1, 713_2, 713_3, and 713_4 may have a plate shape.

The first to fourth upper electrodes 714_1, 714_2, 714_3, and 714_4 may be formed in the first to fourth pixel regions PA1, PA2, PA3, and PA4, respectively. The first to fourth upper electrodes 714_1, 714_2, 714_3, and 714_4 may overlap the first to fourth lower electrodes 713_1, 713_2, 713_3, and 713_4, respectively. A first passivation layer 718 may be located between the first to fourth upper electrodes 714_1, 714_2, 714_3, and 714_4, and the first to fourth lower electrodes 713_1, 713_2, 713_3, and 713_4 to insulate the first to fourth upper electrodes 714_1, 714_2, 714_3, and 714_4 from the first to fourth lower electrodes 713_1, 713_2, 713_3, and 713_4.

The first to fourth upper electrodes 714_1, 714_2, 714_3, and 714_4 may have first to fourth slit patterns 715_1, 715_2, 715_3, and 715_4, respectively. The first to fourth slit patterns 715_1, 715_2, 715_3, and 715_4 may form the domain of the liquid crystal. The first to fourth slit patterns 715_1, 715_2, 715_3, and 715_4 may be substantially the same as the first to fourth slit patterns 115_1, 115_2, 115_3, and 115_4 illustrated in FIGS. 3A and 3B.

Each of the first and fourth upper electrodes 714_1, 714_2, 714_3, and 714_4 may be a common electrode for receiving a common voltage. In some example embodiments, the first to fourth upper electrodes 714_1, 714_2, 714_3, and 714_4 may have a stripe structure such that the first and second upper electrodes 714_1 and 714_2 may have an integral structure and the third and fourth upper electrodes 714_3 and 714_4 may have an integral structure. In other example embodiments, the first through fourth upper electrodes 714_1, 714_2, 714_3, and 714_4 may have an entirely integral structure. In still other example embodiments, the first through fourth upper electrodes 714_1, 714_2, 714_3, and 714_4 may have a separate structure (e.g., an island structure) where the common voltage is applied through separate common electrode lines.

The display panel 700 may form the domain of the liquid crystal using the first to fourth slit patterns 715_1, 715_2, 715_3, and 715_4 formed in the first to fourth upper electrodes 714_1, 714_2, 714_3, and 714_4. In the display panel 700 according to example embodiments, a single domain may be formed in each pixel region, and the domains of adjacent pixel regions located in the first direction D1 may have different directions (e.g., symmetrical directions with respect to the second direction D2). Accordingly, the display panel 700 according to example embodiments may form at least two single domains having different directions, thereby improving an aperture ratio, a viewing angle and visibility The first alignment layer 712 may be formed on the first insulating layer 711 on which the first to fourth upper electrodes 714_1, 714_2, 714_3, and 714_4 are formed. The first alignment layer 712 in the first to fourth pixel regions PA1, PA2, PA3, and PA4 may be treated to have a single alignment direction such that a surface alignment of the first alignment layer 712 is substantially the same with respect to the first to fourth pixel regions PA1, PA2, PA3, and PA4 when viewed from the top. An alignment direction of the first alignment layer 712 may be defined as a direction in which the first alignment layer 712 arranges the liquid crystal molecules LC. The alignment direction of the first alignment layer 712 may be the first direction D1 or the second direction D2. The first alignment layer 712 may be formed on a surface of the first insulating substrate 711 adjacent to the liquid crystal layer 730.

The opposing substrate 720 may include a second insulating layer 721, a light-blocking pattern BM, and color filters CF. The light-blocking pattern BM and the color filters may be formed on the second insulating substrate 721. The opposing substrate 720 may further include a second alignment layer 722 for initially aligning the liquid crystal molecules LC.

The light-blocking pattern BM may overlap the switching elements SW1, SW2, SW3, and SW4, and the signal lines GL1, GL2, DL1, and DL2 of the display substrate 710

The color filters CF may overlap the first to fourth pixel regions PA1, PA2, PA3, and PA4 of the display substrate 710, respectively. Each of the color filters CF may be one of three color filters. In some example embodiments, the color filters CF may include a white color filter (or a transparent filter) as well as the three color filters.

The second alignment layer 722 may face the first display substrate 710, and may be located on a surface of the second insulating substrate 721 adjacent to the liquid crystal layer 730. The second alignment layer 722 may be treated to have a single alignment direction such that a surface alignment of the second alignment layer 722 is substantially the same in the regions corresponding to the first to fourth pixel regions PA1, PA2, PA3, and PA4 when viewed from the top. The second alignment layer 722 may have an alignment direction by a rubbing treatment or a photo alignment treatment. The alignment direction of the second alignment layer 722 may be substantially the same as the alignment direction of the first alignment layer 712.

The first polarizing plate 702 may be located on a lower surface of the display substrate 710, for example, an opposing surface of the first insulating substrate 711, to a surface adjacent to the liquid crystal layer 730. The first polarizing plate 702 may have a polarizing axis that is substantially the same as the alignment direction of the first alignment layer 712 included in the display substrate 710.

The second polarizing plate 704 may be located on an upper surface of the opposing substrate 720, for example, an opposing surface of the second insulating substrate 721, to a surface adjacent to the liquid crystal layer 730. A polarizing axis of the second polarizing plate 704 may be substantially perpendicular to the polarizing axis of the first polarizing plate 702.

Figure 12:
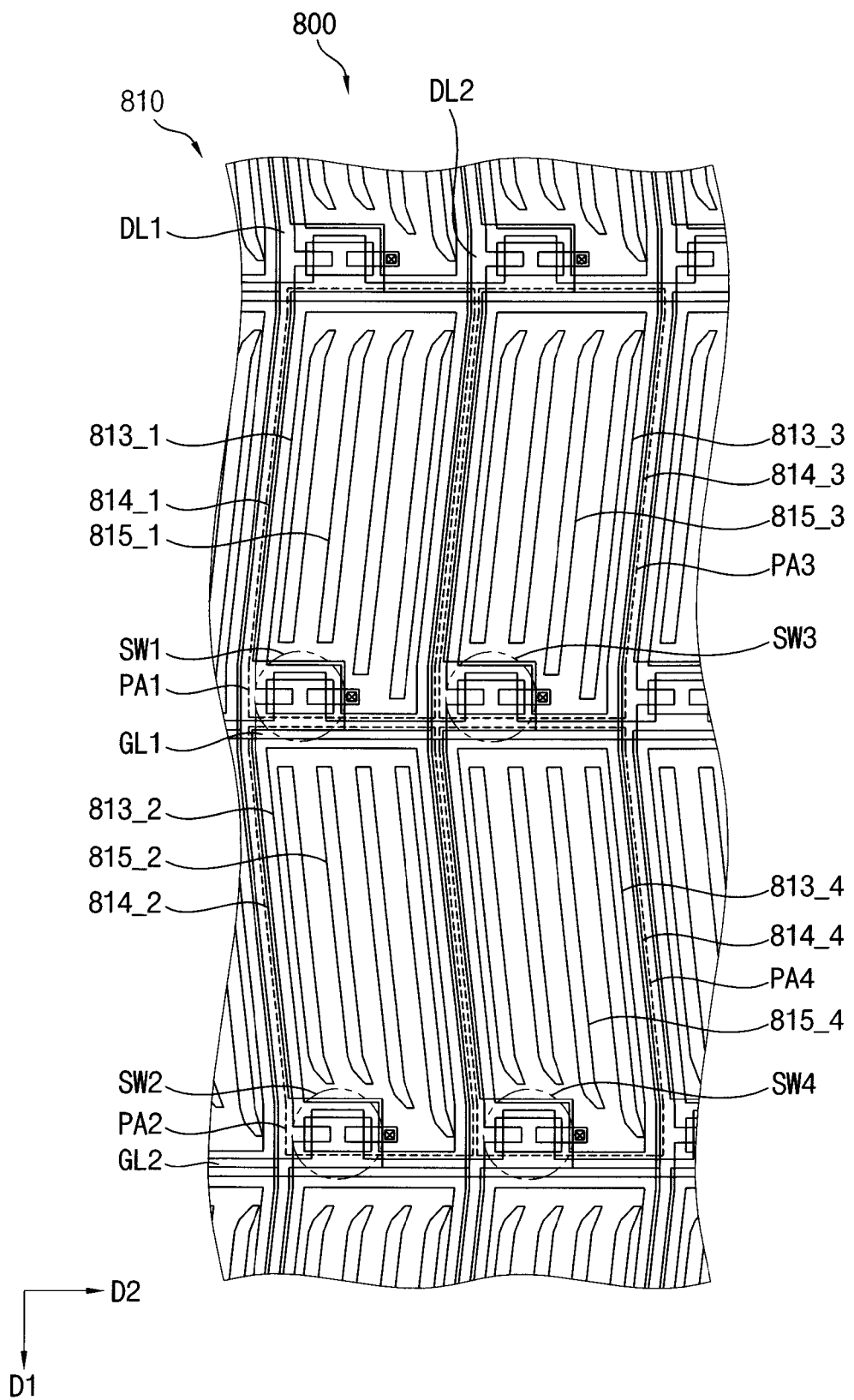
FIG. 12 is a plan view illustrating a display panel in accordance with example embodiments.

FIG. 12 is a plan view illustrating a display panel in accordance with example embodiments.

According to example embodiments, a display panel 800 of FIG. 12 may be included in the display device 10 illustrated in FIGS. 1 and 2, or in the display device 20 illustrated in FIGS. 4, 5 and 6. The display panel 800 may be substantially the same as the display panel 700 illustrated in FIGS. 11A and 11B, except for a display substrate 810. Further, the display substrate 810 illustrated in FIG. 12 may be substantially the same as the display substrate 710 illustrated in FIGS. 11A and 11B, except for a structure of a slit pattern in each upper electrode. Thus, differences will be briefly described hereinafter and any repetitive descriptions may be omitted.

Referring to FIG. 12, a display substrate 810 includes an insulating substrate, a plurality of signal lines, electric field generating electrodes, a plurality of switching elements SW1, SW2, SW3, and SW4, and a first alignment layer.

The insulating substrate may include first to fourth pixel regions PA1, PA2, PA3, and PA4. The second pixel region PA2 may be located in a first direction D1 from the first pixel region PA1. The third pixel region PA3 may be located in a second direction D2 from the first pixel region PA1, and the fourth pixel region PA4 may be located in the second direction D2 from the second pixel region PA2.

The signal lines may include first and second gate lines GL1 and GL2, and first and second data lines DL1 and DL2. The data lines DL1 and DL2 may cross the gate lines GL1 and GL2. The first and second gate lines GL1 and GL2 may extend in the second direction D2, and the first and second data lines DL1 and DL2 may extend in a zigzag shape along the first direction D1.

The display substrate 810 may include first to fourth lower electrodes 813_1, 813_2, 813_3, and 813_4, and first to fourth upper electrodes 814_1, 814_2, 814_3, and 814_4. The first to fourth lower electrodes 813_1, 813_2, 813_3, and 813_4 may be formed in the first to fourth pixel regions PA1, PA2, PA3, and PA4, respectively. The first to fourth upper electrode 814_1, 814_2, 814_3, and 814_4 may be formed in the first to fourth pixel regions PA1, PA2, PA3, and PA4, respectively. The first to fourth upper electrodes 814_1, 814_2, 814_3, and 814_4 may overlap the first to fourth lower electrodes 813_1, 813_2, 813_3, and 813_4, respectively.

The first lower electrode 813_1 may be electrically coupled to the first switching element SW1. The first switching element SW1 may be electrically coupled to the first gate line GL1 and the first data line DL1. The first lower electrode 813_1 may be a pixel electrode for receiving a pixel voltage.

The second lower electrode 813_2 may be electrically coupled to the second switching element SW2. The second switching element SW2 may be electrically coupled to the second gate line GL2 and the first data line DL1. The second lower electrode 813_2 may be a pixel electrode for receiving a pixel voltage.

Each of third and fourth lower electrodes 813_3 and 813_4 may be electrically coupled to the second data line DL2 through the third and fourth switching elements SW3 and SW4. Each of the third and fourth lower electrodes 813_3 and 813_4 may be a pixel electrode for receiving a pixel voltage.

The first to fourth upper electrodes 814_1, 814_2, 814_3, and 814_4 have the first to fourth slit patterns 815_1, 815_2, 815_3, and 815_4 for forming the domain of the liquid crystal, respectively. The first to fourth slit patterns 815_1, 815_2, 815_3, and 815_4 may be substantially the same as the first to fourth slit patterns 315_1, 315_2, 315_3, and 315_4 illustrated in FIG. 7.

Each of the first through fourth upper electrodes 814_1, 814_2, 814_3, and 814_4 may be a common electrode for receiving a common voltage. According to example embodiments, the first through fourth upper electrodes 814_1, 814_2, 814_3, and 814_4 may have a stripe structure, an integral structure, a separate structure, etc.

Figure 13:
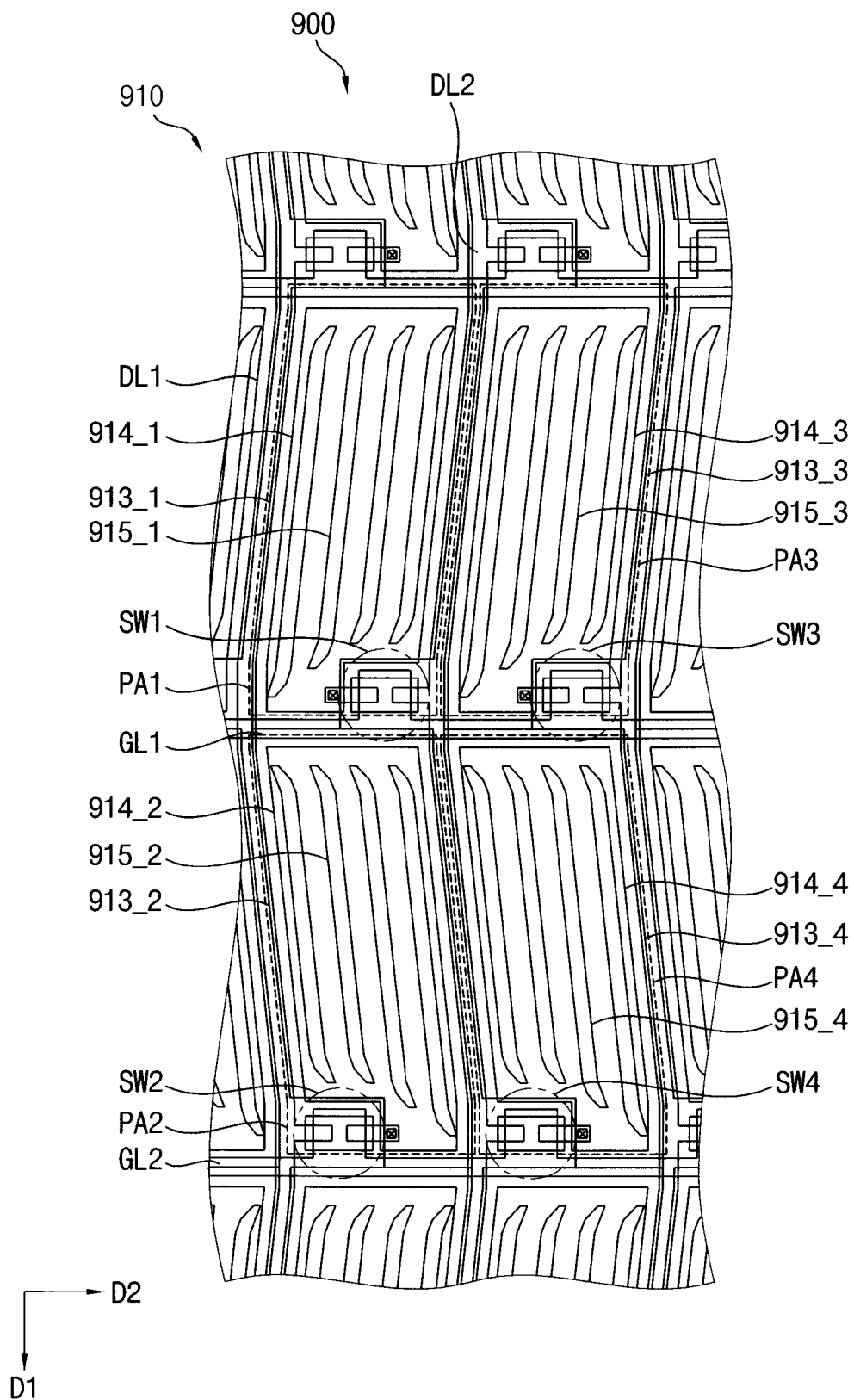
FIG. 13 is a plan view illustrating a display panel in accordance with example embodiments.

FIG. 13 is a plan view illustrating a display panel in accordance with example embodiments;

According to example embodiments, a display panel of FIG. 13 may be included in the display device 10 illustrated in FIGS. 1 and 2, or in the display device 20 illustrated in FIGS. 4, 5 and 6. The display panel 900 may be substantially the same as the display panel 700 illustrated in FIGS. 11A and 11B, except for a display substrate 910. Further, the display substrate 910 in FIG. 13 may be substantially the same as the display substrate 710 illustrated in FIGS. 11A and 11B, except for a structure of a slit pattern in each upper electrode and an arrangement of switching elements. Thus, differences will be briefly described hereinafter and any repetitive descriptions may be omitted.

Referring to FIG. 13, a display substrate 910 may include an insulating substrate, a plurality of signal lines, electric field generating electrodes, a plurality of switching elements SW1, SW2, SW3, and SW4, and a first alignment layer.

The insulating substrate may include first to fourth pixel regions PA1, PA2, PA3, and PA4. The second pixel region PA2 may be located in a first direction D1 from the first pixel region PA1. The third pixel region PA3 may be located in a second direction D2 from the first pixel region PA1, and the fourth pixel region PA4 may be located in the second direction D2 from the second pixel region PA2.

The signal lines may include first and second gate lines GL1 and GL2, and first and second data lines DL1 and DL2. The data lines DL1 and DL2 may cross the gate lines GL1 and GL2. The first and second gate lines GL1 and GL2 may extend in the second direction D2, and the first and second data lines DL1 and DL2 may extend in a zigzag shape along the first direction D1. The first and second data lines DL1 and DL2 may be in parallel with each other, and the first and second pixel regions PA1 and PA2 may be located between the first and second data lines DL1 and DL2.

The display substrate 910 may include first to fourth lower electrodes 913_1, 913_2, 913_3, and 913_4, and first to fourth upper electrodes 914_1, 914_2, 914_3, and 914_4. The first to fourth lower electrodes 913_1, 913_2, 913_3, and 913_4 may be formed in the first to fourth pixel regions PA1, PA2, PA3, and PA4, respectively. The first to fourth upper electrode 914_1, 914_2, 914_3, and 914_4, may be formed in the first to fourth pixel regions PA1, PA2, PA3, and PA4, respectively. The first to fourth upper electrodes 914_1, 914_2, 914_3, and 914_4 may overlap the first to fourth lower electrodes 913_1, 913_2, 913_3, and 913_4, respectively.

The first lower electrode 913_1 may be electrically coupled to the first switching element SW1. The first switching element SW1 may be electrically coupled to the first gate line GL1 and the second data line DL2. The first lower electrode 913_1 may be a pixel electrode for receiving a pixel voltage.

The second lower electrode 913_2 may be electrically coupled to the second switching element SW2. The second switching element SW2 may be electrically coupled to the second gate line GL2 and the first data line DL1. The second lower electrode 913_2 may be a pixel electrode for receiving a pixel voltage.

As described above, the first and second switching elements SW1 and SW2 may be coupled to the different data lines DL1 and DL2. In addition, the first switching element SW1 may be located adjacently to the second data line DL2, and the second switching element SW2 may be located adjacently to the first data line DL1. Thus, an arrangement of the first and second switching elements SW1 and SW2 may be symmetric.

The third and fourth lower electrodes 913_3 and 913_4 may be electrically coupled to the third and fourth switching elements SW3 and SW4. The third and fourth switching elements SW3 and SW4 may have substantially the same structure as the first and second switching elements SW1 and SW2.

The first to fourth upper electrodes 914_1, 914_2, 914_3, and 914_4 may have first to fourth slit patterns 915_1, 915_2, 915_3, and 915_4, respectively. The first to fourth slit patterns 915_1, 915_2, 915_3, and 915_4 may be substantially the same as the first to fourth slit patterns 415_1, 415_2, 415_3, and 415_4 illustrated in FIG. 8.

Each of the first to fourth upper electrodes 914_1, 914_2, 914_3, and 914_4, may be a common electrode for receiving a common voltage. According to example embodiments, the first and fourth upper electrodes 914_1, 914_2, 914_3, and 914_4 may have a stripe structure, an integral structure, a separate structure, etc.

Figure 14:
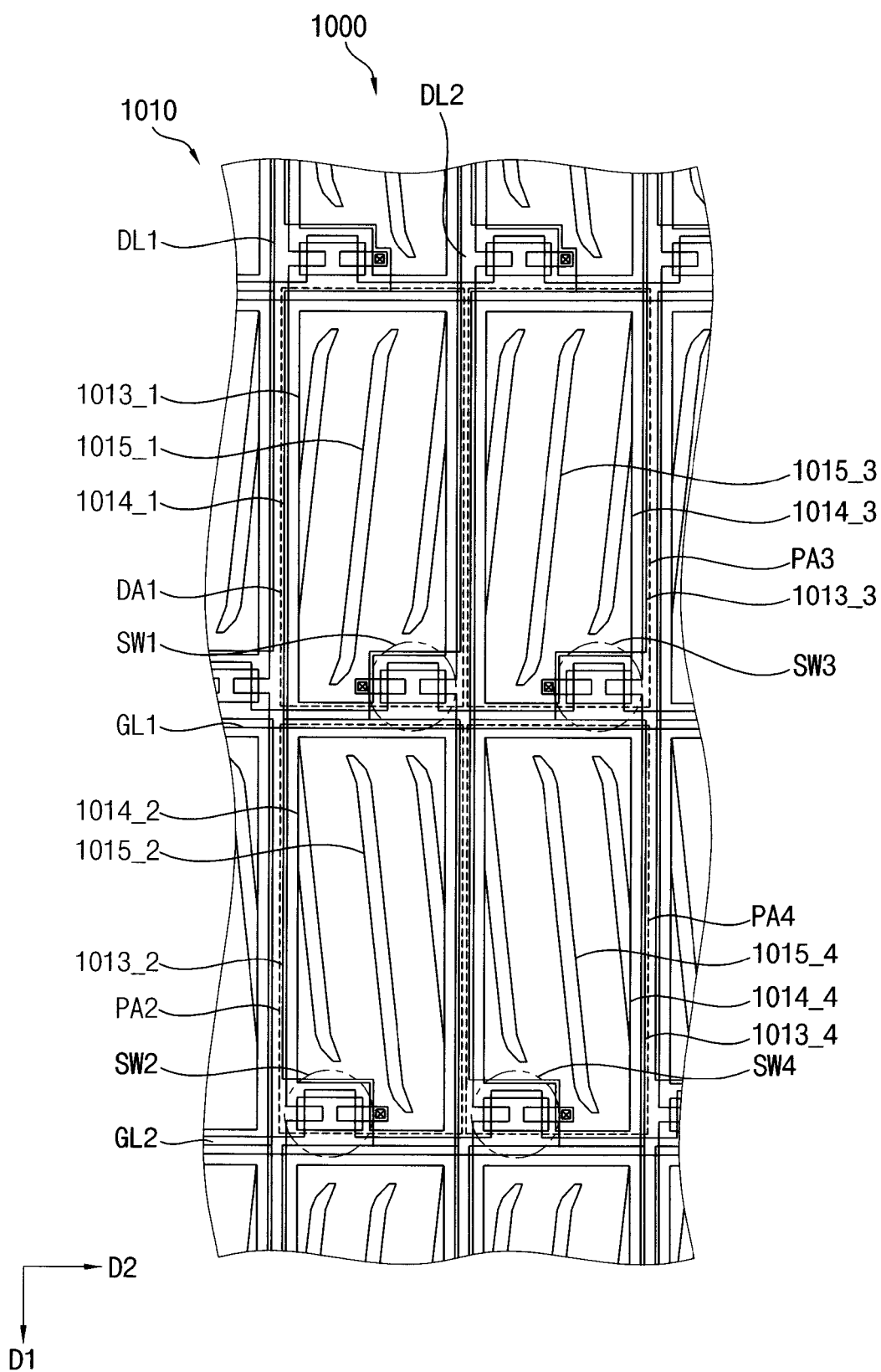
FIG. 14 is a plan view illustrating a display panel in accordance with example embodiments.

FIG. 14 is a plan view illustrating a display panel in accordance with example embodiments;

According to example embodiments, a display panel 1000 of FIG. 14 may be included in the display device 10 illustrated in FIGS. 1 and 2, or in the display device 20 illustrated in FIGS. 4, 5 and 6. The display panel 1000 may be substantially the same as the display panel 700 illustrated in FIGS. 11A and 11B, except for at least one element of a display substrate 1010. Thus, differences will be briefly described hereinafter and any repetitive descriptions may be omitted.

Referring to FIG. 14, a display substrate 1010 may include an insulating substrate, a plurality of signal lines, electric field generating electrodes, a plurality of switching elements SW1, SW2, SW3, and SW4, and a first alignment layer.

The insulating substrate may include first to fourth pixel regions PA1, PA2, PA3, and PA4. The second pixel region PA2 may be located in a first direction D1 from the first pixel region PA1. The third pixel region PA3 may be located in a second direction D2 from the first pixel region PA1, and the fourth pixel region PA4 may be located in the second direction D2 from the second pixel region PA2. The first to fourth pixel regions PA1, PA2, PA3, and PA4 may have rectangular shapes, respectively.

The signal lines may include first and second gate lines GL1 and GL2, and first and second data lines DL1 and DL2. The data lines DL1 and DL2 may cross the gate lines GL1 and GL2. The first and second gate lines GL1 and GL2 may extend in the second direction D2, and the first and second data lines DL1 and DL2 may extend in the first direction D1. The first and second data lines DL1 and DL2 may extend in a straight line shape along the first direction D1, and may be in parallel with each other. The first and second pixel regions PA1 and PA2 may be located between the first and second data lines DL1 and DL2.

The display substrate 1010 may include first to fourth lower electrodes 1013_1, 1013_2, 1013_3, and 1013_4, and first to fourth upper electrodes 1014_1, 1014_2, 1014_3, and 1014_4. The first to fourth lower electrodes 1013_1, 1013_2, 1013_3, and 1013_4 may be formed in the first to fourth pixel regions PA1, PA2, PA3, and PA4, respectively. The first to fourth upper electrode 1014_1, 1014_2, 1014_3, and 1014_4 may be formed in the first to fourth pixel regions PA1, PA2, PA3, and PA4, respectively. The first to fourth upper electrodes 1014_1, 1014_2, 1014_3, and 1014_4 may overlap the first to fourth lower electrodes 1013_1, 1013_2, 1013_3, and 1013_4, respectively.

The first to fourth upper electrodes 1014_1, 1014_2, 1014_3, and 1014_4 may have first to fourth slit patterns 1015_1, 1015_2, 1015_3, and 1015_4, respectively. The first to fourth slit patterns 1015_1, 1015_2, 1015_3, and 1015_4 may be substantially the same as the first to fourth slit patterns 515_1, 515_2, 515_3, and 515_4 illustrated in FIG. 9.

The first lower electrode 1013_1 may be electrically coupled to the first switching element SW1. The first switching element SW1 may be electrically coupled to the first gate line GL1 and the second data line DL2. The first lower electrode 1013_1 may be a pixel electrode for receiving a pixel voltage.

The second lower electrode 1013_2 may be electrically coupled to the second switching element SW2. The second switching element SW2 may be electrically coupled to the second gate line GL2 and the first data line DL1. The second lower electrode 1013_2 may be a pixel electrode for receiving a pixel voltage.

The first switching element SW1 may be located adjacently to the second data line DL2, and the second switching element SW2 may be located adjacently to the first data line DL1. Thus, an arrangement of the first and second switching elements SW1 and SW2 may be symmetric.

The third and fourth lower electrodes 1013_3 and 1013_4 may be electrically coupled to the third and fourth switching elements SW3 and SW4. The third and fourth switching elements SW3 and SW4 may have substantially the same structure as the first and second switching elements SW1 and SW2.

Although the first to fourth upper electrodes 1014_1, 1014_2, 1014_3, and 1014_4 may have first to fourth slit patterns 1015_1, 1015_2, 1015_3, and 1015_4 that extend in the third and fourth directions, sides of the first to fourth upper electrodes 1014_1, 1014_2, 1014_3, and 1014_4 that are adjacent to the first and second data lines DL1 and DL2, may extend in parallel with the first and second data lines DL1 and DL2. Thus, each of the first to fourth upper electrodes 1014_1, 1014_2, 1014_3, and 1014_4, may have a rectangular shape.

Figure 15:
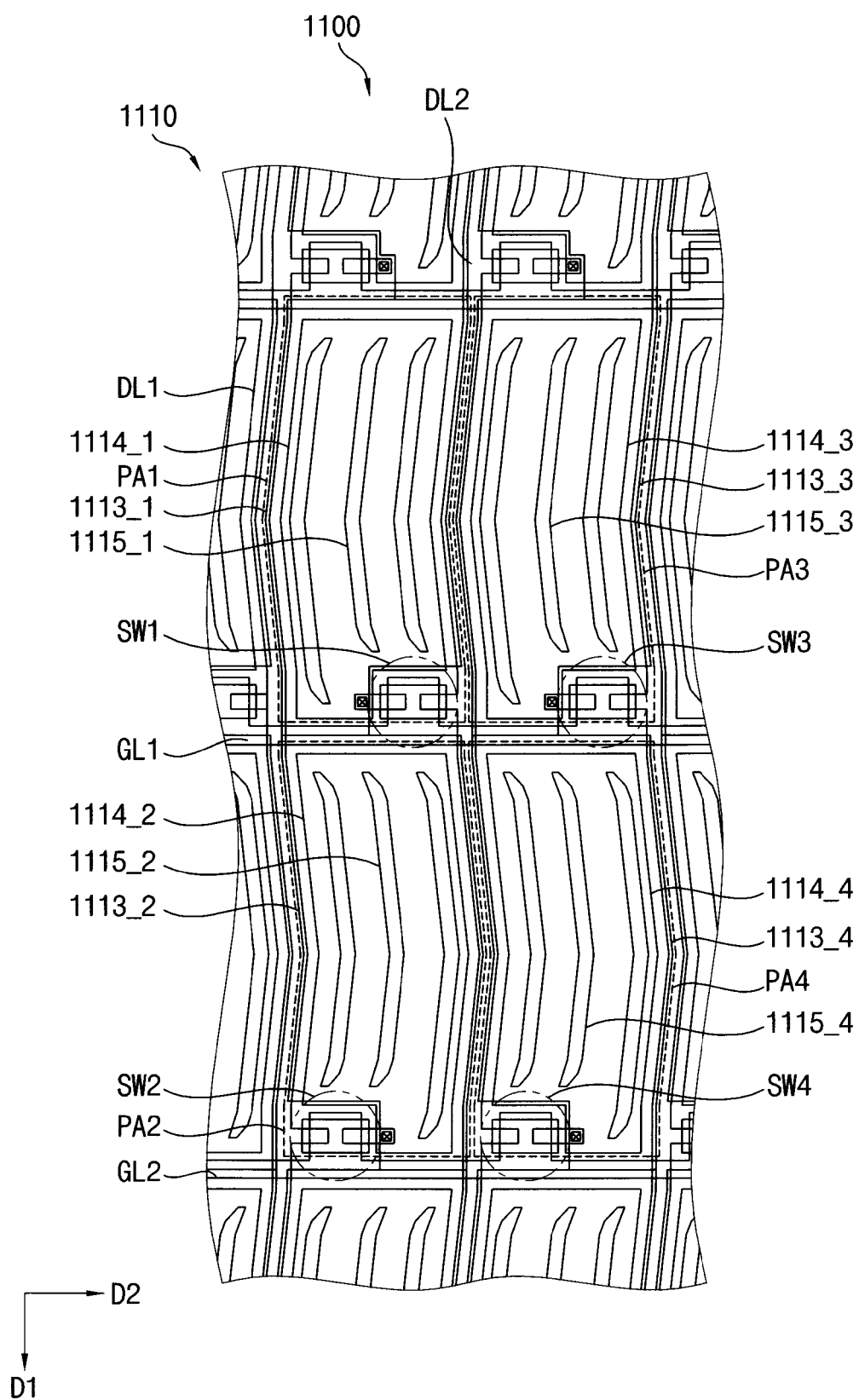
FIG. 15 is a plan view illustrating a display panel in accordance with example embodiments.

FIG. 15 is a plan view illustrating a display panel in accordance with example embodiments.

According to example embodiments, a display panel 1100 of FIG. 15 may be included in the display device 10 illustrated in FIGS. 1 and 2, or in the display device 20 illustrated in FIGS. 4, 5 and 6. The display panel 1100 may be substantially the same as the display panel 700 illustrated in FIGS. 11A and 11B, except for partial elements of a display substrate 1110. Thus, differences will be briefly described hereinafter, and any repetitive descriptions may be omitted.

Referring to FIG. 15, a display substrate 1110 may include an insulating substrate, a plurality of signal lines, electric field generating electrodes, a plurality of switching elements SW1, SW2, SW3, and SW4, and a first alignment layer.

The insulating substrate may include first to fourth pixel regions PA1, PA2, PA3, and PA4. The second pixel region PA2 may be located in a first direction D1 from the first pixel region PA1. The third pixel region PA3 may be located in a second direction D2 from the first pixel region PA1, and the fourth pixel region PA4 may be located in the second direction D2 from the second pixel region PA2.

The signal lines may include first and second gate lines GL1 and GL2, and first and second data lines DL1 and DL2. The data lines DL1 and DL2 may cross the gate lines GL1 and GL2. The first and second gate lines GL1 and GL2 may extend in the second direction D2, and the first gate line GL1 may be located between the first and second pixel regions PA1 and PA2. The first and second data lines DL1 and DL2 may extend in a zigzag shape along the first direction D1, and the first and second data lines DL1 and DL2 may be bent at least once in a region between two adjacent pixel regions PX1 and PX3.

The display substrate 1110 may include first to fourth lower electrodes 1113_1, 1113_2, 1113_3, and 1113_4, and first to fourth upper electrodes 1114_1, 1114_2, 1114_3, and 1114_4. The first to fourth lower electrodes 1113_1, 1113_2, 1113_3, and 1113_4 may be formed in the first to fourth pixel regions PA1, PA2, PA3, and PA4, respectively. The first to fourth upper electrode 1114_1, 1114_2, 1114_3, and 1114_4 may be formed in the first to fourth pixel regions PA1, PA2, PA3, and PA4, respectively. The first to fourth upper electrodes 1114_1, 1114_2, 1114_3, and 1114_4 may overlap the first to fourth lower electrodes 1113_1, 1113_2, 1113_3, and 1113_4, respectively.

The first to fourth upper electrodes 1114_1, 1114_2, 1114_3, and 1114_4 may have first to fourth slit patterns 1115_1, 1115_2, 1115_3, and 1115_4, respectively. The first to fourth slit patterns 1115_1, 1115_2, 1115_3, and 1115_4 may be substantially the same as the first to fourth slit patterns 615_1, 615_2, 615_3, and 615_4 illustrated in FIG. 10.

The first lower electrode 113_1 may be electrically coupled to the first switching element SW1. The first switching element SW1 may be electrically coupled to the first gate line GL1 and the second data line DL2. The first lower electrode 113_1 may be a pixel electrode for receiving a pixel voltage.

The second lower electrode 113_2 may be electrically coupled to the second switching element SW2. The second switching element SW2 may be electrically coupled to the second gate line GL2 and the first data line DL1. The second lower electrode 113_2 may be a pixel electrode for receiving a pixel voltage.

The first and second switching elements SW1 and SW2 may be coupled to the different data lines DL1 and DL2. In addition, the first switching element SW1 may be located adjacently to the second data line DL2, and the second switching element SW2 may be located adjacently to the first data line DL1. Thus, an arrangement of the first and second switching elements SW1 and SW2 may be symmetric.

The third and fourth lower electrodes 1113_3 and 1113_4 may be electrically coupled to the third and fourth switching elements SW3 and SW4. The third and fourth switching elements SW3 and SW4 may have substantially the same structure as the first and second switching elements SW1 and SW2.

Shapes of the first and second data lines DL1 and DL2 may be substantially the same as those of the first and second data lines DL1 and DL2 illustrated in FIG. 10.

Figure 16A:
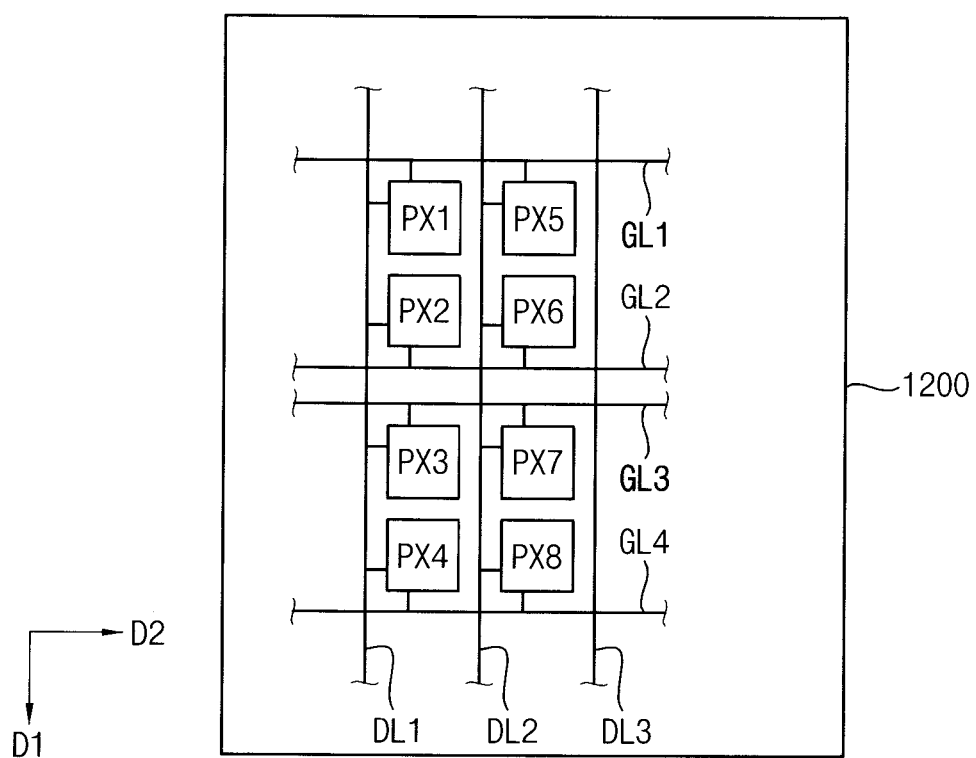
FIG. 16A is a block diagram illustrating a display panel in accordance with example embodiments.
Figure 16B:
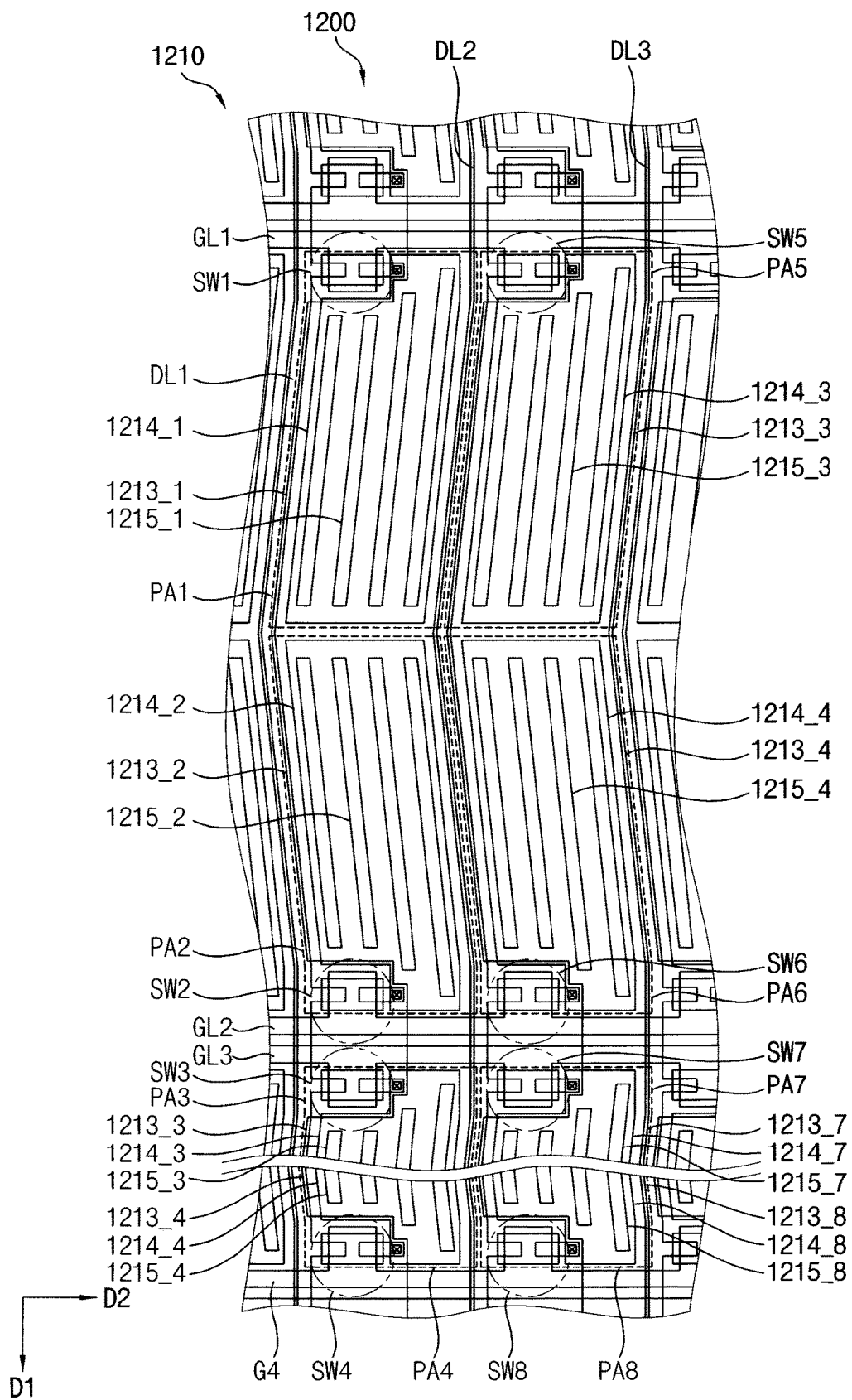
FIG. 16B is a plan view illustrating a display panel in accordance with example embodiments.

FIG. 16A is a block diagram illustrating a display panel in accordance with example embodiments. FIG. 16B is a plan view illustrating a display panel in accordance with example embodiments.

According to example embodiments, a display panel 1200 may be included in the display device 10 illustrated in FIGS. 1 and 2, or in the display device 20 illustrated in FIGS. 4, 5 and 6. The display panel 1200 may be substantially the same as the display panel 100 illustrated in FIGS. 3A and 3B, except for a display substrate 1210. Thus, differences will be briefly described hereinafter and any repetitive descriptions may be omitted.

Referring to FIGS. 16A and 16B, the display panel 1200 may include a display substrate 1210 (or a lower substrate), an opposing substrate (or an upper substrate), and a liquid crystal layer. The opposing substrate faces the display substrate 1210. The liquid crystal layer is interposed between the display substrate 1210 and the opposing substrate The display panel 1200 may include a plurality of pixels PX1, PX2, PX3, PX4, PX5, PX6, PX7, and PX8, and a plurality of signal lines GL1, GL2, GL3, GL4, DL1, DL2, and DL3, coupled to the pixels PX1, PX2, PX3, PX4, PX5, PX6, PX7, and PX8. The pixels PX1, PX2, PX3, PX4, PX5, PX6, PX7, and PX8 may be arranged in a matrix form. For example, first to fourth pixels PX1, PX2, PX3, and PX4 may be arranged in a first direction D1. The first direction D1 may be a vertical direction (or a column direction). Fifth to eighth pixels PX5, PX6, PX7, and PX8 may be located in a second direction D2 from the first to fourth pixels PX1, PX2, PX3, and PX4, respectively. The second direction D2 may be a horizontal direction (or a row direction).

Each of the pixels PX1, PX2, PX3, PX4, PX5, PX6, PX7, and PX8 may include a pair of electric field generating electrodes and the liquid crystal layer formed on the display substrate 1210. For example, the first pixel PX1 may include, as the pair of electric field generating electrodes, a first lower electrode 1213_1 and a first upper electrode 1214_1 overlapping the first lower electrode 1213_1. The first upper electrode 1214_1 may include a first slit pattern 1215_1 for forming the domain. Each of the pixels PX1, PX2, PX3, PX4, PX5, PX6, PX7, and PX8 may form the domain using a slit pattern formed in a corresponding upper electrode.

The first and second pixels PX1 and PX2 may have different domains. The domains of the first and second pixels PX1 and PX2 may be symmetric with respect to the second direction D2. The third and fourth pixels PX3 and PX4 may have different domains. The domains of the third and fourth pixels PX3 and PX4 may be symmetric with respect to the second direction D2. The fifth and sixth pixels PX5 and PX6 may have different domains. The domains of the fifth and sixth pixels PX5 and PX6 may be symmetric with respect to the second direction D2. The seventh and eighth pixels PX7 and PX8 may have different domains. The domains of the seventh and eighth pixels PX7 and PX8 may be symmetric with respect to the second direction D2. The first, third, fifth and seventh pixels PX1, PX3, PX5, and PX7 may have the same domain, and the second, fourth, sixth, and eighth pixels PX2, PX4, PX6, and PX8 may have the same domain. Thus, adjacent pixels located along the second direction D2 may have the same domain, and adjacent pixels located along the first direction D1 may have different domains.

The signal lines GL1, GL2, GL3, GL4, DL1, DL2, and DL3 may include first to fourth gate lines GL1, GL2, GL3, and GL4, and first to third data lines DL1, DL2, and DL3 crossing the gate lines GL1, GL2, GL3, and GL4. The signal lines GL1, GL2, GL3, GL4, DL1, DL2, and DL3 may be coupled to the pixels PX1, PX2, PX3, PX4, PX5, PX6, PX7, and PX8. For example, each of the pixels PX1, PX2, PX3, PX4, PX5, PX6, PX7, and PX8 may be coupled to a corresponding one of the gate lines GL1, GL2, GL3, and GL4 and a corresponding one of the data lines DL1, DL2, and DL3.

The display substrate 1210 may include an insulating layer, the signal lines GL1, GL2, GL3, GL4, DL1, DL2, and DL3, the electric field generating electrodes, a plurality of switching elements, and a first alignment layer.

The insulating substrate may include first to eighth pixel regions PA1, PA2, PA3, PA4, PA5, PA6, PA7, and PA8. The first to eighth pixel regions PA1, PA2, PA3, PA4, PA5, PA6, PA7, and PA8 may be arranged in a form substantially the same as a form in which the first to eighth pixels PX1, PX2, PX3, PX4, PX5, PX6, PX7, and PX8 are arranged. The first to fourth pixel regions PA1, PA2, PA3, and PA4 may be arranged in the first direction D1. The fifth to eighth pixel regions PA5, PA6, PA7, and PA8 may be located in the second direction D2 from the first to fourth pixel regions PA1, PA2, PA3, and PA4.

The first to fourth gate lines GL1, GL2, GL3, and GL4 may extend in the second direction D2, and may be arranged in parallel with each other. For example, the first and second pixel regions PA1 and PA2 may be located between the first and second gate lines GL1 and GL2, and the fifth and sixth pixel regions PA5 and PA6 may be located between the first and second gate lines GL1 and GL2. The first gate line GL1 may be located adjacently to edge portions (e.g., upper edge portions) of the first and fifth pixel regions PA1 and PA5, and the second gate line GL2 may be located adjacently to edge portions (e.g., lower edge portions) of the second and sixth pixel regions PA2 and PA6. The second gate line GL2 may be located between the second and third pixel regions PA2 and PA3, and between the sixth and seventh pixel regions PA6 and PA7. The third and fourth pixel regions PA3 and PA4 may be located between the third and fourth gate lines GL3 and GL4, and the seventh and eighth pixel regions PA7 and PA8 may be located between the third and fourth gate lines GL3 and GL4. The third gate line GL3 may be located adjacently to edge portions (e.g., upper edge portions) of the third and sixth pixel regions PA3 and PA7, and the fourth gate line GL4 may be located adjacently to edge portions (e.g., lower edge portions) of the fourth and eighth pixel regions PA4 and PA8. The third gate line GL3 may be located between the second and third pixel regions PA2 and PA3, and between the sixth and seventh pixel regions PA6 and PA7. Thus, no gate line may be located between the first and second pixel regions PA1 and PA2, and between the first and sixth pixel regions PA5 and PA6, and two gate lines GL2 and GL3 may be located between the second and third pixel regions PA2 and PA3, and between the sixth and seventh pixel regions PA6 and PA7. Accordingly, two gate lines may be located in every other pixel region along the first direction D1.

The first to third data lines DL1, DL2, and DL3 may extend in the first direction D1, and may be arranged in parallel with each other. For example, each of the first to third data lines DL1, DL2, and DL3 may be located in an edge portion (e.g., a left edge portion or a right edge portion) of the corresponding pixel region.

The electric field generating electrodes may include first to eighth lower electrodes 1213_1, 1213_2, 1213_3, 1213_4, 1213_5, 1213_6, 1213_7, and 1213_8, and first to eighth upper electrodes 1214_1, 1214_2, 1214_3, 1214_4, 1214_5, 1214_6, 1214_7, and 1214_8.

The first to eighth lower electrodes 1213_1, 1213_2, 1213_3, 1213_4, 1213_5, 1213_6, 1213_7, and 1213_8 may be formed in the first to eighth pixel regions PA1, PA2, PA3, PA4, PA5, PA6, PA7, and PA8, respectively. The first to eighth upper electrodes 1214_1, 1214_2, 1214_3, 1214_4, 1214_5, 1214_6, 1214_7, and 1214_8 may be formed to overlap the first to eighth lower electrodes 1213_1, 1213_2, 1213_3, 1213_4, 1213_5, 1213_6, 1213_7, and 1213_8 in the first to eighth pixel regions PA1, PA2, PA3, PA4, PA5, PA6, PA7, and PA8, respectively.

The first to eighth upper electrodes 1214_1, 1214_2, 1214_3, 1214_4, 1214_5, 1214_6, 1214_7, and 1214_8 may have first to eighth silt patterns 1215_1, 1215_2, 1215_3, 1215_4, 1215_5, 1215_6, 1215_7, and 1215_8, respectively. The first, third, fifth and seventh silt patterns 1215_1, 1215_3, 1215_5, and 1215_7 may extend in a third direction that is different from the first and second directions D1 and D2. The second, fourth, sixth and eighth silt patterns 1215_2, 1215_4, 1215_6, and 1215_8 may extend in a fourth direction that is different from the first and second directions D1 and D2, and the third direction. The third and fourth directions may be symmetric with respect to the second direction D2.

The first to eighth upper electrodes 1214_1, 1214_2, 1214_3, 1214_4, 1214_5, 1214_6, 1214_7, and 1214_8 may be coupled to the signal lines through the first to eighth switching elements SW1, SW2, SW3, SW4, SW5, SW6, SW7, and SW8. The first to eighth upper electrodes 1214_1, 1214_2, 1214_3, 1214_4, 1214_5, 1214_6, 1214_7, and 1214_8 may be pixel electrodes for receiving pixel voltages.

The first to fourth switching elements SW1, SW2, SW3, and SW4 may be electrically coupled to the first to fourth gate lines GL1, GL2, GL3, and GL4, respectively, and may be coupled to the first data line DL1. The fifth to eighth switching elements SW5, SW6, SW7, and SW8 may be electrically coupled to the first to fourth gate lines GL1, GL2, GL3, and GL4, respectively, and may be coupled to the second data line DL2. The first to eighth switching elements SW1, SW2, SW3, SW4, SW5, SW6, SW7, and SW8 may be located adjacently to the signal lines.

The data lines, the lower electrodes, the upper electrodes, and slit patterns of the display substrate 1210 may be substantially similar to those of the display substrates 310, 410, 510, and 610 illustrated in FIGS. 7 to 10.

Although it is not illustrated in FIGS. 16A and 16B, the opposing substrate may include a light-blocking pattern, color filters, and a second alignment layer.

Figure 17:
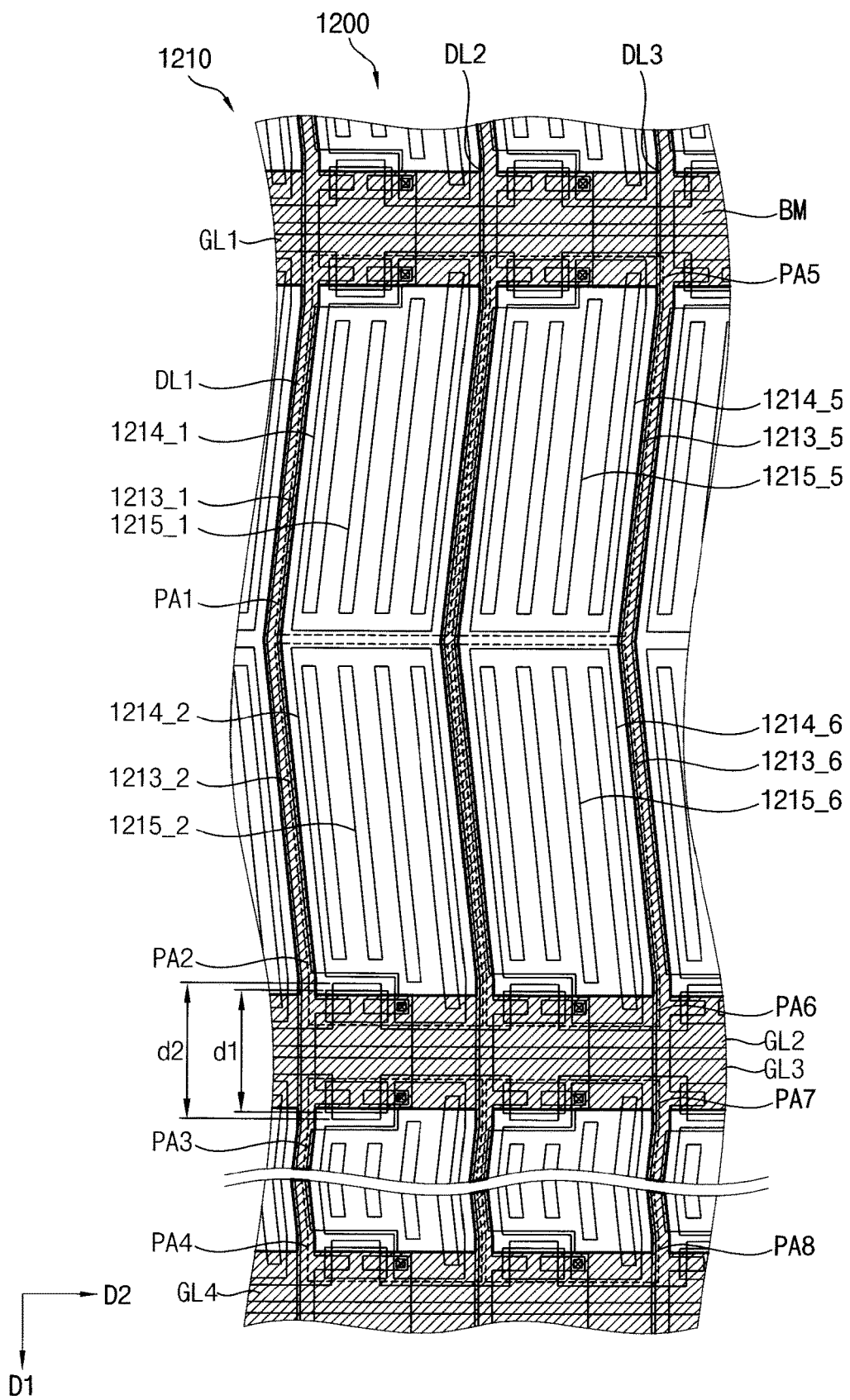
FIG. 17 is a plan view illustrating a light-blocking pattern of an opposing substrate included in a display panel of FIG. 16B.

FIG. 17 is a plan view illustrating a light-blocking pattern of an opposing substrate included in the display panel of FIG. 16B.

Referring to FIG. 17, a light-blocking pattern BM may be formed to overlap signal lines GL1, GL2, GL3, GL4, DL1, DL2, and DL3, and switching elements SW1, SW2, SW3, SW4, SW5, SW6, SW7, and SW8.

The light-blocking pattern BM may have a width d1 that is narrower than that of an object where incident light is to be blocked. The width d1 of the light-blocking pattern BM may be narrower than a width d2 of a gate pattern including gate lines GL and switching elements SW. For example, the width d1 of the light-blocking pattern BM between the second and third pixel regions PA2 and PA3 may be narrower than the width d2 of a gate pattern including the second and third gate lines GL2 and GL3, and the second and third switching elements SW2 and SW3. The width d2 of the gate pattern may be defined as a distance from a distant end of the second switching element SW2 to a distant end of the third switching element SW3.

Since the light-blocking pattern BM may be formed to have a width that is narrower than that of the gate pattern, a sufficient alignment margin may be obtained between the display substrate 1210 and the opposing substrate. Accordingly, a reduction of an aperture ratio due to an alignment error may be reduced or prevented.

Figure 18:
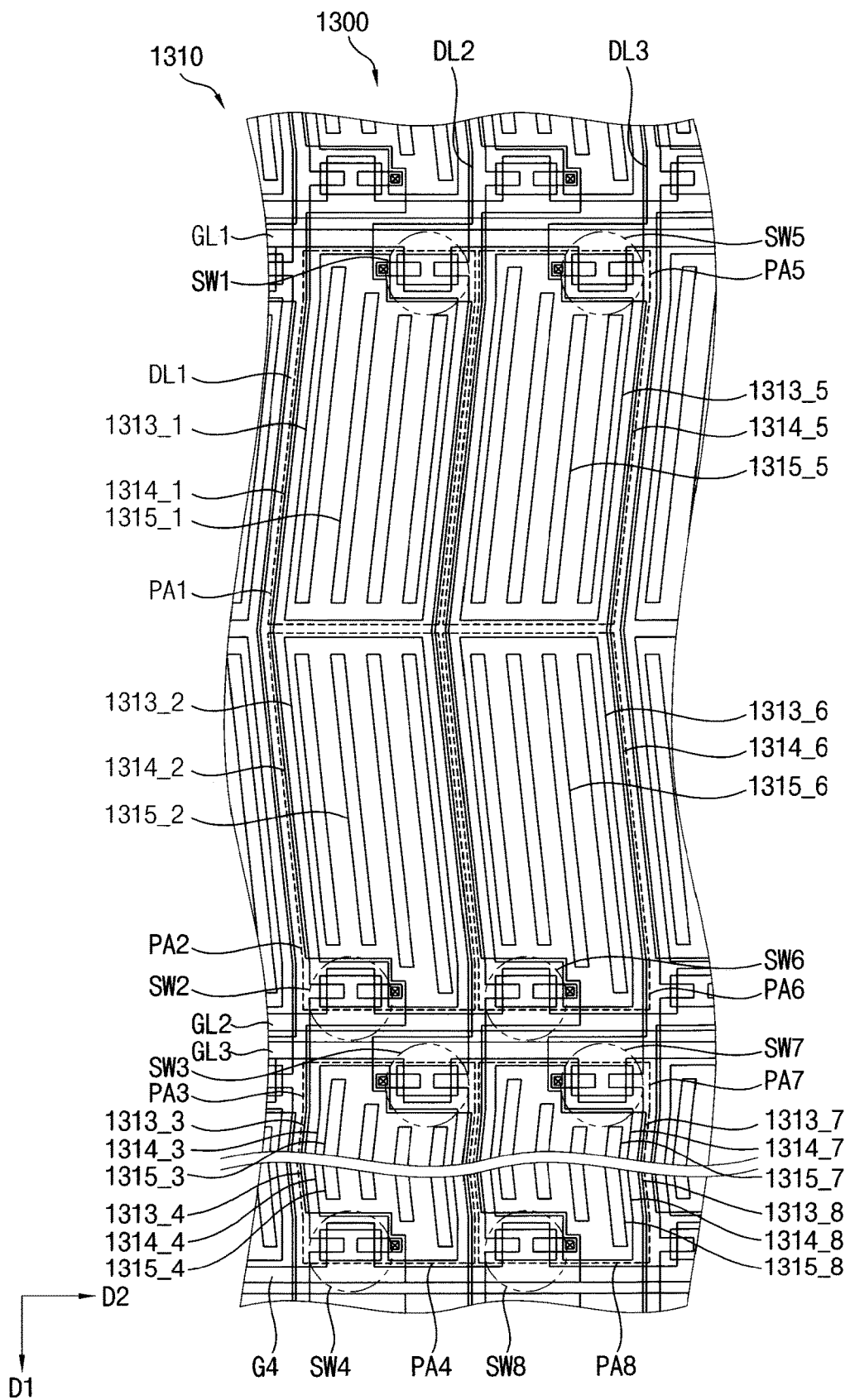
FIG. 18 is a plan view illustrating a display panel in accordance with example embodiments.

FIG. 18 is a plan view illustrating a display panel in accordance with example embodiments.

According to example embodiments, a display panel 1300 of FIG. 18 may be included in the display device 10 illustrated in FIGS. 1 and 2, or in the display device 20 illustrated in FIGS. 4, 5 and 6. The display panel 1300 may be substantially the same as the display panel 1200 illustrated in FIGS. 16A and 16B, except for at least one element of a display substrate 1310. Thus, differences will be briefly described hereinafter and any repetitive descriptions may be omitted.

Referring to FIG. 18, a display substrate 1310 may include an insulating substrate (not shown), a plurality of signal lines, a plurality of electric field generating electrodes, a plurality switching elements, and a first alignment layer (not shown).

First to fourth pixel regions PA1, PA2, PA3, and PA4 may be located along a first direction D1. Fifth to eighth pixel regions PA5, PA6, PA7, and PA8 may be located in a second direction D2 from the first to fourth pixel regions PA1, PA2, PA3, and PA4, respectively.

The signal lines may include a first gate line GL1, a second gate line GL2, a third gate line GL3, a fourth gate line GL4, a first data line DL1, a second data line DL2, and a third data line DL3.

The electric field generating electrodes may include first to eighth lower electrodes 1313_1, 1313_2, 1313_3, 1313_4, 1313_5, 1313_6, 1313_7, and 1313_8, and first to eighth upper electrodes 1314_1, 1314_2, 1314_3, 1314_4, 1314_5, 1314_6, 1314_7, and 1314_8.

The first to eighth upper electrodes 1314_1, 1314_2, 1314_3, 1314_4, 1314_5, 1314_6, 1314_7, and 1314_8 may be formed to overlap the first to eighth lower electrodes 1313_1, 1313_2, 1313_3, 1313_4, 1313_5, 1313_6, 1313_7, and 1313_8, respectively. The first to eighth upper electrodes 1314_1, 1314_2, 1314_3, 1314_4, 1314_5, 1314_6, 1314_7, and 1314_8 may have first to eighth silt patterns 1315_1, 1315_2, 1315_3, 1315_4, 1315_5, 1315_6, 1315_7, and 1315_8, respectively.

The first to eighth upper electrodes 1314_1, 1314_2, 1314_3, 1314_4, 1314_5, 1314_6, 1314_7, and 1314_8 may be coupled to the signal lines through the first to eighth switching elements SW1, SW2, SW3, SW4, SW5, SW6, SW7, and SW8, respectively. The first to eighth upper electrodes 1314_1, 1314_2, 1314_3, 1314_4, 1314_5, 1314_6, 1314_7, and 1314_8 may be pixel electrodes for receiving pixel voltages.

The first to fourth switching elements SW1, SW2, SW3, and SW4 may be electrically coupled to the first to fourth gate lines GL1, GL2, GL3, and GL4, respectively. The second and fourth switching elements SW2 and SW4 may be coupled to the first data line DL1, and the first and third switching elements SW1 and SW3 may be coupled to the second data line DL2. The fifth to eighth switching elements SW5, SW6, SW7, and SW8 may be electrically coupled to the first to fourth gate lines GL1, GL2, GL3, and GL4, respectively. The sixth and eighth switching elements SW6 and SW8 may be coupled to the second data line DL2, and the fifth and seventh switching elements SW5 and SW7 may be coupled to the third data line DL3.

As described above, an arrangement of the switching elements SW1, SW2, SW3, SW4, SW5, SW6, SW7, and SW8 may be changed along the first direction D1.

Therefore, light-blocking regions may be alternately arranged, so that the display device including the display panel 1300 may have balanced visibility in the left and right viewing directions. Further, since the switching elements SW1, SW2, SW3, SW4, SW5, SW6, SW7, and SW8 may be alternately coupled to different data lines along the first direction D1, a dot inversion method may be performed using a driving signal of a line inversion method.

The data lines, the lower electrodes, the upper electrodes, and slit patterns of the display substrate 1310 may be substantially similar to those of the display substrates 310, 410, 510 and 610 illustrated in FIGS. 7 to 10.

Although it is not illustrated in FIG. 18, the display panel 1300 may include an opposing substrate facing the display substrate 1310. The opposing substrate may include a light-blocking pattern.

Figure 19A:
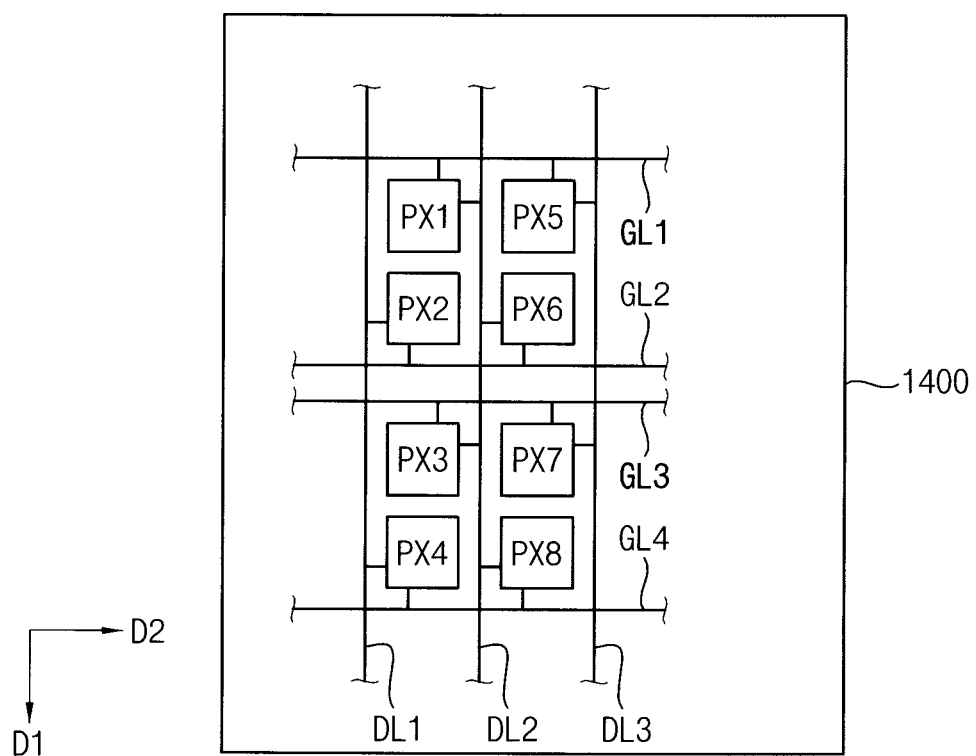
FIG. 19A is a block diagram illustrating a display panel in accordance with example embodiments.
Figure 19B:
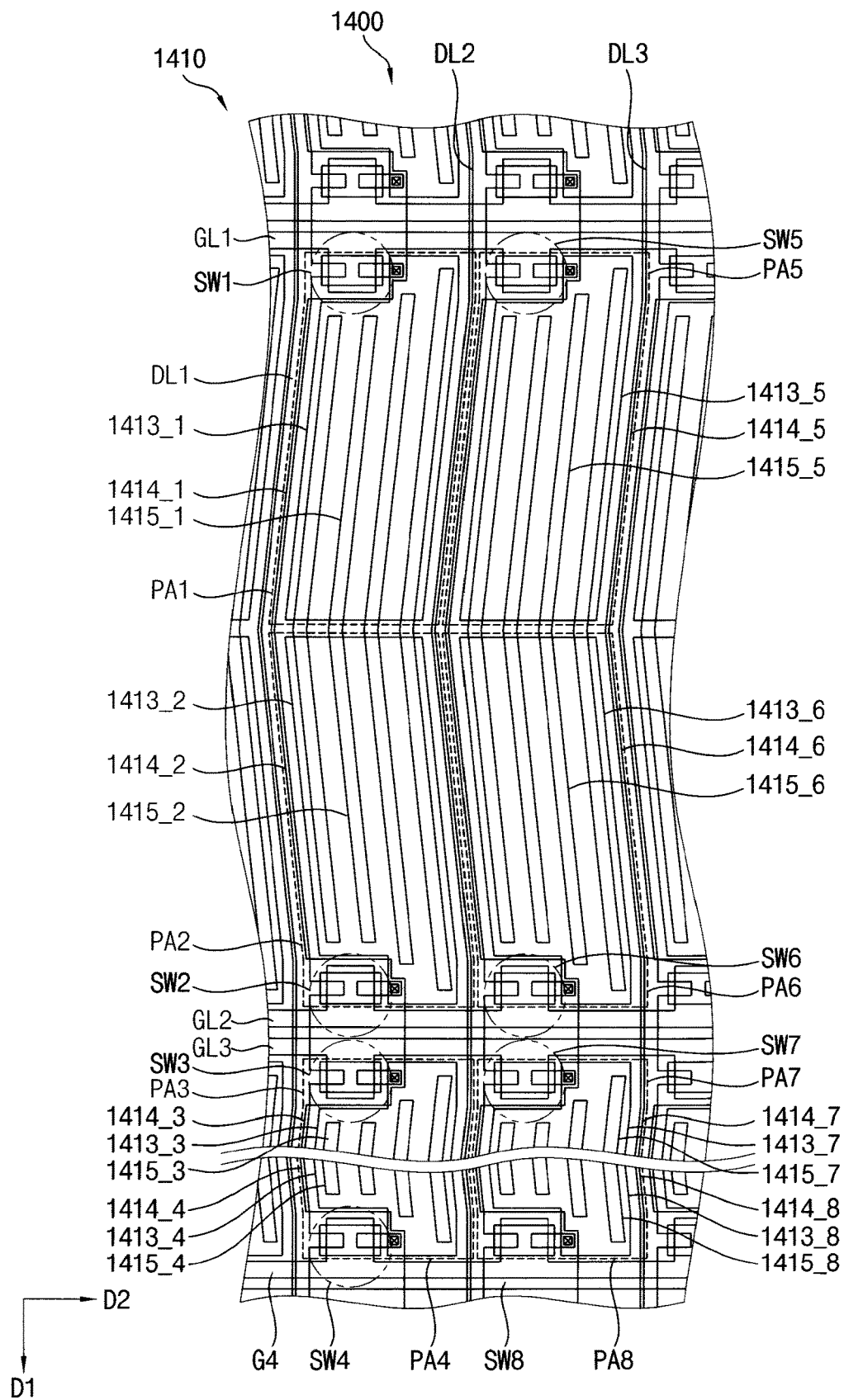
FIG. 19B is a plan view illustrating a display panel in accordance with example embodiments.

FIG. 19A is a block diagram illustrating a display panel in accordance with example embodiments. FIG. 19B is a plan view illustrating a display panel in accordance with example embodiments.

According to example embodiments, a display panel 1400 of FIGS. 19A and 19B may be included in the display device 10 illustrated in FIGS. 1 and 2, or in the display device 20 illustrated in FIGS. 4, 5 and 6. The display panel 1400 may be substantially the same as the display panel 700 illustrated in FIGS. 11A and 11B, except for a display substrate 1410. Thus, differences will be briefly described hereinafter and any repetitive descriptions may be omitted.

Referring to FIGS. 19A and 19B, a display panel 1400 may include a display substrate 1410 (or a lower substrate), an opposing substrate (or an upper substrate), and a liquid crystal layer.

The display panel 1400 may include a plurality of pixels, and a plurality of signal lines coupled to the pixels. The pixels may be arranged in a matrix form. For example, the pixels may include first to eighth pixels PX1, PX2, PX3, PX4, PX5, PX6, PX7, and PX8.

Each of the pixels PX1, PX2, PX3, PX4, PX5, PX6, PX7, and PX8 may include a pair of electric field generating electrodes, and a liquid crystal layer formed on the display substrate 1410. Each of the pixels PX1, PX2, PX3, PX4, PX5, PX6, PX7, and PX8 may form the domain using a slit pattern formed in a corresponding upper electrode.

Adjacent pixels that are arranged along a second direction D2 may have the same domain, and adjacent pixels that are arranged along a first direction D1 may have different domains.

The signal lines may include first to fourth gate lines GL1, GL2, GL3, and GL4 and first to third data lines DL1, DL2, and DL3. The signal lines may be coupled to the pixels PX1, PX2, PX3, PX4, PX5, PX6, PX7, and PX8.

The display substrate 1210 may include an insulating layer, the signal lines, the electric field generating electrodes, a plurality of switching elements, and a first alignment layer.

The insulating substrate may include first to eighth pixel regions PA1, PA2, PA3, PA4, PA5, PA6, PA7, and PA8. The first to fourth pixel regions PA1, PA2, PA3, and PA4 may be arranged along the first direction D1. The fifth to eighth pixel regions PA5, PA6, PA7, and PA8 may be located in the second direction D2 from the first to fourth pixel regions PA1, PA2, PA3, and PA4.

The electric field generating electrodes may include first to eighth lower electrodes 1413_1, 1413_2, 1413_3, 1413_4, 1413_5, 1413_6, 1413_7, and 1413_8, and first to eighth upper electrodes 1414_1, 1414_2, 1414_3, 1414_4, 1414_5, 1414_6, 1414_7, and 1414_8.

The first to eighth upper electrodes 1414_1, 1414_2, 1414_3, 1414_4, 1414_5, 1414_6, 1414_7, and 1414_8 may be formed to overlap the first to eighth lower electrodes 1413_1, 1413_2, 1413_3, 1413_4, 1413_5, 1413_6, 1413_7, and 1413_8 in the first to eighth pixel regions PA1, PA2, PA3, PA4, PA5, PA6, PA7, and PA8, respectively.

The first to eighth lower electrodes 1413_1, 1413_2, 1413_3, 1413_4, 1413_5, 1413_6, 1413_7, and 1413_8 may be coupled to the signal lines through the first to eighth switching elements SW1, SW2, SW3, SW4, SW5, SW6, SW7, and SW8, respectively. The first to eighth lower electrodes 1413_1, 1413_2, 1413_3, 1413_4, 1413_5, 1413_6, 1413_7, and 1413_8 may be pixel electrodes for receiving pixel voltages.

The first to eighth upper electrodes 1414_1, 1414_2, 1414_3, 1414_4, 1414_5, 1414_6, 1414_7, and 1414_8 may have first to eighth slit patterns 1415_1, 1415_2, 1415_3, 1415_4, 1415_5, 1415_6, 1415_7, and 1415_8, respectively. The first, third, fifth, and seventh slit patterns 1415_1, 1415_3, 1415_5, and 1415_7 may extend in a third direction that is different from the first and second directions D1 and D2. The second, fourth, sixth, and eighth slit patterns 1415_2, 1415_4, 1415_6, and 1415_8 may extend in a fourth direction that is different from the first and second directions D1 and D2, and the third direction. The third and fourth directions may be symmetric with respect to the second direction D2.

The first and second upper electrodes 1414_1 and 1414_2 may have an integral structure. Further, the first and second slit patterns 1415_1 and 1415_2 may be coupled to each other. For example, a lower edge portion of the first slit pattern 1415_1 may be coupled to an upper edge portion of the second slit pattern 1415_2. If the first and second slit patterns 1415_1 and 1415_2 are coupled to each other, an electrical distortion at a boundary between the first and second upper electrodes 1414_1 and 1414_2, may be reduced, thereby improving visibility.

The first to fourth switching elements SW1, SW2, SW3, and SW4 may be electrically coupled to the first to fourth gate lines GL1, GL2, GL3, and GL4, respectively, and may be coupled to the first data line DL1. The fifth to eighth switching elements SW5, SW6, SW7, and SW8 may be electrically coupled to the first to fourth gate lines GL1, GL2, GL3, and GL4, respectively, and may be coupled to the second data line DL2. The first to eighth switching elements SW1, SW2, SW3, SW4, SW5, SW6, SW7, and SW8 may be located adjacently to the signal lines.

The data lines, the lower electrodes, the upper electrodes and the slit patterns of the display substrate 1410 may be substantially similar to those of the display substrates 810, 910, 1010, and 1110 illustrated in FIGS. 12 to 15.

Although it is not illustrated in FIGS. 19A and 19B, the opposing substrate may include a light-blocking pattern, color filters and a second alignment layer.

Figure 20:
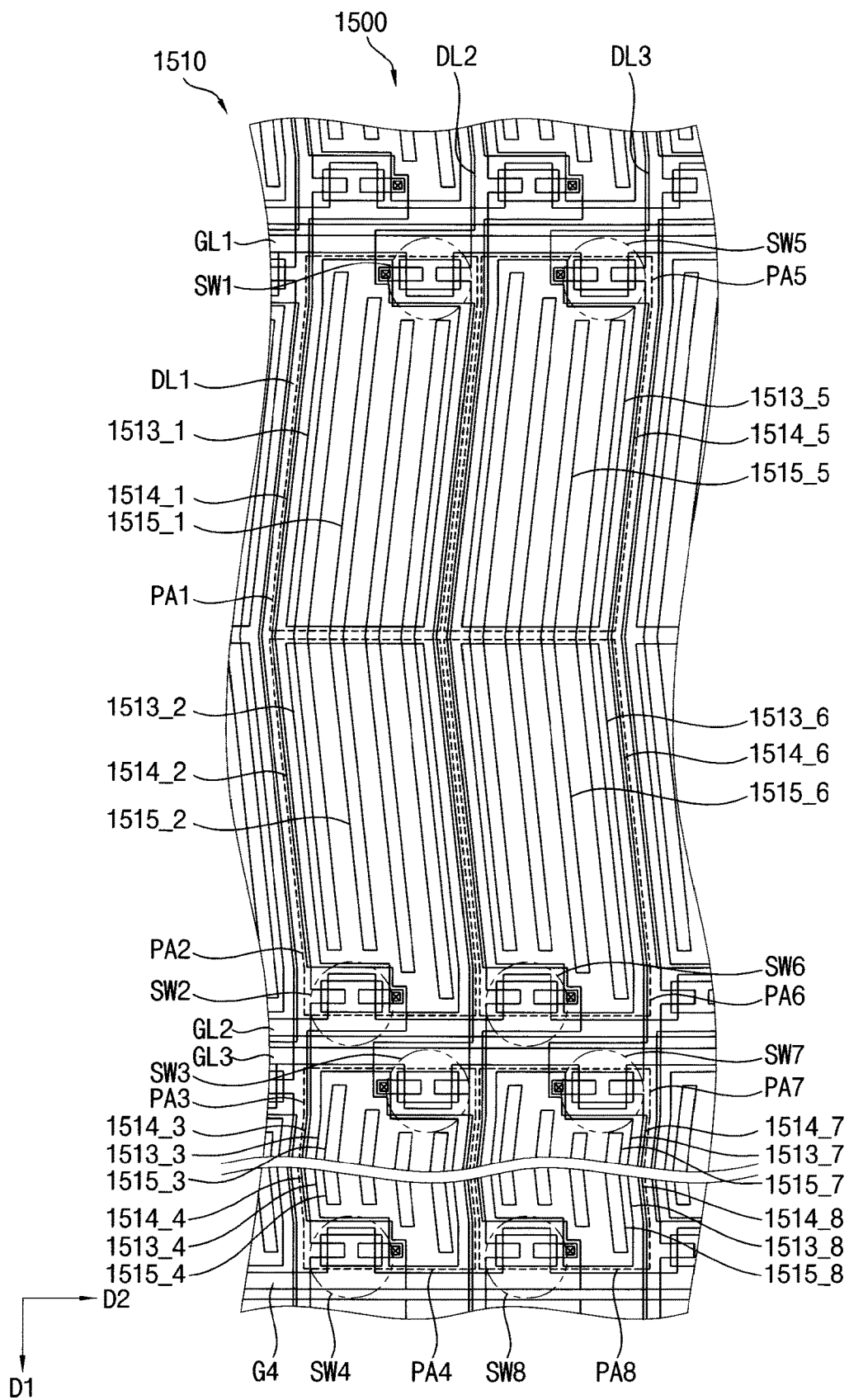
FIG. 20 is a plan view illustrating a display panel in accordance with example embodiments.

FIG. 20 is a plan view illustrating a display panel in accordance with example embodiments.

According to example embodiments, a display panel 1500 of FIG. 20 may be included in the display device 10 illustrated in FIGS. 1 and 2, or in the display device 20 illustrated in FIGS. 5, 6 and 7. The display panel 1500 may be substantially the same as a display panel 1400 illustrated in FIGS. 19A and 19B, except for a display substrate 1510. Thus, differences will be briefly described hereinafter and any repetitive descriptions may be omitted.

Referring to FIG. 20, a display substrate 1510 may include an insulating layer, a plurality of signal lines, a plurality of electric field generating electrodes, a plurality of switching elements, and a first alignment layer.

The insulating substrate may include first to eighth pixel regions PA1, PA2, PA3, PA4, PA5, PA6, PA7, and PA8. The first to fourth pixel regions PA1, PA2, PA3, and PA4 may be arranged along the first direction D1. The fifth to eighth pixel regions PA5, PA6, PA7, and PA8 may be located in the second direction D2 from the first to fourth pixel regions PA1, PA2, PA3, and PA4.

The signal lines may include first to fourth gate lines GL1, GL2, GL3, and GL4, and first to third data lines DL1, DL2, and DL3 crossing the first to fourth gate lines GL1, GL2, GL3, and GL4. The signal lines may be substantially the same as the signals illustrated in FIGS. 16A and 16B.

The electric field generating electrodes may include first to eighth lower electrodes 1513_1, 1513_2, 1513_3, 1513_4, 1513_5, 1513_6, 1513_7, and 1513_8, and first to eighth upper electrodes 1514_1, 1514_2, 1514_3, 1514_4, 1514_5, 1514_6, 1514_7, and 1514_8.

The first to eighth upper electrodes 1514_1, 1514_2, 1514_3, 1514_4, 1514_5, 1514_6, 1514_7, and 1514_8 may be formed to overlap the first to eighth lower electrodes 1513_1, 1513_2, 1513_3, 1513_4, 1513_5, 1513_6, 1513_7, and 1513_8 in the first to eighth pixel regions PA1, PA2, PA3, PA4, PA5, PA6, PA7, and PA8, respectively. The first to eighth upper electrodes 11514_1, 1514_2, 1514_3, 1514_4, 1514_5, 1514_6, 1514_7, and 1514_8 may have first to eighth silt patterns 1515_1, 1515_2, 1515_3, 1515_4, 1515_5, 1515_6, 1515_7, and 1515_8, respectively. The first to eighth silt patterns 1515_1, 1515_2, 1515_3, 1515_4, 1515_5, 1515_6, 1515_7, and 1515_8 may be substantially the same as the first to eighth silt patterns 1415_1, 1415_ 2, 1415_3, 1415_4, 1415_5, 1415_6, 1415_7, and 1415_8 illustrated in FIGS. 19A and 19B.

The first to eighth lower electrodes 1513_1, 1513_2, 1513_3, 1513_4, 1513_5, 1513_6, 1513_7, and 1513_8 may be coupled to the signal lines through the first to eighth switching elements SW1, SW2, SW3, SW4, SW5, SW6, SW7, and SW8. The first to eighth lower electrodes 1513_1, 1513_2, 1513_3, 1513_4, 1513_5, 1513_6, 1513_7, and 1513_8 may be pixel electrodes for receiving pixel voltages.

The first to eighth switching elements SW1, SW2, SW3, SW4, SW5, SW6, SW7, and SW8 may be located in the first to eighth pixel regions PA1, PA2, PA3, PA4, PA5, PA6, PA7, and PA8, respectively. The connections between the first to eighth switching elements SW1, SW2, SW3, SW4, SW5, SW6, SW7, and SW8, and the signal lines in the display substrate 1510 may be substantially the same as those of the display substrate 1410 illustrated in FIGS. 19A and 19B.

The data lines, the lower electrodes, the upper electrodes and slit patterns of the display substrate 1510 may be substantially similar to those of the display substrates 310, 410, 510 and 610 illustrated in FIGS. 7 to 10.

Although it is not illustrated in FIG. 20, the display panel 1500 may include an opposing substrate facing the display substrate 1510. The opposing substrate may include a light-blocking pattern, color filters and a second alignment layer.

The foregoing is illustrative of example embodiments, and is not to be construed as limiting thereof. Although a few example embodiments have been described, those skilled in the art will readily appreciate that many modifications are possible in the example embodiments without materially departing from the novel teachings and aspects of example embodiments. Accordingly, all such modifications are intended to be included within the scope of example embodiments as defined in the claims. In the claims, any means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A display substrate comprising:
   an insulating substrate comprising a first pixel region and a second pixel region located in a first direction from the first pixel region;
   a first gate line extending in a second direction crossing the first direction on the insulating substrate;
   a first lower electrode in the first pixel region;
   a second lower electrode in the second pixel region;
   a first upper electrode overlapping the first lower electrode in the first pixel region and comprising a first slit pattern comprising a plurality of first slits extending in a third direction different from the first and the second directions; and
   a second upper electrode overlapping the second lower electrode in the second pixel region and comprising a second slit pattern comprising a plurality of second slits extending in a fourth direction different from the first to the third directions,
   wherein the first pixel region forms a first pixel in a first row and the second pixel region forms a second pixel in a second row adjacent to the first row,
   wherein the first row comprising the first pixel and the second row comprising the second pixel have different domains from each other,
   wherein a first gamma reference voltage group of gamma voltages according to a first gamma curve for compensating for a variation of pixels having a same first domain in the first row is applied to the first pixel in the first row and a first group of rows of pixels, and a second gamma reference voltage group of gamma voltages according to a second gamma curve for compensating for a variation of pixels having a same second domain in the second row is applied to the second pixel in the second row and a second group of rows of pixels alternating with the first group of rows of pixels, wherein the second gamma reference voltage group is different from the first gamma reference voltage group and the second gamma reference voltage group is not applied to pixels in the first group of rows of pixels, and wherein a luminance difference occurring between the adjacent first and second rows having the different domains is compensated by the different first and second gamma reference voltage groups.

2. The display substrate of claim 1, wherein a first end of each of the first slits has a curved shape, and a second end of each of the first slits has a flat shape, and wherein a third end of each of the second slits has a flat shape, and a fourth end of each of the second slits has a curved shape.

3. The display substrate of claim 2, wherein the first end of each of the first slits and the fourth end of each of the second slits are distal ends with respect to an area between the first pixel region and the second pixel region, and wherein the second end of each of the first slits and the third end of each of the second slits are proximal ends with respect to the area between the first pixel region and the second pixel region.

4. The display substrate of claim 2, wherein the first end of each of the first slits has an inclined angle smaller than an angle between the second direction and the third direction, and wherein the fourth end of each of the second slits has an inclined angle smaller than an angle between the second direction and the fourth direction.

5. The display substrate of claim 1, further comprising:
an alignment layer on the insulating substrate on which the first and the second upper electrodes are located,
wherein an alignment direction of the alignment layer in the first pixel region is same as that of the alignment layer in the second pixel region.

6. The display substrate of claim 5, wherein the alignment direction of the alignment layer is the first direction or the second direction.

7. The display substrate of claim 1, wherein the second direction is perpendicular to the first direction, and wherein the third direction and the fourth direction are symmetric to each other with respect to the second direction.

8. The display substrate of claim 1, further comprising:
a second gate line in parallel with the first gate line;
a first data line crossing the first and second gate lines;
a first switching element in the first pixel region and electrically coupled to the first gate line and the first data line; and
a second switching element in the second pixel region and electrically coupled to the second gate line and the first data line,
wherein the first lower electrode or the first upper electrode is electrically coupled to the first switching element, and
wherein the second lower electrode or the second upper electrode is electrically coupled to the second switching element.

9. The display substrate of claim 8, wherein the first gate line is between the first and the second pixel regions, and
wherein the second pixel region is between the first and the second gate lines.

10. The display substrate of claim 8, wherein the first and the second pixel regions are between the first and the second gate lines.

11. The display substrate of claim 8, wherein the first data line extends parallel to the plurality of first slits in the third direction at the first upper electrode and extends parallel to the plurality of second slits in the fourth direction at the second upper electrode.

12. The display substrate of claim 8, wherein the first data line extends in the first direction.

13. The display substrate of claim 1, further comprising:
a second gate line in parallel with the first gate line;
a first data line crossing the first and the second gate lines;
a second data line in parallel with the first data line and crossing the first and the second gate lines;
a first switching element in the first pixel region and electrically coupled to the first gate line and the second data line; and
a second switching element in the second pixel region and electrically coupled to the second gate line and the first data line,
wherein the first lower electrode or the first upper electrode is electrically coupled to the first switching element, and
wherein the second lower electrode or the second upper electrode is electrically coupled to the second switching element.

14. The display substrate of claim 13, wherein the first and the second pixel regions are between the first and the second data lines, and
wherein the first switching element is adjacent to the second data line, and the second switching element is adjacent to the first data line.

15. The display substrate of claim 1, further comprising:
a first data line crossing the first gate line,
wherein both ends of each of the first slits have different shapes from each other,
wherein a first slit among the first slits that is parallel to the first data line is shorter than a second slit among the first slits that is parallel to the first data line, with the both ends of the first slit among the first slits having a same shape as the both ends of the second slit among the first slits, respectively,
wherein both ends of each of the second slits have different shapes from each other, and
wherein the shapes of the both ends of each of the second slits are symmetric to the shapes of the both ends of each of the first slits.

16. A display substrate comprising;
an insulating substrate comprising a first pixel region and a second pixel region located in a first direction from the first pixel region;
a first gate line extending in a second direction crossing the first direction on the insulating substrate;
a first lower electrode in the first pixel region;
a second lower electrode in the second pixel region;
a first upper electrode overlapping the first lower electrode in the first pixel region and comprising a first slit pattern comprising a plurality of first slits each sequentially extending in a third direction and in a fourth direction, the third and the fourth directions being different from each other, each of the third and the fourth directions being different from the first and the second directions; and
a second upper electrode overlapping the second lower electrode in the second pixel region and comprising a second slit pattern comprising a plurality of second slits each sequentially extending in the fourth direction and the third direction, wherein the first pixel region forms a first pixel in a first row and the second pixel region forms a second pixel in a second row adjacent to the first row, wherein the first row comprising the first pixel and the second row comprising the second pixel have different domains from each other, wherein a first gamma reference voltage group of gamma voltages according to a first gamma curve for compensating for a variation of pixels having a same first domain in the first row is applied to the first pixel in the first row and a first group of rows of pixels, and a second gamma reference voltage group of gamma voltages according to a second gamma curve for compensating for a variation of pixels having a same second domain in the second row is applied to the second pixel in the second row and a second group of rows of pixels alternating with the first group of rows of pixels, wherein the second gamma reference voltage group is different from the first gamma reference voltage group and the second gamma reference voltage group is not applied to pixels in the first group of rows of pixels, and wherein a luminance difference occurring between the adjacent first and second rows having the different domains is compensated by the different first and second gamma reference voltage groups.

17. The display substrate of claim 16, wherein a first end of each of the first slits and a fourth end of each of the second slits are distal ends with respect to an area between the first pixel region and the second pixel region, and
    wherein a second end of each of the first slits and a third end of each of the second slits are proximal ends with respect to the area between the first pixel region and the second pixel region.

18. The display substrate of claim 16, wherein a first end of each of the first slits has an inclined angle smaller than an angle between the second direction and the third direction, and
    wherein a fourth end of each of the second slits has an inclined angle smaller than an angle between the second direction and the third direction.

19. The display substrate of claim 16, further comprising: a first data line crossing the first gate line,
    wherein both ends of each of the first slits have different shapes from each other,
    wherein a first slit among the first slits that is parallel to the first data line is shorter than a second slit among the first slits that is parallel to the first data line, with the both ends of the first slit among the first slits having a same shape as the both ends of the second slit among the first slits, respectively, and
    wherein the shapes of the both ends of each of the second slits are symmetric to the shapes of the both ends of each of the first slits.

20. A display device comprising:
    a display panel comprising a first pixel, a second pixel and a first gate line, the first pixel comprising a first lower electrode and a first upper electrode overlapping the first lower electrode, the first upper electrode having a first slit pattern, the second pixel located in a first direction from the first pixel, the second pixel comprising a second lower electrode and a second upper electrode overlapping the second lower electrode, the second upper electrode having a second slit pattern extending in a direction different from a longitudinal direction of the first slit pattern, and the first gate line extending in a second direction different from the first direction;
    a gamma voltage generator configured to generate a first gamma reference voltage group and a second gamma reference voltage group, the first and the second gamma reference voltage groups having different voltage levels;
    a controller configured to output first and second pixel data corresponding to the first and the second pixels; and
    a data driver configured to convert the first pixel data to a first pixel voltage based on the first gamma reference voltage group, to convert the second pixel data to a second pixel voltage based on the second gamma reference voltage group, and to output the first pixel voltage and the second pixel voltage to the first pixel and the second pixel, respectively,
    wherein the first pixel is in a first row and the second pixel is in a second row adjacent to the first row,
    wherein the first row comprising the first pixel and the second row comprising the second pixel have different domains from each other,
    wherein the first gamma reference voltage group is a group of gamma voltages according to a first gamma curve for compensating for a variation of pixels having a same first domain in the first row and is applied to the first pixel in the first row and a first group of rows of pixels, and the second gamma reference voltage group is a group of gamma voltages according to a second gamma curve for compensating for a variation of pixels having a same second domain in the second row and is applied to the second pixel in the second row and a second group of rows of pixels alternating with the first group of rows of pixels, wherein the second gamma reference voltage group is different from the first gamma reference voltage group and the second gamma reference voltage group is not applied to pixels in the first group of rows of pixels, and
    wherein a luminance difference occurring between the adjacent first and second rows having the different domains is compensated by the first and second gamma reference voltage groups having the different voltage levels.

* * * * *